US012765541B2

(12) United States Patent
Filgate et al.

(10) Patent No.: US 12,765,541 B2
(45) Date of Patent: Oct. 20, 2026

(54) SYSTEM AND METHOD FOR ORGAN MAINTENANCE AND TRANSPORT

(71) Applicant: DEKA Products Limited Partnership, Manchester, NH (US)

(72) Inventors: Joshua Filgate, Lyndeborough, NH (US); Timothy D. Moreau, Manchester, NH (US); Scott A. Coull, Manchester, NH (US); Piper L. Curtis, Manchester, NH (US); Justin M. Ferrentino, Mont Vernon, NH (US); Steven L. Henning, Manchester, NH (US); Bradley Hovan, Manchester, NH (US); Stuart A. Jacobson, Lexington, MA (US); Katie E. Leon, Ashland, MA (US); Katelyn Mosle, New Boston, NH (US)

(73) Assignee: DEKA Products Limited Partneship, Manchester, NH (US)

( * ) Notice: Subject to any disclaimer, the term of this patent is extended or adjusted under 35 U.S.C. 154(b) by 602 days.

(21) Appl. No.: 17/180,506

(22) Filed: Feb. 19, 2021

(65) Prior Publication Data

US 2021/0259240 A1 Aug. 26, 2021

Related U.S. Application Data

(60) Provisional application No. 62/979,144, filed on Feb. 20, 2020.

(51) Int. Cl.
*A01N 1/143* (2025.01)
*A01N 1/144* (2025.01)
*A01N 1/148* (2025.01)

(52) U.S. Cl.
CPC ............. *A01N 1/143* (2025.01); *A01N 1/144* (2025.01); *A01N 1/148* (2025.01)

(58) Field of Classification Search
CPC ... A01N 1/0247; A01N 1/0252; A01N 1/0273
See application file for complete search history.

(56) References Cited

U.S. PATENT DOCUMENTS

| | | | | |
|---|---|---|---|---|
| 6,014,864 A * | 1/2000 | Owen | F28F 13/00 | 62/51.1 |
| 6,046,046 A | 4/2000 | Hassanein | | |
| 6,673,594 B1 * | 1/2004 | Owen | A01N 1/02 | 435/284.1 |
| 7,824,848 B2 | 11/2010 | Owen et al. | | |
| 10,314,303 B2 | 6/2019 | Hassanein et al. | | |
| 2014/0017665 A1 | 1/2014 | Steinman et al. | | |
| 2014/0030231 A1 * | 1/2014 | Yarmush | G01N 33/5091 | 435/6.12 |
| 2015/0017627 A1 * | 1/2015 | Anderson | A01N 1/0226 | 435/1.2 |
| 2017/0049096 A1 | 2/2017 | Kay et al. | | |
| 2019/0075786 A1 * | 3/2019 | Milne | A61M 1/0272 | |

FOREIGN PATENT DOCUMENTS

| | | |
|---|---|---|
| WO | 2002026034 A2 | 4/2002 |
| WO | WO/2002/026034 | 4/2002 |
| WO | WO 0226034 | 4/2002 |
| WO | 2013068751 A2 | 5/2013 |

OTHER PUBLICATIONS

Fontana et al ("Late Ureteral Stenosis After Kidney Transplantation: A Single-Center Experience;" Transplantation Proceedings, 42, 1174-1175 (2010). (Year: 2010).*

PCT/US2021/018886, Invitation to Pay Additional Fees, mailed Jun. 15, 2021 (16 pgs.).

Ana-Maria Dull et al, Therapeutic Approaches of Resveratrol on Endometriosis via Anti-Inflammatory and Anti-Angiogenic Pathways, published Feb. 13, 2019 in Brasov, Romania, 21 pages.

A. Diouf et al Development and characterization of an electrochemical biosensor for creatinine detection in human urine based on functional molecularly imprinted polymer. Journal of Electroanalytical Chemistry, issued on Jan. 31, 2017 in Meknes, Morocco, 53 pages.

Annemarie Weissenbacher et al, Urine Recirculation Improves Hemodynamics and Enhances Function in Normothermic Kidney Perfusion. Recirculation Improves Hemodynamics and Enhances Function in Normothermic Kidney Perfusion, Transplantation Direct Magazine, Published Mar. 13, 2020 , 8 pages.

Arun Kannan et al, Renal sympathetic nervous system and the effects of denervation on renal arteries. Published by Baishideng Publishing Group Inc, published Aug. 26, 2014, in Tuscon AZ, 11 pages.

Bahar Bastani, The worsening transplant organ shortage in USA; desperate times demand innovative solutions. Published Oct. 1, 2015 in Saint Louis, 6 pages.

Epocal Inc, System Manual Issued in 2018 in Ottawa, Canada, 18 pages.

John H. Bauer et al, ACE Inhibitors in Renal Disease Issued in Clin. Cardiol. 14 (Suppl. IV), IV-38-43 (1991) in Columbia, MO, p. 6.

Epocal Inc, System Manual with SMN 10736515 Issued in 2019 in Ottawa, Canada, 8 pages.

C. Steichen et al, Barriers and Advances in Kidney Preservation Published Dec. 4, 2018, in France, 16 pages.

Vanessa Campo-Ruiz et al, Novel Virtual Biopsy of the Kidney With Near Infrared, Reflectance Confocal Microscopy: A Pilot Study In Vivo and Ex Vivo. Published in Rightslink on Jan. 2006 vol. 175, 327-336, 10 pages.

(Continued)

*Primary Examiner* — Emily A Cordas
(74) *Attorney, Agent, or Firm* — Mark E. Tetreault

(57) ABSTRACT

System and method for maintaining an organ and transporting the organ from a donor to a recipient, maintaining normothermic temperature of the organ. The system includes a circulation system providing oxygenated perfusate to the organ and enabling continuous monitoring of the perfusate moving through the organ. The tank can provide an inlet that can accept selected infusible materials, and an outlet that can enable sampling and waste removal. The system can continually monitor the solution bath in which the organ is bathed, and the system can manage the composition of the gas in the tank.

20 Claims, 48 Drawing Sheets

(56) References Cited

OTHER PUBLICATIONS

Cardini, eta al, Significant prolongation of liver preservation ad monitoring through normothermic machine perfusion in liver Transplantation. Journal by Liver International on Jan. 15, 2020. 29 pages.
CDC-2019 Chronic Kidney Disease in the United States, 2019 published on Dec. 31, 2019, 8 pages.
Dr Franz Kohler Chemie Gmbh, et al. Characteristics of current kidney preservation solutions and machine perfusion. Barriers and Advances in Kidney Preservation, Published Jun. 18, 2019, 2 pages.
Chuck Connor, Bubbles in Magmas, How do bubbles grow by decompression in silicate magmas? How fast do they rise? Published Oct. 27, 2007 Tampa, FL, 16 pages.
Massimo Collino et al, Acute treatment with relaxin protects the kidney against ischaemia/reperfusion injury. J. Cell. Mol. Med. vol 17, No. 11, Accepted Jul. 24, 2013 in Torino, Italy, 12 pages.
Davide Bolignano et al, Neutrophil gelatinase-associated lipocalin NGAL as a marker of kidney damage Published in Article in Press in 2008, 11 pages.
De Vries et al., Pretransplant sequential hypo- and normothermic machine perfusion of suboptimal livers donated after circulatory death using a hemoglobin-based oxygen carrier perfusion solution. Accepted Dec. 13, 2018, 10 pages.
Dong Jung et al, A lab on a chip based non-Invasive Optical Sensor for Measuring Glucose in Saliva, published in Korea on Nov. 13, 2017, 12 pages.
Economist 2020—Kidney Failure- a quirk in the law means kidney shortage costs taxpayers millions. Published in New York on Feb. 22, 2020, 1 page.
Endale Mulugeta et al—2017 Recognition, Sensing, and Trapping of Bicarbonate Anions with a Dicationicmeso-Bis (benzimidazolium) Calix[4]pyrrole, Cell Press Published in Korea on Nov. 9, 2017, 14 pages.
Eurpoean Commission, Journalist Workshop on Organ donation and transplantation, Recent Facts & Figures, Published on Nov. 26, 2014 in Brussels, 9 pages.
Notification of Transmittal of the International Search Report and the Written Opinion of the ISA, PCT/US2021/018886, Aug. 5, 2021.
Merel B.F. Pool Prolonged ex-vivo normothermic kidney perfusion: The impact of perfusate composition. Article published by Plos One on May 18, 2021 in the Netherlands, 19 pages.
Nasrella D et al, how does the Metra work? The OrganOx metra—robust, fully automated and easy-to-use. Issued Feb. 13, 2020 in Oxford, OX4 4GA United Kingdom, 8 pages.
TransMedics TransMedics OCS™ Science that Mirrors Life, OCS for HCP's—Transmedics issued on Feb. 13, 2020 in Andover, MA, 9 Pages.
Olivier Aubert, et al—Disparities in Acceptance of Deceased Donors Between US and France and Estimated Effects of Increased US Acceptance. JAMA Internal Medicine/Original Investigation. Published Aug. 26, 2019, 10 pages.
S. K. Agarwal, et al. 2013 Basics of kidney biopsy A nephrologist's perspective. Published Jul.-Aug. 2013, 34 pages.
Annemarie Weissenbacher, et al. 2019—Liver Transplant Financial Bootcamp and Kidney Transplant Financial Bootcamp. American Journal of Transplantation, Issued on Sep. 19-20, 2019. 16 pages.
Eric Decker—The Role of Histidine of Histidine-Containing Compounds on the Buffering Capacity of Muscle. Beyond pH: Metabolic Factors Affecting Pork Quality. Published in 2001 in Amherst, MA, 4 pages.
Donald Trump et al, Executive Order on Advancing American Kidney Health, Executive orders. Issued on Jul. 10, 2019, 4 pages.
Bart M. Stubenitsky et al, Exsanguinous metabolic support perfusion—A new strategy to improve graft function after kidney transplantation, Transplantation. Issued on Apr. 19, 2000 in vol. 70, No. 8, 5 pages.
Adriana Boshetti-De-Fierro et al—Extended Characterization of a New Class of Membranes for Blood Purification: The High Cut-off Membranes. Article in The International journal of artificial organs published in May 2013 in Germany, 10 pages.
F. Catena, et al—Kidney Preservation: Review of Present and Future Perspective, Elsevier. Published in 2013 in New York, NY, 8 pages.
FDA guidance 2019—utilizing animal studies to evaluate organ preservation devices. Guidance for Industry and Food and Drug Administration Staff. Issued on May 8, 2019, 11 pages.
Franklin Esptein, Oxygen and renal metabolism. Kidney International, published in Boston Massachusetts, US in vol. 51(1997), pp. 381-385.
Frederick G. Hirsch, et al—Electrical Conductivity of Blood, I. Relationship to Erythrocyte Concentration. Published in ash publications.org on May 11, 2020, 19 pages.
Peter N. Furness et al—2012 International variation in the interpretation of renal transplant biopsies: Report of the CERTPAP Project. Kidney International, vol. 60 (2001), pp. 1998-2012, 15 pages.
Anja Gallinat et al—Use of the new preservation solution Custodiol-N supplemented with dextran for hypothermic machine perfusion of the kidney. Cryobiology published Jan. 2, 2013, in Germany, 5 pages.
Gerald Essen et al, Cardiovascular Function of Modern Pig not Comply with Allometric Scaling Laws, Scientific Reports. Published Jan. 15, 2018, 10 pages.
Tim L. Hamelink et al—Renal Normothermic Machine Perfusion: The RoadToward Clinical Implementation of a Promising Pretransplant Organ Assessment Tool, Transplantation 2022;106: 268-279. Published Apr. 26, 2021, 12 pages.
Won K. Han et al, 2002 Kidney Injuery Molecule-1 (KIM1) a novel biomarker for human renal proxmial tubule injury, Kidney International, Issued in vol. 62 (2002), pp. 237-244, 8 pages.
A.F Palmer et al, Hemoglobin Based Oxygen Carriers (HBOC) Andre palmer laboratory for Artificial Blood Research, Published Jul. 8, 2019, 2 pages.
Koen D. Hendriks et al—Renal temperature reduction progressively favors mitochondrial ROS production over respiration in hypothermic kidney preservation. Published in the Journal of Translational Medicine on Aug. 13, 2019, 10 pages.
Chris Higgins—2007 The use of heparin in preparing samples for blood gas analysis. Acutecaretesting.org Your scientific knowledge site. Published in Apr. 2007, 7 pages.
Takahisa Yano et al—Amphotericin B-Induced Renal Tubular Cell Injury Is Mediated by Na Influx through Ion-Permeable Pores and Subsequent Activation of Mitogen-Activated Protein Kinases and Elevation of Intracellular Ca2 Concentration. Antimicrobial Agents and Chemotherapy, Published in vol. 53, No. 4 in Jan. 4, 2009, 7 pages.
Sarah A. Hosgood et al—First in Man Renal Transplantation After Ex Vivo Normothermic Perfusion. Rapid Communications Published in vol. 92, No. 7, on Oct. 15, 2011, 4 pages.
Dieter P. Hoyer et al, Subnormothermic machine perfusion for preservation of porcine kidneys in a donation after circulatory death model. Transplant International, published Aug. 28, 2014 in Essen, Germany, 10 pages.
Michael Hulko et al—Cell-free plasma hemoglobin removal by dialyzers with various permeability profiles, Scientific Reports. Published on Nov. 10, 2015, 9 pages.
E. Hutter et al—Cell-free plasma hemoglobin removal by dialyzers with various permeability profiles. Article in Experimental Gerontology 41 (2006) 103-109, published on Mar. 16, 2019, 8 pages.
Eno Hysi et al—Photoacoustic imaging of kidney fibrosis for assessing pretransplant organ quality, JCI Insight, Published May 21, 2020, 16 pages.
Morris F. White et al—The Insulin Signaling System, The Journal of Biological Chemistry vol. 269, No. 1 Issued on Jan. 7, 1994, Boston, MA, 4 pages.
Irina Bobkova, et al—Edema in renal diseases—current view on pathogenesis, Nephrology @ Point of Care 2016; 2(1): e47-e55. Published in Russia on Oct. 10, 2016, 9 pages.

(56) References Cited

OTHER PUBLICATIONS

Xiaoshun He, et al—The First case of Ischemia-Free Kidney Transplantation in Humans. Frontiers in Medicine. Published Dec. 11, 2019, 6 pages.
Kunihiko Iwamoto et al, Curvature-Dependent Recognition of Ethanolamine Phospholipids by Duramycin and Cinnamycin. Biophysical Journal vol. 93 Sep. 2007 1608-1619, published Apr. 27, 2007. 12 pages.
Manu Jain et al—Rapid evaluation of fresh ex vivo kidney tissue with full-field optical coherence tomography. J. Pathol Inform published on Sep. 28, 2015, 8 pages.
Jan Czogalla et al—The Mouse Isolated Perfused Kidney Technique. Journal of Visualized Experiments. Published Nov. 17, 2016, 10 pages.
Jenna Dirito 2018—The future of marginal kidney repair in the context of normothermic machine perfusion. Minireview Published May 29, 2018, 9 pages.
Tomoaki Jikuya et al—1998—Species Differences in Erythrocyte Mechanical Fragility. Comparison of Human, Bovine, and Ovine Cells, Issued in the ASAIO Journal 1998;44:M452-M455, 4 pages.
Caroline Liu, et al—Less-than-perfect kidneys can be successfully used for transplants, study shows, Science Daily. Published on Jan. 9, 2020, 3 pages.
Jorge Ortiz et al 2012—understanding complexities of kidney transplantation. Published by Intech on Aug. 2011 in Croatia, 574 pages.
J. Moritz Kaths, et al. Normothermic Ex Vivo Kidney Perfusion for the Preservation of Kidney Grafts prior to Transplantation. Journal of Visualized Experiments. Published in Jul. 15, 2015, 13 pages.
Julie De Beule et al, Kidney Perfusion as an Organ Quality Assessment Tool—Are We Counting Our Chickens Before They Have Hatched? Journal of Clinical Medicine, Published on Mar. 23, 2020, 19 pages.
Dr. Junqueira et al, Unfractionated heparin versus low molecular weight heparins for avoiding heparin-induced thrombocytopenia in postoperative patients (Review), Cochrane Library Published in 2017, 42 pages.
Kabagamble et al—Combined Ex Vivo Hypothermic and Normothermic Perfusion for Assessment of High-risk Deceased Donor Human Kidneys for Transplantation. Secondary Logo, Journal logo, Published May 11, 2018, 12 pages.
Ayman H. Kamel et al—Solid Contact Potentiometric Sensors Based on Host-Tailored Molecularly Imprinted Polymers for Creatine Assessment, Int. J. Electrochem. Sci., 11 (2016) 8938-8949. Published Oct. 10, 2016 in Egypt, 12 pages.
Katja B. Ferenz et al. Artificial oxygen carriers—past, present and the future—a review of the most innovative and clinically relevant concepts. Published in Germany on Mar. 5, 2019, 51 pages.
Dr. Alan H. Stephenson, Renal Mechanisms for Regulating Urine Concentration. Pharmacological and Physiological Science. Published Apr. 18, 2008, 21 pages.
Nicholas Latchana et al, Preservation solutions used during abdominal transplantation: Current status and outcomes. World Journal of Transplantation. Published Dec. 24, 2015 in Columbus, OH, 12 pages.
Pendovski Lazo et al, Morphometrical Evaluation of Some Anatomical features in pig kidneys: Are they different from human kidneys, Original Scientific Article. Published May 23, 2013, 8 pages.
Qutaiba A. Tawfic et al—Liquid Ventilation. Oman Medical Journal (2011) vol. 26, No. 1: 4-9. Published Nov. 23, 2010, 6 pages.
Caroline Liu, et al—2020Association of Deceased Donor Acute Kidney Injury With Recipient Graft Survival, JAMA Network/ Open. Published on Jan. 8, 2020, 15 pages.
Sorin Group Italia SRL. livanova_inspire_6_broch_09295-129-c. Health Innovations that Matter. Published in Italy in 2016, 12 pages.
Maathuis et al, Organ preservation and viability in kidney and liver transplantation. University of Groningen, Published in the Netherlands in 2008, 193 pages.
Paria Mahboub et al, Gradual Rewarming with Gradual Increase in Pressure during Machine Perfusion after Cold Static Preservation Reduces Kidney Ischemia Reperfusion Injury. Plos One, Published Dec. 2, 2015, 12 pages.
Martin Chaumont et al, Delayed Graft Function in Kidney Transplants: Time Evolution, Role of Acute Rejection, Risk Factors, and Impact on Patient and Graft Outcome. Hindawi Publishing Corporation Journal of Transplantation vol. 2015, Article ID 163757. Published on Aug. 26, 2015, 9 pages.
Amanda Mather et al, Glucose handling by the kidney. International Society of Nephrology. Published in 2011. Department of Medicine, Kolling Institute of Medical Research, University of Sydney, Sydney, NSW, Australia, 6 pages.
Alix P. M. Matton et al, Normothermic Machine Perfusion of Donor Livers Without the Need for Human Blood Products. Published Dec. 18, 2017, 11 pages.
Herwig-Ulf-Meier-Kriesche, et al, Effect of waiting time on renal transplant outcome. Kidney International, vol. 58 Published by Departments of Medicine, Epidemiology and Surgery, The University of Michigan, Ann Arbor, Michigan, USA in 2000, 7 pages.
Brian Mejak, et al, Retrospective Analysis Comparing Hollow Fiber and Silicone Membrane Oxygenators for Neonates on ECMO. The Journal of The American Society of Extra-Corporeal Technology. Doernbecher Children's Hospital, Oregon Health & Science University, Portland, Oregon. Published in 2007, 4 pages.
Peter M. Andrews, et al, Using Optical Coherence Tomography (OCT) to Evaluate Human Donor Kidneys Prior to and Following Transplantation Nephrology & Therapeutics. Open Access, Published Jan. 27, 2014, 6 pages.
Andreas Laupacis et al, A Study of the quality of life and cost-utility of renal transplantation. Kidney International, vol. 50 ( /996), pp. 235-242, Published on Jan. 22, 1996, 8 pages.
Yannick Le Meur, et al. First-in-human use of a marine oxygen carrier (M101) for organ preservation: a safety and proof-of-principle study. Brief Communication, Published in 2020, 26 pages.
Robert E. Jones, M.D. et al, Bilateral renal artery embolism: A diagnostic and therapeutic problem. Case Reports, published in Charlottesville, VA (J Vasc Surg 1987;5:479-82), 4 pages.
Thomas Minor et al, First-in-man controlled rewarming and normothermic perfusion with cell-free solution of a kidney prior to transplantation. Case Report Published in Germany on Sep. 25, 2019, 5 pages.
Mixed histology abstracts.—Donor Remuzzi Score Coorelates Better With Renal Function Than Kidney Donor Risk Index in an Asian Deceased Donor Population. A. Vathsala, S. Haroon, A. Goh, H. Tiong. National University Centre jor Organ Transplantation, National University Hospital, Singapore, Singapore. Issued on Apr. 8, 2020, 1 page.
Simona C. Baicu, et al, Acid-base buffering in organ preservation solutions as a function of temperature: new parameters for comparing buffer capacity and efficiency. Science Direct Published Charleston, SC on Aug. 13, 2002, 16 pages.
Mohammad M. Faghih et al, Modeling and prediction of flow-induced hemolysis: a review, Review paper published in Germany on Mar. 7, 2019, 37 pages.
Christian J. Lambertsen, Transport of oxygen, carbon dioxide, and inert gases by the blood. MountCastle Medical Physiology p. 1721-1735 1980, 8 pages.
Muhammad Imtiaz Ashraf, et al, Biopsychronology: A Method Using Live Tissue Staining to Image Cell Function in the Kidney. Tim D. Hewitson et al. (eds.), Kidney Research: Experimental Protocols, Methods in Molecular Biology, vol. 1397, Springer Science + Business Media New York published in 2016, 10 pages.
M.L. Nicholson, et al, Renal Transplantation After Ex Vivo Normothermic Perfusion: The First Clinical Study. American Journal of Transplantation 2013; 13: 1093-1252 Wiley Periodicals Inc. Published in Leicester, UK on Jan. 3, 2013, 7 pages.
National Institute of Diabetes and Digestive and Kidney Diseases—2016 Kidney Disease Statistics for the United States. Published in US in 2016, 11 pages.
Ln Nienaber, Evaluation of red blood cell stability during immersion blood warming. Southern African Journal of Anaesthesia and Analgesia. Published Aug. 12, 2014, 6 pages.

(56) References Cited

OTHER PUBLICATIONS

Mark W. Frampton, et al, Nitrogen dioxide exposure: effects on airway and blood cells. Am J Physiol Lung Cell Mol Physiol 282: L155-L165, 2002. Published on Sep. 17, 2001, 11 pages.
Stefan G. Tullius, M.D. et al, Improving the Supply and Quality of Deceased-Donor Organs for Transplantation. The New England Journal of Medicine. Published in Massachusetts on May 17, 2018, 10 Pages.
Patrick Schober et al, From system to organ to cell: oxygenation and perfusion measurement in anesthesia and critical care. Journal of Clinical Monitoring and Computing, published Mar. 22, 2012, 17 pages.
Peter M. Andrews et al, Using Optical Coherence Tomography (OCT) to Evaluate Human Donor Kidneys Prior to and Following Transplantation. Nephrology & Therapeutics. Article published Jan. 2014 Georgetown University, 6 pages.
S. Breiter, Membranes for oxygenators and plasma filters. Biomaterials for Artificial Organs, 2011. Oxygenator, ScienceDirect Published Aug. 5, 2019, 14 pages.
Hessel Peters-Sengers, PhD, et al. Impact of Cold Ischemia Time on Outcomes of Deceased Donor Kidney Transplantation: An Analysis of a National Registry., Kidney Transplantation. Published on Apr. 25, 2019, 11 pages.
Richard Serianni et al, Porcine-specific hemoglobin saturation measurements. J Appl Physiol 94: 561-566, 2003, Published Oct. 18, 2002, 6 pages.
Koen D.W. Hendriks; eta al. Renal temperature reduction progressively favors mitochondrial ROS production over respiration in hypothermic kidney preservation. University of Groningen, Published in 2019, 11 pages.
Bart M. Stubenitsky, et al, Pretransplantation prognostic testing on damaged kidneys during ex vivo warm perfusion. vol. 71, 716-720, No. 6 Published Mar. 27, 2001.
C.S. Pundir, et al, Biosensing methods for determination of creatinine: A review. Biosensors and Bioelectronics, 126 (2019) 707-724, 18 Pages.
Jeremy Puthumana, et al,Urine Interleukin 18 and Lipocalin 2 Are Biomarkers of Acute Tubular Necrosis in Patients With Cirrhosis: A Systematic Review and Meta-analysis published in Clinical Gastroenterology and Hepatology 2017;15:1003-1013, 14 pages.
Giuseppe Remuzzi, M.D. et al, Long-Term Outcome of Renal Transplantation from Older Donors. The New England Journal of Medicine Published 2006;354:343-52, 10 pages.
D. Hoyer S. Swobada Gallinat et al, Subnormothermic Machine Perfusion Improves Preservation of Kidneys from Non-Heart Beating Donors. Am J Transplant. 2013; 13 (suppl 5). https://atcmeetingabstracts.com/abstract/subnormothermic-machine-perfusion-improves-preservation-of-kidneys-from-non-heart-beating-donors/. Accessed Oct. 3, 2023. 3 pages.
Thomas D. Adams, et al, Lowering Perfusate Temperature From 37C to 32C Diminishes Function in a PorcineModel of Ex Vivo Kidney Perfusion. Kidney Transplantation published Feb. 23, 2017, 5 pages.
Saad Hesham, et al, Temperature management in cardiac surgery. Global Cardiology Science & Practice 2013:7 http://dx.doi.org/10.5339/gcsp.2013.7, 19 pages.
Jamshid Salamzadeh, Delayed graft function (DGF) after living donor kidney transplantation: A study of possible explanatory factors Department of Clinical Pharmacy, School of Pharmacy, Shahid Beheshti University of Medical Sciences, Tehran, Iran, Published on Sep. 28, 2012, 8 pages.
T. Zens et al, Is there a difference between DCD and DBD Kidney Transplanatation with simliar KDPI? Surgery, University of Wisconsin, Madison, WI. Am J Transplant. 2016;16 (suppl 3). 5 pages.
Sara Salehi et al, Advances in Perfusion Systems for Solid Organ Preservation. Yale Journal of Biology and Medicine 91 (2018), pp. 301-312.
Sata Y, Head GA, Denton K, May CN and Schlaich MP (2018) Role of the Sympathetic Nervous System and Its Modulation in Renal Hypertension. Front. Med. 5:82. doi: 10.3389/fmed.2018.00082.
Patricia Vega-Martines et al, Some Topics on the Physics of Bubble Dynamics in Beer. Fluid Mechanics Group, Carlos III University of Madrid, 28911 Leganés (Madrid), Spain, Published: Jul. 27, 2017, 13 Pages.
Dominik J. Schaer et al, Hemolysis and free hemoglobin revisited: exploring hemoglobin and hemin scavengers as a novel class of therapeutic proteins. Published in Blood First Edition paper on Dec. 20, 2012, 10.1182/blood-2012-11-451229. 9 pages.
Benno Cardini, M.D et al. Clinical Implementation of Prolonged Liver Preservation and Monitoring through Normothermic Machine Perfusion in Liver Transplantation. Transplantation published in 2020, 45 pages.
Patricia M. Shulte, The effects of temperature on aerobic metabolism: towards a mechanistic understanding of the responses of ectotherms to a changing environment. Published by the Company of Biologists Ltd | The Journal of Experimental Biology (2015) 218, 1856-1866 doi:10.1242/jeb.118851.
John W. Severinghaus, Simple, accurate equations for human blood O2 dissociation computations. J. Appl. Physiol: Respirat. Environ. Exercise Physiol. 46(3):599-602, 1979 revisions, 1999, 2002, 2007.
Y.t. Shah et al, Design parameters estimations for bubble column reactors. Published in Aiche Journal | 10.100 on Aug. 19, 2019, 22 pages.
Sivakkanan Loganthan, Effects of Custodiol-N, a novel organ preservation solution, on ischemia/reperfusion injury. Cardiothoracic Transplantation. Published in the Journal of Thoracic and Cardiovascular Surgery c Apr. 2010, 9 pages.
Steve Siu-Man Wong et al, Venous air embolism related to the use of central catheters revisited: with emphasis on dialysis catheters. Published in Clinical Kidney Journal, 2017, vol. 10, No. 6, 797-803.
F. R Winton (Beit Memorial Medical Research Fellow). The Glomerular pressure in the isolated mammalian kidney. From the Department of Pharmacology, University College, London.612.463.5, 15 pages.
Daniel Stats, Cold Hemagglutination and Cold hemolysis. The hemolysis produced by shaking cold agglutinated erythrocytes. J Clin Invest. 1945;24(1):33-42, Published Apr. 21, 1944, 11 pages.
William S. Haworth, The development of the modern oxygenator. Ann Thorac Surg 2003;76:2216-2219,7 pages.
Gitte Wennecke, Hematocrit—a review of different analytical methods. Radiometer Medical ApS Åkandevej 21 DK-2700 Brønshøj Denmark. Published in 2004, 9 pages.
Annemarie Weißenbacher, MD, PhD et al, Live confocal tissue assessment with SYTO®16/PI und WGA staining visualizes acute organ damage and predicts delayed graft function in kidney transplantation. Published in Austria, 63 pages.
Vogel T et al, Successful transplantation of porcine liver grafts following 48-hour normothermic preservation. Published in PLoS One 12(11): e0188494. journal.pone.0188494 on Nov. 27, 2017, 15 pages.
Sonja J. Wakelin et al, The incidence and importance of bacterial contaminants of cadaveric renal perfusion fluid. Published in Transpl Int (2005) 17: 680-686 on Nov. 24, 2004, 7 pages.
Jeffrey H. Wang et al, Current Status of Kidney Transplant Outcomes: Dying to Survive. Published by Elsevier Inc. on behalf of the National Kidney Foundation, Inc. 1548-5595, Jul. 1, 2016, 6 pages.
Oscar Swift et al, Haemodialysis, Chronic Kidney Disease. Published in Elsevier Ltd in 2019, 7 pages.
Michael Taraseve, PhD et al, RBC Mechanical Fragility as a Direct Blood Quality Metric to Supplement Storage Time. Published in Military Medicine, vol. 180, March Supplement 2015, 8 pages.
D. E. Stewart et al, Measuring and monitoring equity in access to deceased donor kidney transplantation. Published in Am J Transplant. 2018;18:1924-1935.
Sumit Mohan, MD, et al, Factors leading to the discard of deceased donor kidneys in the United States. Published in Kidney Int. Jul. 2018 ; 94(1): 187-198. Feb. 16, 2018. 25 pages.
Sunjae Bae et al, Changes in discard rate after the introduction of the Kidney Donor Profile Index (KDPI) Published in Am J Transplant. Jul. 2016 ; 16(7): 2202-2207. doi: 10.1111/ajt.13769, 15 pages.
S. Takatani et al, Optical Sensor for Hemoglobin Content and Oxygen Saturation. vol. XXXIV Trans Am Soc Artif Intern Organs 1988, 5 pages.

(56) References Cited

OTHER PUBLICATIONS

Tatiana Panasyuk-Delaney et al, Capacitive Creatinine Sensor Based on a Photografted Molecularly Imprinted Polymer. University of Regensburg, Institute of Analytical Chemistry, Chemo- and Biosensors, D-93040 Regensburg, Germany Published on May 2, 2001, 4 pages.

Wai H. Lim, Mbbs, et al, Association Between Delayed Graft Function and Graft Loss in Donation After Cardiac Death Kidney Transplants—A Paired Kidney Registry Analysis. Wai H Lim, Department of Renal Medicine, Sir Charles Gairdner Hospital, Perth, Western Australia, Australia 6009 ).Copyright 2016 Wolters Kluwer Health, Inc. All rights reserved, 5 pages.

B.I Mclaughlin et al, Electrical and optical spectroscopy for quantitative screening of hepatic steatosis in donor livers. Physics in Medicine and Biology, Published on Nov. 3, 2010, 13 pages.

Noam Saul Lighthouse, Design of a Bioreactor to Mimic Hemodynamic Shear Stresses on Endothelial Cells in Microfluidic Systems. Master's of Applied Science Graduate Department of Mechanical and Industrial Engineering and the Institute of Biomaterials and Biomedical Engineering University of Toronto 2014, 386 pages.

Tetyana L. Delaney et al, Capacitive Detection in Ultrathin Chemosensors Prepared by Molecularly Imprinted Grafting Photopolymerization. Published in Anal. Chem. 2007, 79, 3220-3225, 6 pages.

Thomas M.Suszynski et al, Persufflation (or Gaseous Oxygen Perfusion) as a Method of Organ Preservation. HHS Public Access published on Jun. 17, 2019, 23 pages.

* cited by examiner

20004

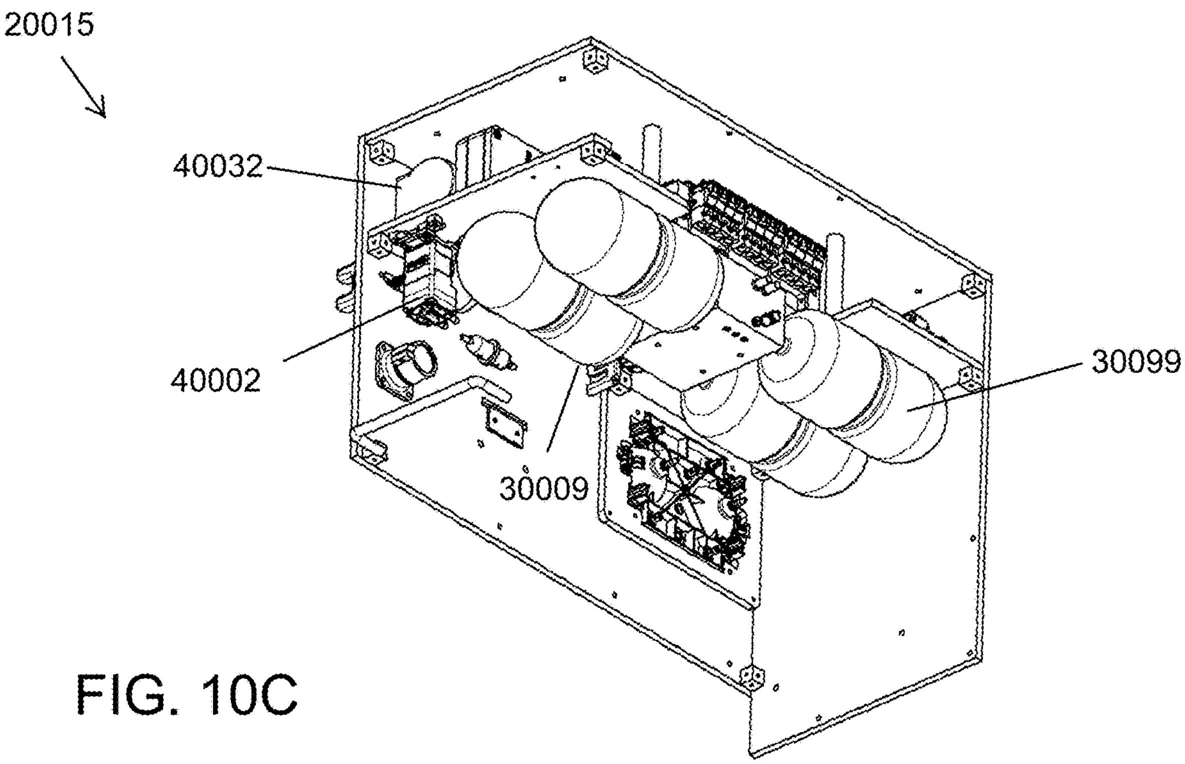
FIG. 10C
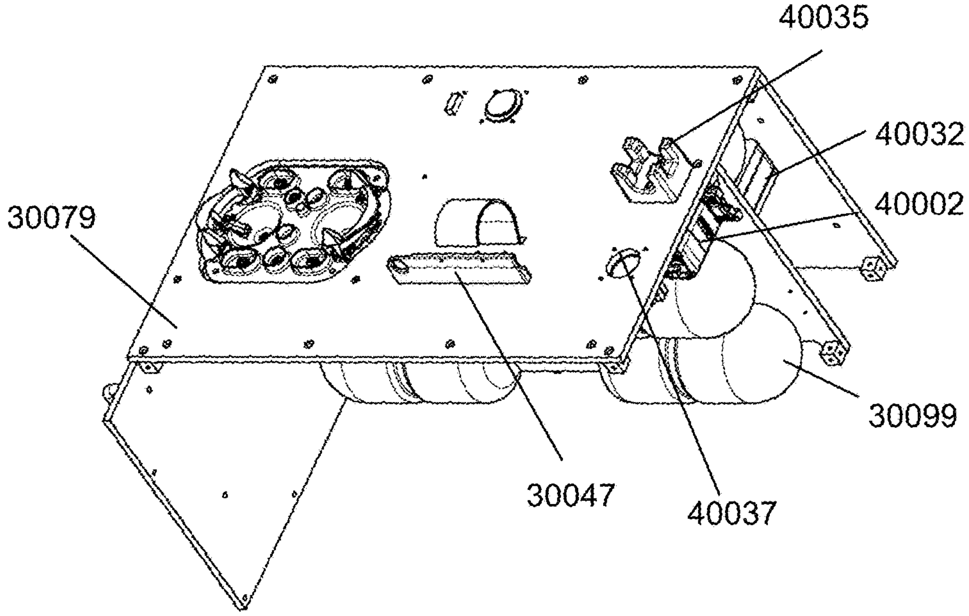

SYSTEM AND METHOD FOR ORGAN MAINTENANCE AND TRANSPORT

CROSS REFERENCE TO RELATED APPLICATIONS

This utility patent application claims the benefit of U.S. Provisional Patent Application Ser. No. 62/979,144 filed Feb. 20, 2020, entitled System and Method for Kidney Transport, which is incorporated herein by reference in its entirety.

BACKGROUND

The present disclosure pertains to maintenance of a harvested organ for a transplant recipient. Many types of organs are harvested from organ donors, the most common being the kidney. In 2018, over 700,000 patients per year in the United States and an estimated 2 million patients worldwide were affected by end stage renal disease (ESRD). The primary treatments for ESRD are dialysis and kidney transplant. In the United States, an overwhelming percentage of people with ESRD are on dialysis, with a small fraction living with transplants. In general, patients on dialysis have a lower life expectancy and worse quality of life than patients receiving a kidney transplant. Patients experiencing dialysis treatment who might like a transplant instead have to get in a line that is five times larger than the number of available donor kidneys. Most transplanted kidneys come from deceased donors, but a large number of the available kidneys must be discarded. Deceased donor kidneys have several challenges: (1) higher rates of delayed graft function (DGF) post-transplant, higher sensitivity to cold induced injury, and lower long term graft survival rates. Cold storage of an organ for transport, while logistically effective, can injure the organ, but assessing organ health, particularly when the organ is cold and not metabolically active, can be a challenge. The result of the cold storage cycle (warm-cold-warm) can be a chain reaction of $O_2$ deficiency that can result in ischemic injury. The initial effects of such injury can include delayed graft function, and there can be a long-term effect on kidney function. Current methods of kidney screening can be flawed and may not provide direct measures of kidney health. When a kidney is considered possibly marginal, the kidney assessment system is biased towards discard. As a result, a large number of donated organs (3,500 in the United States alone) are discarded each year. Studies have found that a sizable fraction of these discards could have been transplanted with resulting favorable outcomes for the patients. A thorough quantitative ex vivo assessment of the organ is critical for reducing discard rate. Ex vivo organ assessment can remove dependency upon donor scoring, and provide a real-time measurement of kidney heath, which can ease the mind of risk-averse doctors. Other future options can include immunomodulatory drugs that can make donor matching matter less, gene therapy to treat kidneys in vivo, kidney tissue engineering, and tissue transplantation. Still further options include normothermic/subnormothermic perfusion which is likely to extend preservation time, enable real time organ diagnostics, and eliminate cold-induced injury. Preservation techniques such as ex vivo normothermic machine perfusion (NMP) can be used to resuscitate and assess the quality of the kidney before transplantation before committing the recipient to surgery, and has been used to revive a discard kidney. Normothermic or subnormothermic perfusion results in a metabolically active kidney, which enables assessment.

What is needed is a system designed to reduce the number of discarded organs. What is needed is a system that can maintain a pre-selected oxygen level in circulating perfusate and/or that can constantly monitor the organ and dynamically adjust the desired oxygen level, possibly during transport from the donor to the transplant recipient. The system must be designed to provide the necessary nutrients to the organ to maintain its vitality, even during transport, which could last for, for example, 24 hours. The system must be designed to sense a sufficient range of characteristics to help medical personnel decide whether or not the organ is viable, for example, but not limited to glucose and pH. A successful organ transport system could provide medical personnel with quantitative measures of organ health, enable reconditioning of the organ to optimize its performance prior to implant, limit acute injury to the organ that can occur during organ transport, and enable ex vivo treatment of the organ, for example, but not limited to, pharmacologic and gene therapy. What is further needed is a system that achieves low hemolysis and maintains desired characteristics of the organ. What is needed is a normothermic/subnormothermic organ perfusion device with onboard sensors to assess kidney health in real time.

SUMMARY

In accordance with some configurations, the present teachings include a system and method for normothermic kidney perfusion. Normothermic perfusion can extend preservation time, enable real time kidney diagnostics, and eliminate cold induced injury. In the system of the present teachings, the kidney can be perfused in a tank that can be configured to be portable or stationary.

The portable tank can be free-standing, detached from wall power and supporting equipment, and configured to operate without external power for a relatively extended duration, for example, but not limited to, 24 hours. Infusions can be brought into the tank, and the kidney can be bathed in, possibly among other components, the fluid that exits the kidney renal vein as the kidney is being perfused. The perfusion and infusions can include repeatably successful processes managed by a controller receiving feedback from sensors situated, for example, but not limited to, in-line in the perfusion circuit and in the solution bath. The system and method can increase the number of successful kidney transplants, improve patient health, and enable advancement in kidney transplant clinical techniques. The system and method for kidney perfusion can provide surgeons with quantitative measures of kidney health, enable reconditioning of kidneys prior to implant to optimize performance of the kidney after implant, limit acute kidney injury that can occur during kidney transport, and enable ex vivo treatment of kidneys, for example, but not limited to, pharmacologic and gene therapy. The system and method can enable marginal kidneys to be rehabilitated and made to qualify as a possible transplant candidates. The system and method can enable the quantification of a kidney's health.

The method of the present teachings can include, but is not limited to including, placing the kidney into a tank. The tank can trap air and can prevent recirculating bubbles. The tank can allow volume to change within the tank, which can limit the exposure to the kidneys of vacuum pressure from the perfusion system, enabling circulation through the kidney. The method can include connecting the kidney artery to the perfusion system, and connecting the ureter to a drain line. The perfusate pumped into the kidney artery can escape, at least in part, through the renal vein and can flow into the tank. The perfusion system can supply near-physiological pressures, for example, 90 mmHg. In some configurations, pressures of up to 200 mmHg and flow rates of up to 500 mL/min can be accommodated in the method of the present teachings. Perfusate can be recirculated from the tank back into the kidney artery. The perfusate can include, but is not limited to including, oxygen carriers such as, for example, but not limited to, perfluorocarbons, hemoglobin-based fluids, and sea worm hemoglobin-based fluids. Hemoglobin-based oxygen carriers can include infusible oxygen-carrying fluids prepared from purified human or animal hemoglobin. Sea worm hemoglobin-based fluids can add density and viscosity to the perfusate. The perfusate can include a combination of electrolytes, sugars, vitamins, and pH buffer. The method can include monitoring and regulating the temperature of the perfusate prior to pumping the perfusate into the kidney. In some configurations, the temperature can be regulated to room temperature. In some configurations, the temperature can be regulated to body temperature. In some configurations, the temperature can be regulated to a range of 3-42° C. Normal kidney handling procedures in the system and through the method of the present teachings can protect the kidney from extreme temperatures over an extended period of time. When maintaining the kidney at a hypothermic level, the target temperature can include the range of 3-10° C. When maintaining the kidney at a sub-normothermic level, the target temperature can include the range of 18.5-25.5° C. When maintaining the kidney at a normothermic level, the target temperature can include the range of 32-42° C.

The method can include pumping air into an oxygenator which can extract oxygen from the air, and supplying the oxygen to the perfusate. Target ranges for dissolved oxygen can include 74-100 mmHg arterial and 30-40 mmHg venous. The oxygenated perfusate can enable $CO_2$ generated in the kidney to escape. The target range of $CO_2$ can include 23-29 mmol/L. The method can include replenishing of fluids, salts, nutrients, and other biological compounds necessary to maintain kidney health. In some configurations, an infusion pump can be used to provide the replenishment of fluids into solution bath 125 at a flow rate of 1-20 mL/min. The method can include monitoring the vitality of the kidney through monitoring the status of, for example, but not limited to, renal resistance changes (pressure/flow), oxygen consumption, and pH. Monitoring of kidney characteristics can provide an indication of the health of the kidney.

In some configurations, the replenishment ingredients can include, for example, but not limited to, a single infusion solution of plasmalyte, with 0.026 g/mL of dextran, a complex polysaccharide derived from the condensation of glucose. During replenishment, the method can include maintaining a target glucose range of 170-180 mg/dL, and a basal flow of 10 mL every 15 minutes. These targets, if met, can deliver 25 g of Dextran/day, and 960 mL of perfusate replenishment. The method can include adjusting the time between doses to achieve the target. Depending upon the sensed glucose reading, insulin can be added.

In some configurations, the replenishment ingredients can include, for example, but not limited to, two infusion solutions. The infusion solutions can include, but are not limited to including, a plasmalyte/dextran solution, and a buffer solution. The plasmalyte/glucose solution can include plasmalyte with 0.026 g/mL dextran. The buffer can be used to regulate the pH of the perfusate. Target pH can include the range of 6.9-7.9. In some configurations, the method can include flushing the kidney with a high-flow, low-potassium preservation solution. In some configurations, the method can include reperfusing the kidney and monitoring the characteristics of the kidney to determine if the infusion is maintaining the viability of the kidney.

In some configurations, maintaining the kidney at a desired temperature can include selecting a temperature regulation option that meets weight, heat load, and size requirements. Possible options can include, but are not limited to including, carnot, phase change, and thermoelectric systems. In some configurations, the heat load is 10-20 W to maintain a 20° difference in temperature between the environment and the kidney, and smaller if the kidney is maintained at subnormothermic temperatures. For heat loads on the higher side of 10-20 W range, carnot systems can be selected. For systems in which the size of the battery could be important, thermoelectric systems can be selected because they can be scaled. When the kidney enclosure is to be placed in an enclosed area, phase change material systems can be selected because they don't require transfer of heat to/from the surrounding environment. Maintaining the kidney at a desired temperature can include selecting appropriate insulation. In some configurations, vacuum panels, aerogels, and/or closed-cell rigid insulation systems can be selected.

In other configurations, the system of the present teachings can include a pump subsystem that can enable organ perfusion, perfusate recirculation, and possibly infusion. The pump subsystem can pump perfusate, for example blood, through the organ. The blood can include whole blood or packed red blood cells, for example. In some configurations, the pump subsystem can enable perfusate flow at a rate of up to 500 ml/min at a pressure of 20-120 mmHg. Flow can optionally be pulsatile, and the rate can be adjustable. As an example, a low flow rate can be required for a damaged kidney. As kidney function improves, the flow rate can be adjusted to accommodate the changed conditions. Pulsatile flow or a flow rate controlled by physiological parameters can both be accommodated by the pumps of the present teachings. Types of pumps can include centrifugal pumps and direct acting pneumatic pumps. Centrifugal pumps can enable portability and maintenance of physiological conditions. Direct acting pneumatic pumps can be used in tandem to supply a more continuous flow of blood. Direct acting pneumatic pumps can include active inlet and outlet valves so that flow in a blood flow circuit can be highly controlled. Kidneys, for example, can tolerate a flow rate of 200-500 mL/min flow rate. Adjusting the flow rate can accommodate any inherent equipment variations at start-up, for example. One goal of pump choice is to reduce hemolysis. Direct acting pneumatic pumps can enable minimal hemolysis and flow metering for wetted materials. It can be possible to modify the pumping cycle of direct acting pneumatic to match physiological pulsatile pressure duty cycles.

In some configurations, the pump is direct acting, where compressed air (or vacuum) is used to push/pull a membrane against fluid. A set of valves controls where the pumping pod is connected, allowing a fill from the inlet and push to the outlet. In some configurations, there are two pumping pods. At the start of each stroke, one fills and one delivers. A new stroke is not completed until the sequence is complete. Partial strokes are possible to, for example, mitigate hemolysis. The pumps control the nominal pressure in the pumping pod by throttling the supply valves. The result is a saw tooth pressure instead of a time graph. In pump pressure control mode the fill/deliver nominal pumping pod pressure can be adjusted. Higher pressures (or vacuum) will result in faster filling or delivery times. The pump can provide smooth/ consistent flow, and pulsatile flow. In some configurations, the system can include multiple controllers, for example a valve controller, a pumping chamber controller, and a pump controller. The system of the present teachings can exchange the majority of perfusate volume which maintaining perfusion.

The role of the perfusion loop is to provide basic biological functions that would otherwise take place in the body. These include oxygenation, nutrient supply, and removal of carbon dioxide. Oxygenation and removal of carbon dioxide are conducted through the use of a steady state membrane oxygenator. The perfusion fluid leaves the kidney, is passed through an oxygenator, and is then pumped back into the kidney. Nutrients are suppled in the perfusion solution and can be added manually or through the use of infusions. Urine generated by the kidney will flow out of the ureter and will be available for sampling through sterile sample ports. Urine is then directed back into the perfusion loop. Urine flow rates and volumes are measured and stored by the system. In the event that recirculating urine proves to be a challenge, the system can be modified such that the urine is collected or potentially passed through a dialysis loop.

The recirculation loop acts like a maintenance loop for the system allowing for filling or draining of the kidney tank and recirculation of the fluid from the tank, essentially stirring the tank. This loop can include the infusion pumps so that infusions can be delivered, diluted, and mixed into the perfusate instead of being passed directly into the kidney. Some or all of the infusion pumps can be made part of to the perfusion loop. In some configurations, the system can include a bypass valve that can be opened during priming when bubbles are detected. To introduce new blood or drain the system, the system can include at least one pinch valve associated with the infusion path. In some configurations, a pinch valve can be associated with incoming perfusate, while another pinch valve can be associated with a drain path. The perfusate pump can also drain the tissue enclosure.

The flow rate and pressure of the perfusion pump as it pumps blood into the oxygenator can be regulated so that flow rate and pressure going into the kidney are regulated. The resistance of the kidney will change over time as it achieves better health, and the pressure of the pumped perfusate needs to accommodate the kidney's needs. Overpressuring the fluid line can cause lysing.

Blood perfusion pumps can include, but are not limited to including, roller, centrifugal, pulsatile, and nonocclusive roller. A pump that can enable the perfusion of the system of the present teachings can deliver physiologic blood flows against high resistance without damaging blood, provides flows that are exact and easily monitored, creates no turbulence or stagnation, and can be manually operable in the event of a power failure. In some configurations, extracorporeal membrane oxygenation (ECMO)-type devices with silicone membrane contactors can be used to perfuse and oxygenate the blood in the system.

In some configurations, a low bolus, high accuracy infusion pump can be used to enable clinical infusions such as prescription vasodilators or insulin. In some configurations, multiple infusion pumps can be used to enable multiple different substances to be infused, possibly simultaneously. In some configurations, the pump reservoir is 3 mL, the pump can accommodate an infusion rate of 0.5-300.0 μL/hr, can accommodate an infusion volume of 0.5-250.0 μL, and can infuse into a recirculation loop that feeds into the organ enclosure.

The system can include sensor to enable adequate perfusion and collect data for kidney assessment. The system can include sterile sample ports for removing urine and perfusate fluids using a sterile syringe. The system of the present teachings includes sensors that are out of the fluid path as well as sensors that are in the fluid path. The system can include pressure sensors on tubing exiting the tissue enclosure and exiting the heat exchanger. The membrane between the heat exchange channels and the thermal control pad can include a pressure sensor. The membrane can be of rubber material, for example. The system can include an air trap in which air bubbles float to the top of the incoming perfusate, and fluid can exit from the non-air section of the air trap. The system can include a flow/drip sensor to measure urine that is collected from the cannulated urethra.

The system of the present teachings controls the temperature of the perfusate through a heat exchanger. The heat exchanger includes a serpentine flowpath that rests upon a thermally-conductive and reflective membrane. In some configurations, the thermal control plate includes cartridge elements for active control of the temperature of the perfusate. The system includes temperature sensors that sense the temperature of the perfusate as it enters and exits the serpentine path. Active control of the temperature can maintain the 37° C. temperature needed for kidney perfusion. The number and size of the cartridge elements is based on at least on the characteristics needed to maintain uniform distribution across the serpentine path. The size of the thermal control plate is dictated by the number and size of the cartridges. The width of the serpentine channels is based on the need to maintain adequate surface area inside the channels, to avoid stagnation, to avoid extreme pressure, and to maintain uniform heat transfer. The geometry of the serpentine channels can be important to prevent stagnation. In some configurations, a camera can be scaled to look at a macro view of the organ, possibly through a window in the tissue enclosure. In some configurations, the camera can take time lapse photographs, snapshots, and videos.

The system of the present teachings for enabling sustained normothermic or subnormothermic perfusion of an organ with perfusate can include, but is not limited to including, a tissue enclosure having a platform and a fluid reservoir, the platform having a height, the fluid reservoir having a fluid level, the fluid level being lower the height, the organ being positioned on the platform. The system can include a gas management subsystem adjusting gas saturation in the perfusate, a thermal management subsystem adjusting temperature of the perfusate according to a pre-selected threshold, the pre-selected threshold being normothermic or subnormothermic, and a perfusion subsystem circulating perfusate through the organ, the gas management system, and the thermal management subsystem, the perfusate enabling sustained normothermic or subnormothermic conditions for the organ. The system can optionally include an output management subsystem measuring output from the organ, a gas trap removing gas from the perfusate, a sensor subsystem monitoring characteristics of the perfusate and/or the fluid reservoir, an infusion subsystem introducing additives to the perfusate and/or the fluid reservoir. The infusion subsystem can optionally include at least one perfusion pump. The perfusion subsystem can optionally include at least one perfusion pump enabling low hemolysis. The gas management subsystem can optionally include at least one oxygenator supplying oxygen to the perfusate and managing carbon dioxide levels, and at least one gas supplying device providing at least one gas to the perfusate. The at least one gas can optionally include oxygen, nitrogen, and carbon dioxide. The thermal management subsystem can optionally include a thermal exchanger. The thermal exchanger can optionally include a source of thermal energy, a surface having at least one channel holding the perfusate, a membrane covering the surface and conducting thermal energy from the source through the membrane to the perfusate, and a thermal transfer plate between the membrane and the source.

The system can optionally include a first of at least one thermal sensor monitoring a perfusate temperature of the perfusate before the perfusate enters the thermal management subsystem, a second of the at least one thermal sensor monitoring the perfusate temperature of the perfusate after the perfusate exits the thermal management subsystem, and a third of the at least one thermal sensor monitoring the perfusate temperature of the perfusate in the fluid reservoir. The system can optionally include a first of at least one oxygen saturation sensor monitoring oxygen saturation of the perfusate before the perfusate enters the organ, and a second of the at least one oxygen saturation sensor monitoring the oxygen saturation of the perfusate leaving the fluid reservoir. The system can optionally include at least one pH sensor monitoring pH of the perfusate in the fluid reservoir, and at least one dissolved oxygen sensor monitoring dissolved oxygen of the perfusate in the fluid reservoir. The system can optionally include a first of at least one pressure sensor monitoring pressure of the perfusate before the perfusate enters the gas management subsystem, and a second of the at least one pressure sensor monitoring the pressure of the perfusate before the perfusate enters the organ.

The system of the present teachings for enabling sustained normothermic or subnormothermic perfusion of an organ with perfusate can include, but is not limited to including, a tissue enclosure having a fluid reservoir, the tissue enclosure holding the organ, a gas management subsystem adjusting gas saturation in the perfusate, a thermal management subsystem adjusting temperature of the perfusate according to a pre-selected threshold, the pre-selected threshold being normothermic or subnormothermic, and a perfusion subsystem circulating perfusate through the organ, the gas management subsystem, and the thermal management subsystem, the perfusate enabling sustained normothermic or subnormothermic conditions for the organ, a pneumatic subsystem driving the perfusion subsystem to pump the perfusate, and a controls subsystem controlling the pneumatic subsystem, the thermal management subsystem, and the gas management subsystem. The system can optionally include an output management subsystem measuring output from the organ, a gas trap removing gas from the perfusate, and a sensor subsystem monitoring characteristics of the perfusate, the sensor subsystem collecting sensor data. The system can optionally include a data processor receiving the sensor data and providing the sensor data to the controls subsystem which controls the thermal management subsystem based at least on the sensor data, a data processor receiving the sensor data, the data processor providing the sensor data to the controls subsystem, the controls subsystem controlling the pneumatic subsystem based at least on the sensor data. The system can optionally include a data processor receiving the sensor data, the data processor providing the sensor data to the controls subsystem, the controls subsystem controlling the gas management subsystem based at least on the sensor data, and an infusion subsystem introducing additives to the perfusate.

The gas management system can optionally include a disposable oxygenator. The thermal management subsystem can optionally include a disposable heat exchanger, a disposable thermally-conductive membrane; and a durable thermal energy source. The perfusion subsystem can optionally include at least one disposable pump pumping the perfusate through the organ, and at least one durable pump interface coupling the at least one disposable pump with the pneumatic subsystem. The pneumatic subsystem can optionally include at least one durable valve, at least one durable chamber, at least one durable pressure source, and at least one durable vacuum source.

The system of the present teachings for enabling sustained normothermic or subnormothermic perfusion of an organ with perfusate, the system can include, but is not limited to including, a disposable portion including disposable components and tubing coupling the disposable components together to form a circulation loop enabling circulation of the perfusate through the organ, and a durable portion including a pneumatic system driving the circulation of the perfusate, a thermal energy source supplying thermal energy to the perfusate to maintain the circulating perfusate at normothermic or subnormothermic temperatures, and a control system controlling the pneumatic system and the thermal energy source. The disposable portion can optionally include a heat exchanger transferring heat from the thermal energy source to the perfusate. The heat exchanger can optionally include a plate having a first side etched with a fluid path and a second opposing side, the second opposing side positioned against a tissue enclosure, the tissue enclosure housing the organ, and a thermally-conductive membrane having a first membrane side covering the first side, the thermally-conductive membrane having a second opposing membrane side positioned against the thermal energy source. The disposable portion can optionally include an oxygenator providing oxygen to the perfusate, at least one pump pumping the perfusate through the organ, the pneumatic system driving the at least one pump, at least one pump infusing substances into the perfusate, at least one output management system measuring output from the organ, and a gas trap removing gas from the perfusate. The durable portion can optionally include at least one sensor providing sensor data monitoring the organ, and at least one data processor receiving and processing the sensor data, the at least one data processor providing the processed sensor data to the control system, the control system controlling the pneumatic system and the thermal energy source based at least on the processed sensor data.

BRIEF DESCRIPTION OF THE DRAWINGS

The foregoing features of the disclosure will be more readily understood by reference to the following description, taken with reference to the accompanying drawings, in which:

FIGS. 10A-10C are perspective diagrams of views of the second implementation of the system of the present teachings;

DETAILED DESCRIPTION

The system of the present teachings for providing normathermic kidney transport with thermal control can include a tank enclosure to house the kidney and a circulation system. The tank enclosure and the circulation system can be thermally controlled. In some configurations, the tank can be insulated. The circulation system can provide oxygenated perfusate to the kidney and can enable continuous monitoring of the perfusate moving through the kidney. The tank can provide an inlet that can accept selected infusible materials, and an outlet that can enable sampling and waste removal. The system can continually monitor the solution bath in which the kidney is bathed, and the system can manage the composition of the gas in the tank.

Figure 1:
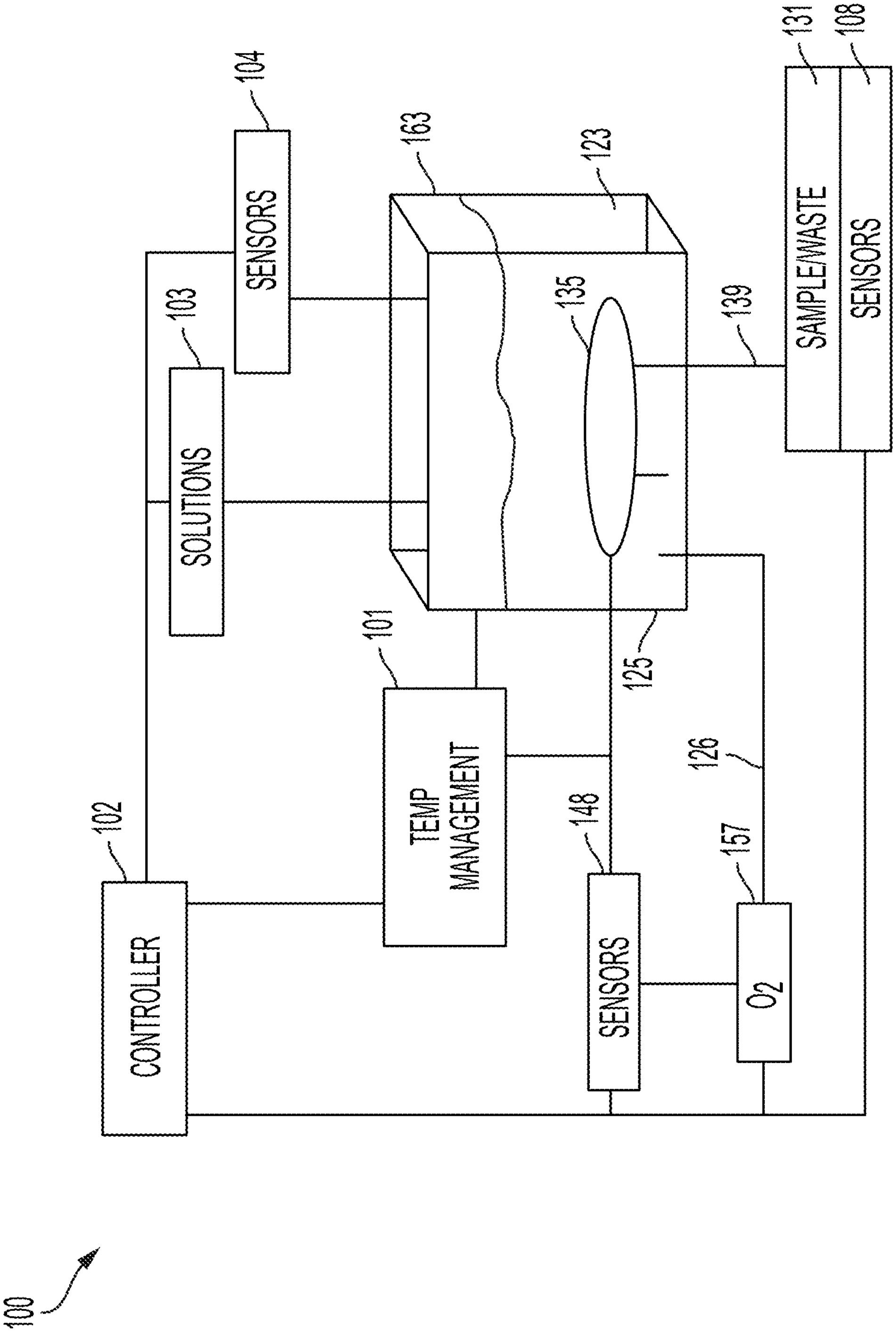
FIG. 1 is a schematic block diagram of the system of the present teachings.

Referring now to FIG. 1, system 100 can include, but is not limited to including, tank 123, oxygen source 157, sample/waste container 131, infusible solution(s) 103, circulation monitor sensor(s) 148, tank monitor sensors 104, temperature management subsystem 101, and controller 102. Tank 123 can be sized to accommodate kidney 135 to be transplanted, solution bath 125 that can bathe kidney 135, and gas 163 atop solution bath 125. In some configurations, tank 123 can be constructed of transparent sides to enable visual monitoring of kidney 135. Oxygen source 157 can provide dissolved oxygen to perfusate in circulation route 126.

Figure 2:
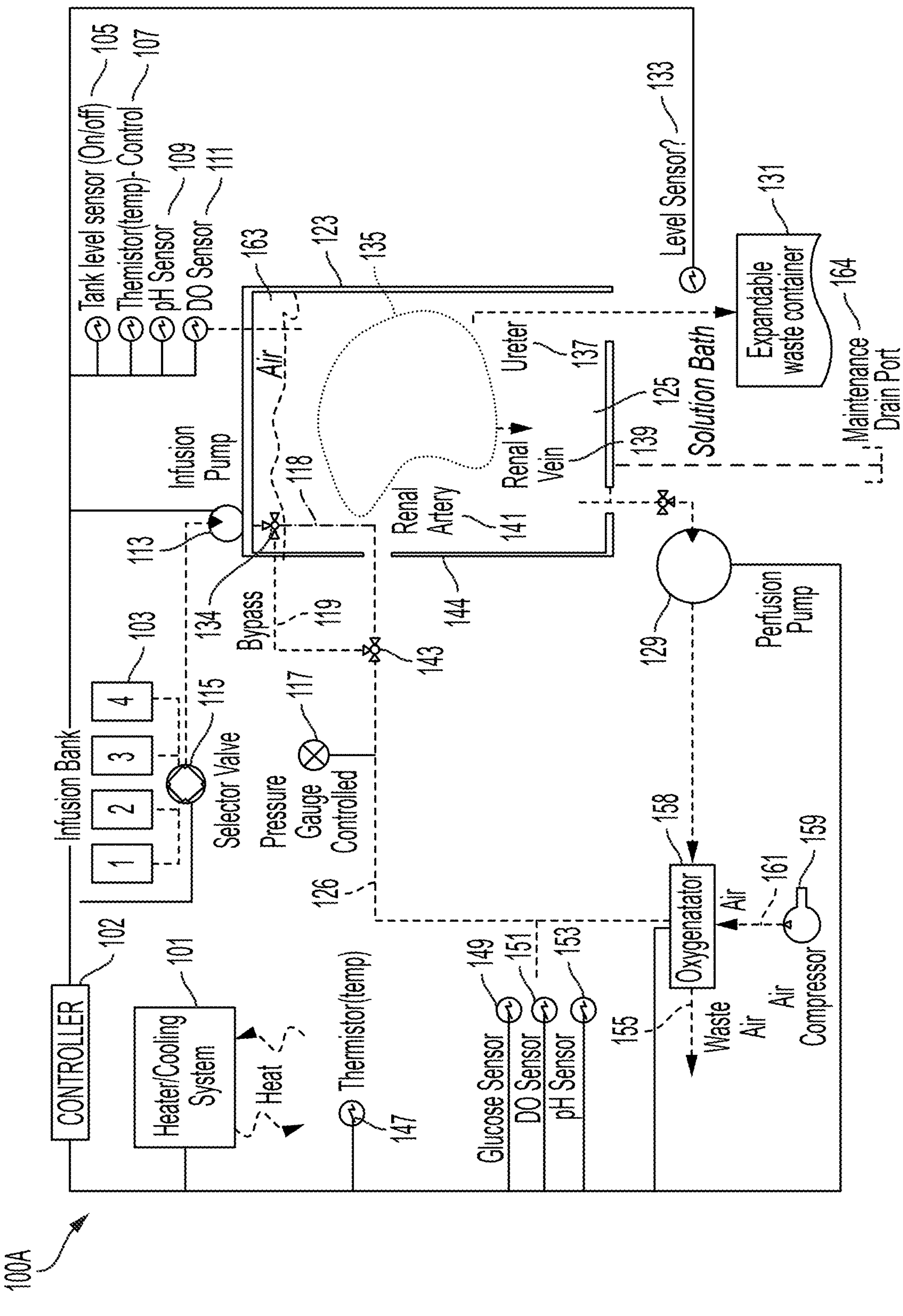
FIG. 2 is a pictorial representation of a first configuration of the system of the present teachings.

Referring now to FIG. 2, system 100A provides a first configuration of system 100. In system 100A, renal artery 141 can receive perfusate through circulation route 126 into kidney 135, and kidney 135 can process the perfusate and expel processed perfusate through renal vein 139 and ureter 137. Renal vein 139 can provide the processed perfusate to solution bath 125. Perfusion pump 129 can pump the perfusate from solution bath 125 to circulation route 126. The pressure exerted by perfusion pump 129 can be monitored by controller 102 as it receives data from pressure gauge 117. Controller 102 can adjust the pressure on the perfusate in circulation route 126 to a desired pressure based at least on the data gathered by pressure gauge 117.

Continuing to refer to FIG. 2, circulation route 126 can enable the movement of perfusate into kidney 135, through kidney into tank 123, from tank 123 past circulation monitor sensor(s) 148 and temperature management 101 back into tank 123 and kidney 135. Perfusion pump 129 can pump perfusate through kidney 135 to simulate what would normally occur in the body. The perfusate can provide kidney 135 with oxygen, remove $CO_2$, remove waste products, supply chemical buffers, and create a near physiologically-correct chemical condition for kidney 135. Perfusate entering kidney 135 can be held at a controlled pressure to ensure that kidney 135 experiences both desired total pressure and/or desired chemical gradients. The upper limit for pressure can be set by physiological boundaries, for example, too much pressure can result in barotrauma to the kidney, or edema can occur the temperature is hypothermic if the pressure is above 30-40 mmHg. Choice of the type of perfusion pump 129 can be based on the type of perfusate. Possible perfusate solutions and ingredients can include, but are not limited to, blood or packed red blood cells, conventional organ storage solutions, for example, but not limited to, KPS-1, HTK, and UW, plasma substitutes, for example, but not limited to, plasmalyte, ringer solution, and sterefundin, pH buffers, amino acids, cell media, for example, but not limited to, DMEM and growth factors, sugars, electrolytes, pharmaceuticals, for example, but not limited to, heparin, vasodilators, antibiotics, and antifungals, hemoglobin extract, for example, but not limited to, $HbO_2$ therapeutics and hemarina, perflourocarbon oxygen carriers, for example, but not limited to, perfluorodecalin, and vasodilators. Some solutions (such as blood based solutions) can require low shear conditions to minimize hemolysis. Additionally, the mechanical properties of the perfusate, such as a density and viscosity, can dictate pump requirements.

Continuing to refer to FIG. 2, since physiological pressure is not constant, the geometry of perfusion pump 129 and/or the process by which perfusion pump 129 is controlled can be tailored to create a pressure profile near physiological conditions. For example, the size and shape of a direct acting pumping chamber can be customized, the occlusion of a peristaltic pump can be varied by altering the radial position of the rollers, a dual pump head and blending the timing of the pump strokes can be used, the timing of pump strokes can be varied, and the size of a pumping chamber can be changed. Types of perfusion pump can include, but are not limited to including, peristaltic, rotary vane, rotary piston, and direct acting pneumatic pumps. The latter can be useful if low shear conditions are needed.

Continuing to refer to FIG. 2, tank monitor sensor(s) 104 (see FIG. 1) can monitor characteristics of solution bath 125 and enable the addition of solutions 103 to adjust the characteristics of solution bath 125. Sensors such as, for example, but not limited to, tank level 105, tank thermistor 107, pH 109, and dissolved oxygen 111, can monitor solution bath 125. Controller 102 can adjust characteristics of solution bath 125 based at least on the sensed data. The vitality of kidney 135 can be monitored by kidney sensor(s)

108 (see FIG. 1) that can test urine in sample/waste container 131. Controller 102 can receive data from kidney sensor(s) 108, circulation monitor sensor(s) 148 (see FIG. 1), and tank monitor sensors 104, and can evaluate whether to modify the characteristics of solution bath 125 to maintain the desired vitality of kidney 135. Controller 102 can report the actual status of kidney 135.

Continuing to refer to FIG. 2, the perfusate can be exposed to oxygenation and temperature management as it progresses along circulation route 126. The role of the oxygenator is to act as lungs would in the body, supplying oxygen and removing $CO_2$ from the recirculating perfusion fluid. Air compressor 159 can operate with oxygenator 158 in a way that can be similar to interaction between the human body's diaphragm and lungs by drawing fresh air into the system. Portable systems can include portable air compressors. Non-portable systems can connect to in-house oxygen supplies, and possibly have no need for oxygenator 158 or air compressor 159. Air entering the system can be filtered to remove particulates, bacteria/mold, and toxic fumes, for example, but not limited to, paint fumes and automotive exhaust. Filters can include, but are not limited to including, particulate filters, sterile filters, and activated carbon filters. In some configurations, oxygenator 158 can extract oxygen from air provided by air compressor 159, and can provide oxygen to the circulating perfusate when controller 102 discovers, from sensor data gathered by dissolved oxygen sensor 151, that the circulating perfusate measures below a desired dissolved oxygen level. In some configurations, air compressor 159 can provide air to oxygenator 158 through pneumatic tube 161. Oxygenator 158 can expel waste air 155 when necessary. Types of oxygenators that can meet the needs of the system and method of the present teachings can include a silicone membrane oxygenator, a bubbler type system, and an "air lift" oxygenation loop. An extracorporeal membrane oxygenation treatment can be used to circulate perfusate through kidney 135. In the air lift oxygenation loop, air is introduced through a sparger at the bottom of a fluid column, the air bubbles displace fluid and push fluid up that then pours into tank 123 and recirculates out of drain port 164 back into the column, hence creating an independent oxygenation loop. In some configurations, the air lift can be integrated with tank 123, and the bubble resonance time of the column can be increased by, for example, but not limited to, smaller bubble size and inducing a longer flow path.

Continuing to refer to FIG. 2, in some configurations, air can be prevented from entering kidney 135. Bubbles of air within kidney 135 can inhibit flow, which in turn can limit the performance of physiological tasks such as, for example, but not limited to, supplying oxygen or removing $CO_2$. An air trap can prevent air from entering kidney 135. The air trap can be embodied in a variety of physical forms and can be a passive or active component. In some configurations, the air trap can include a tank with an inlet that is not in direct line with an outlet from the tank, and in which air bubbles are allowed to rise to the top of the tank. In some configurations, venturis or centrifugal force can be used to draw bubbles out of the solution, or degassing chambers can create perturbations or other conditions unfavorable for entrained bubbles to remain in the perfusate. Bubble detectors, for example, but not limited to, optical and ultrasonic sensors, can detect bubbles in the perfusate. Controller 102 can redirect the perfusate, through control of valve 143, to bypass kidney 135 until the bubble trap collects the entrained bubbles. Use of a bubble trap could reduce or eliminate the need for priming the system.

Continuing to refer to FIG. 2, infusion pump 113 can pump infusion solutions 103 to tank 123 when adjustments to solution bath 125 are necessary. Infusion solutions 103 can enable replenishment of fluids, electrolytes, and/or nutrients, and can enable administration of correcting solutions such as, for example, but not limited to, glucose, insulin, buffer solution, antibiotics, vasodilators, or other pharmaceuticals. Selector valve 115 can enable infusion pump 113 to manage multiple infusions. Infusion pump 113 and selector valve 115 can together administer a metered amount of infusion solution 103 into tank 123. Providing infusion solution 103 directly into storage tank 123 can enable infusion solution 103 to mix with solution bath 125 and diffuse into solution bath 125 prior to being circulated into kidney 135. The diffusion can enable the administration of relatively higher concentrations of infusion solution 103 than can be administered directly into kidney 135. Alternatively, infusion solution 103 can be supplied to kidney 135 directly through tubing 118. If response time is a factor, infusion solution 103 can be pumped through open valve 134 and tube 118 to kidney 135. In some configurations, infusion solutions 103 can be premixed and stored in sterile containers. In some configurations, controller 102 can be configured to deliver infusion solutions 103 at pre-selected dosages at pre-selected time intervals. For example, pharmaceuticals can be delivered on a pre-selected schedule. In some configurations, controller 102 can be configured to deliver a bolus to bring various constituents to desired levels. For example, a glucose bolus can be delivered to bring glucose to desired levels. Table I illustrates possible infusion schedules.

Table I

| Infusion | Potential Delivery Schedule |
|---|---|
| Plasmalyte | Replenish plasmalyte if tank level sensor 105 reads below a desired level |
| Glucose | Deliver glucose at regular intervals, and deliver a bolus when glucose is below a desired level |
| Vasodilator | Deliver a vasodilator at regular intervals |
| pH buffer | Deliver a bolus when pH is below a desired level |

Continuing to refer to FIG. 2, the accuracy of infusion pump 113 can vary depending upon how much dilution is relied upon to manage concentrations, and whether or not the system is portable. Selector valve 115 can be embodied in a variety of ways, for example, a rotary selector valve powered by a stepper or servo motor, a series of lines and occlusion valves, and a spool occlude valve. In some configurations, disposable lines can pass by a spool roller, and the roller can be rotated by a motor that can roll and occlude various lines based on its position. In some configurations, cleaning chemicals can be infused to clean the system.

Continuing to refer to FIG. 2, controller 102 can set selector valve 115 to provide a desired at least one infusion solution 103 to solution bath 125. The characteristics of solution bath 125 can be sensed and adjusted by controller 102 and infusion solutions 103. Characteristics of solution bath 125 can include tank level, temperature, pH, and dissolved oxygen.

Continuing to refer to FIG. 2, the level of tank 123 can be sensed by tank level sensor 105, and can be adjusted by controller 102 adding infusion solutions 103 and draining of excess solution bath 125 through drain port 163. Tank 123 can hold kidney 135 and the bulk of the perfusate required for perfusion. The perfusate can surround kidney 135, can provide chemical homogeneity, and can provide mechanical support for kidney 135. Tank 123 can accommodate mixing of infusion solutions 103 with solution bath 125. Tank 123 can include compliant features to prevent perfusion pump 129 from exposing kidney 135 to a vacuum. In some configurations, compliant features can include a sterile vent cap to vent tank 123. The sterile vent cap can maintain the pressure in tank 123 near ambient pressures. Further, the sterile vent cap can enable priming of the system because air that is caught in tank 123 can leave as fluid is forced in. The presence of air 163 above solution bath 125 can provide compliance because air 163 can compress and expand as needed. In some configurations, tank 123 can be sterile and disposable, and can be made of, for example, but not limited to, molded plastic, stainless steel, glass, or flexible plastic. Tank 123 can accommodate connections such as, for example, but not limited to, perfusion lines, urine/sample ports, and infusion inputs. In some configurations, such as, for example, but not limited to, portable configurations, tank 123 can include a means for protecting kidney 135 from encountering the walls of tank 123.

Continuing to refer to FIG. 2, to provide for hypothermic to normothermic regions, with emphasis on the subnormothermic and normothermic regions, in some configurations, temperature can be adjustable to the needs of kidney 135. In some configurations, tank 163 can include insulation 144 surrounding tank 123, insulation 144 minimizing the amount of energy needed to heat/cool solution bath 125. In some configurations, insulation 144 can include, but is not limited to including, vacuum panels and aerogel. In some configurations, heating/cooling can be applied to the perfusate line directly via a hot/cold plate or to the walls of tank 123. In some configurations, additional cooling loops can include heat exchangers. In some configurations, heating can be provided by a resistance heater, and cooling can be provided by a Peltier device. In some configurations, a phase change material, for example, but not limited to, ice and wax, can act as the cold sink, and a heating element can be used to balance the temperature. In some configurations, a phase change material can be used, for example, but not limited to, in a reservoir around the perfusate line and/or around tank 123, and a resistive heater can be used to 'charge' the phase change material, melting it and keeping the system warm. In some configurations, if the system cools below the temperature at which the phase change material freezes, the heater can melt the phase change material.

Continuing to refer to FIG. 2, sensors can provide diagnostic data about kidney 135 for assessing viability of kidney 135, and can enable active controls in the system that can maintain biological conditions. In some configurations, controller 102 can assess characteristics of the circulating perfusate to determine if the circulating perfusate needs adjustment and can actively control infusions to perform any desired adjustments. Characteristics can be determined from sensor data from sensors such as, for example, but not limited to, glucose sensor 149 and pH sensor 153. Adjustments can be made to the perfusate by adjusting solutions 103 added to solution bath 125. Thermistor 147 can measure the temperature of the circulating perfusate, and temperature management system 101 can adjust the temperature of the circulating perfusate to a desired value. Sensors can include, but are not limited to including, pressure, temperature, dissolved oxygen, oximeter, pH, glucose/lactate, conductivity, tank level, and perfusate flow sensor or pump metering. In some configurations, differential measurements can be taken for example, but not limited to, before and after the perfusate encounters kidney 135. Differential oxygen levels can be used to calculate oxygen consumption. Differential pressure levels can be used to detect, for example, but not limited to, a clog. In some configurations, hydrogel sensors and/or hydrogel spots and optical sources/receivers can be included in the system. The optical source can generate light that can interact with the spots, and the emitted wavelengths can be received by an optical sensor. Various wavelengths can be emitted by adjusting a monochromatic filter or by configuring a bank of LEDs to supply a particular wavelength. In some configurations, conductivity sensors can provide an indirect measurement of salt concentrations of the perfusate. The conductivity sensor can include a three pole system, where polarity is flipped between two points on a predetermined frequency, and the voltage along the circuit can be checked on the same frequency but offset. The conductivity sensor can limit the data processing needed. Timing for the conductivity sensor can be achieved via a microcontroller or FPGA. The choice among the sensors can be based at least in part on whether or not the sensing is being done in conjunction with a disposable part.

Continuing to refer to FIG. 2, waste/sample container 131, an optional component for the system, can be compliant to minimize overall weight of components prior to filling, and can enable urine samples to be collected that can be used for kidney diagnostics. When kidney 135 is functioning, urine is secreted through ureter 137 into sample/waste container 131. To determine if kidney 135 is functioning properly, the amount and contents of sample/waste container 131 can be examined. In some configurations, level sensor 133 can detect the amount of urine in sample/waste container 131.

Figure 2A:
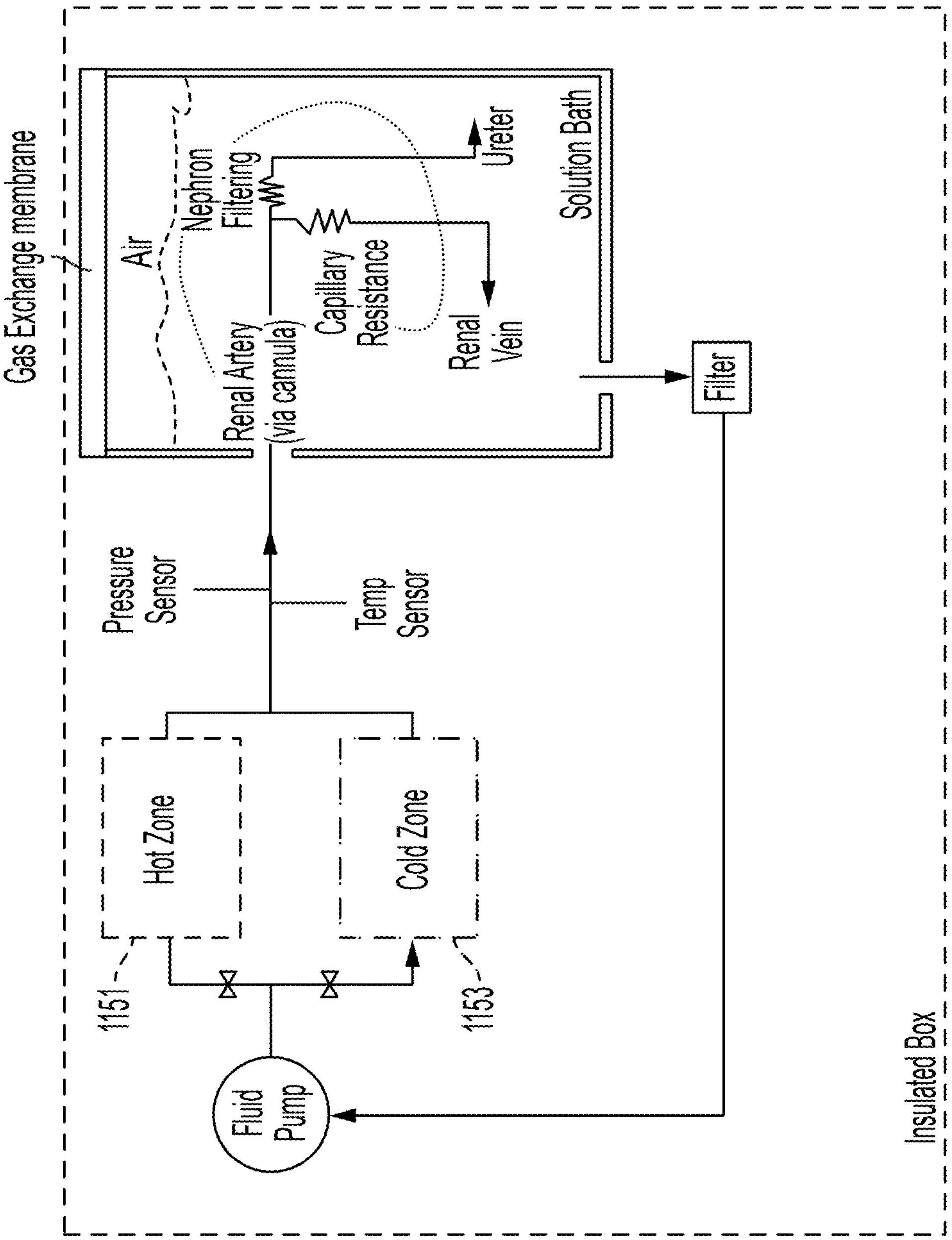
FIG. 2A is a pictorial representation of a second configuration of the system of the present teachings.

Referring now to FIG. 2A, temperature management system 101 can include hot zone 1151 and cold zone 1153. Multiple insulated compartments can include a variety of temperature management solutions, for example, but not limited to, resistive heating and/or hot/cold packs. Temperature management system 101 can include valve-directed flow through hot zone 1151 or cold zone 1153, depending upon the desired temperature.

Figure 2B:
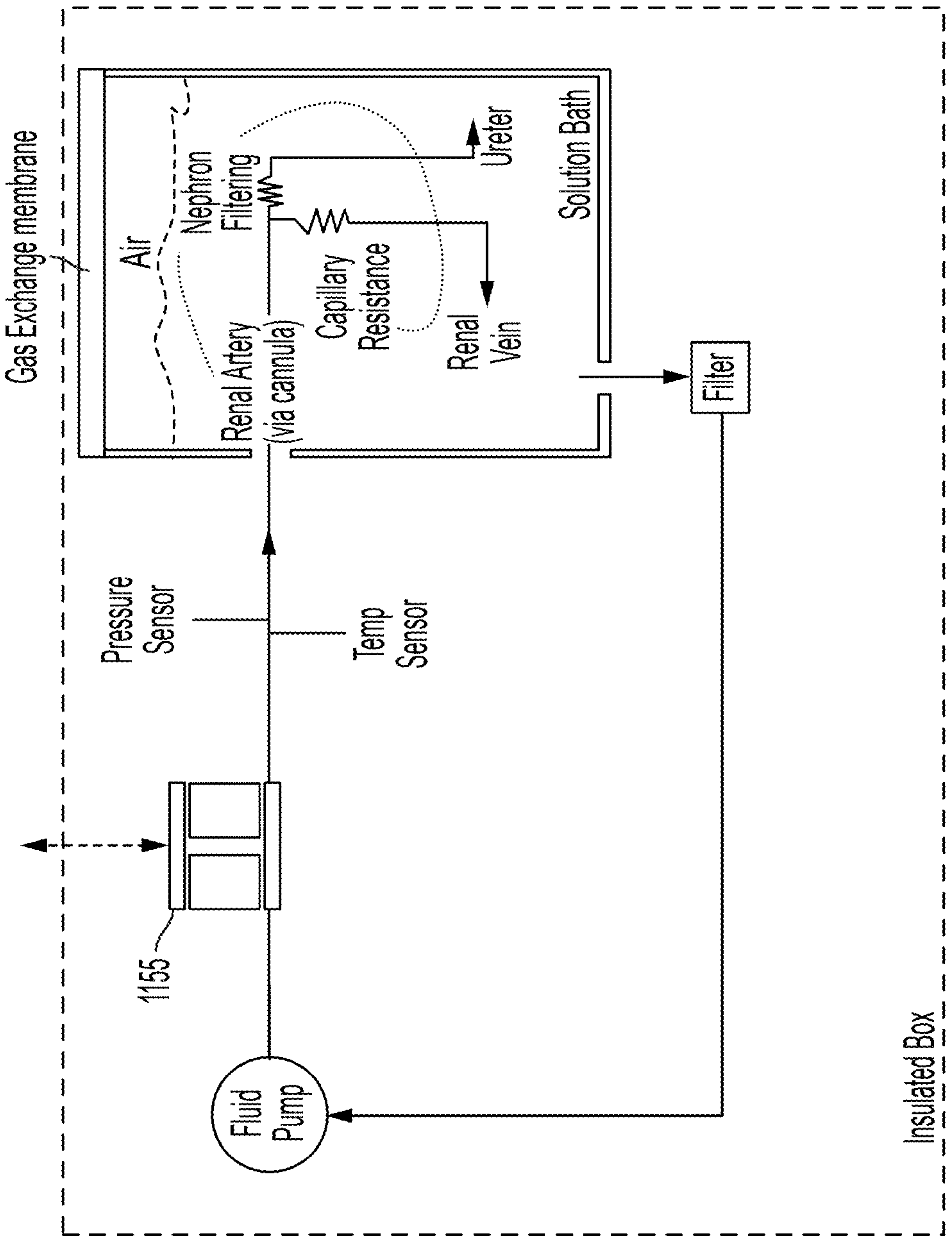
FIG. 2B is a pictorial representation of a third configuration of the system of the present teachings.

Referring now to FIG. 2B, temperature management system 101 can include thermoelectric technology such as, for example, but not limited to, Peltier-style technology 1155 in which reverse polarity can be used to achieve the heating/cooling effect.

Figure 2C:
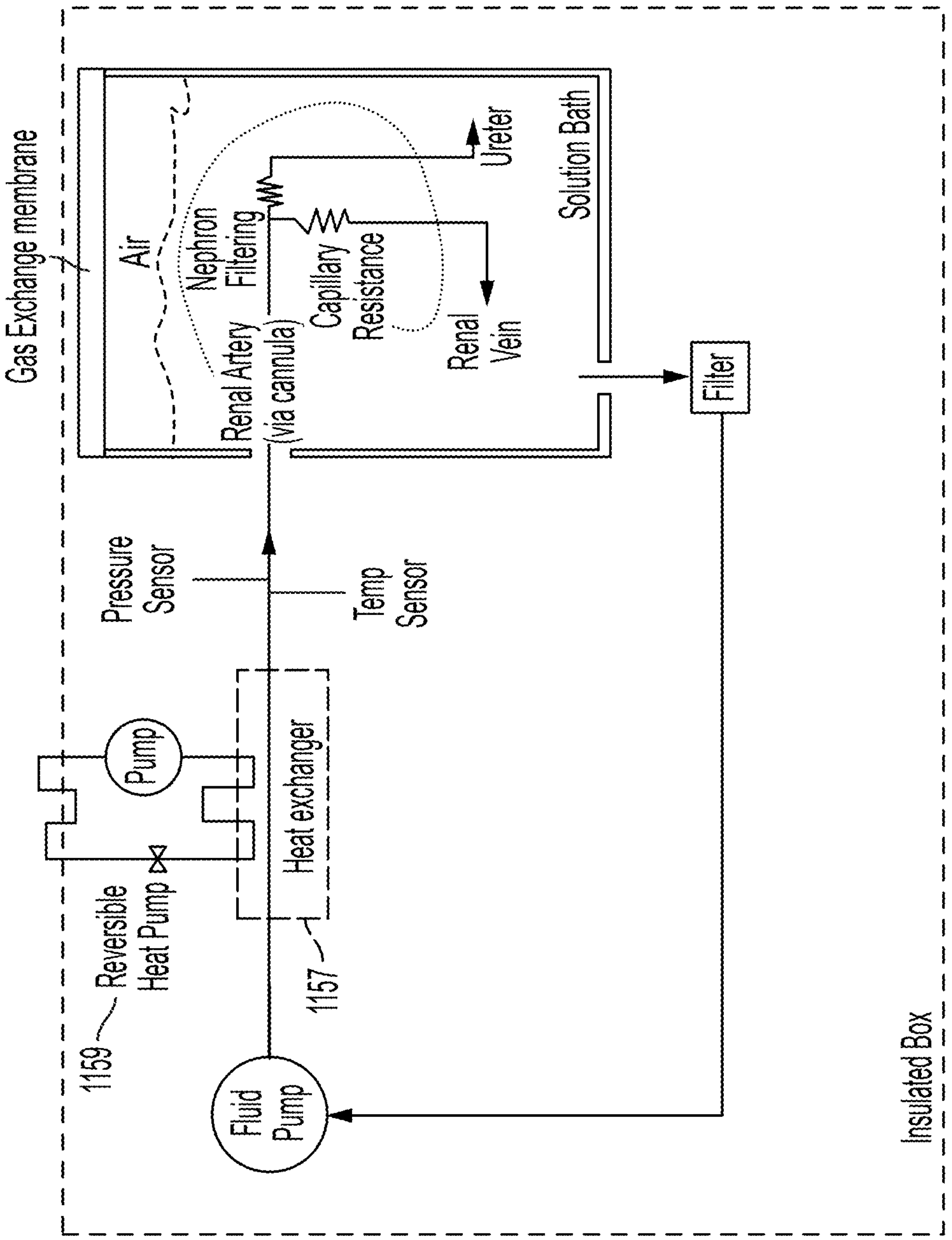
FIG. 2C is a pictorial representation of a fourth configuration of the system of the present teachings.

Referring now to FIG. 2C, temperature management system 101 can include heat exchanger technology 1157 having reversible heat pump 1159. Heat pump 1159 can be reversed to achieve the heating/cooling effect. In some configurations, the flow rate of the perfusate can be varied to manage heat transfer.

Figure 2D:
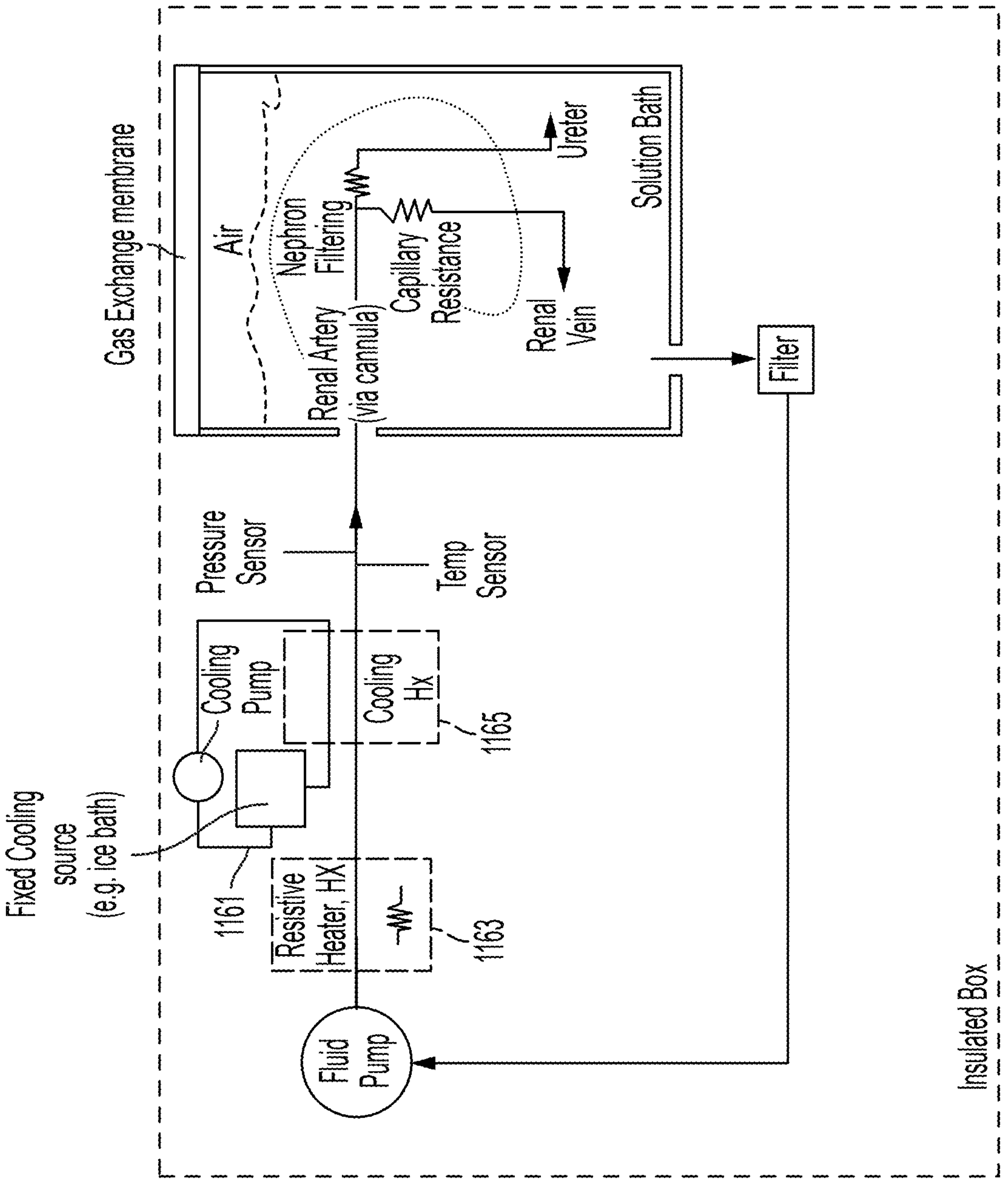
FIG. 2D is a pictorial representation of a fifth configuration of the system of the present teachings.

Referring now to FIG. 2D, temperature management system 101 can include inline dual heat exchanger technology having resistive heat exchanger 1163 and cooling exchanger 1165. Resistive heat exchanger 1163 enables throttling the degree of heat added. Cooling circuit 1161 enables throttling of the degree of cooling needed to be delivered by cooling exchanger 1165.

Figure 2E:
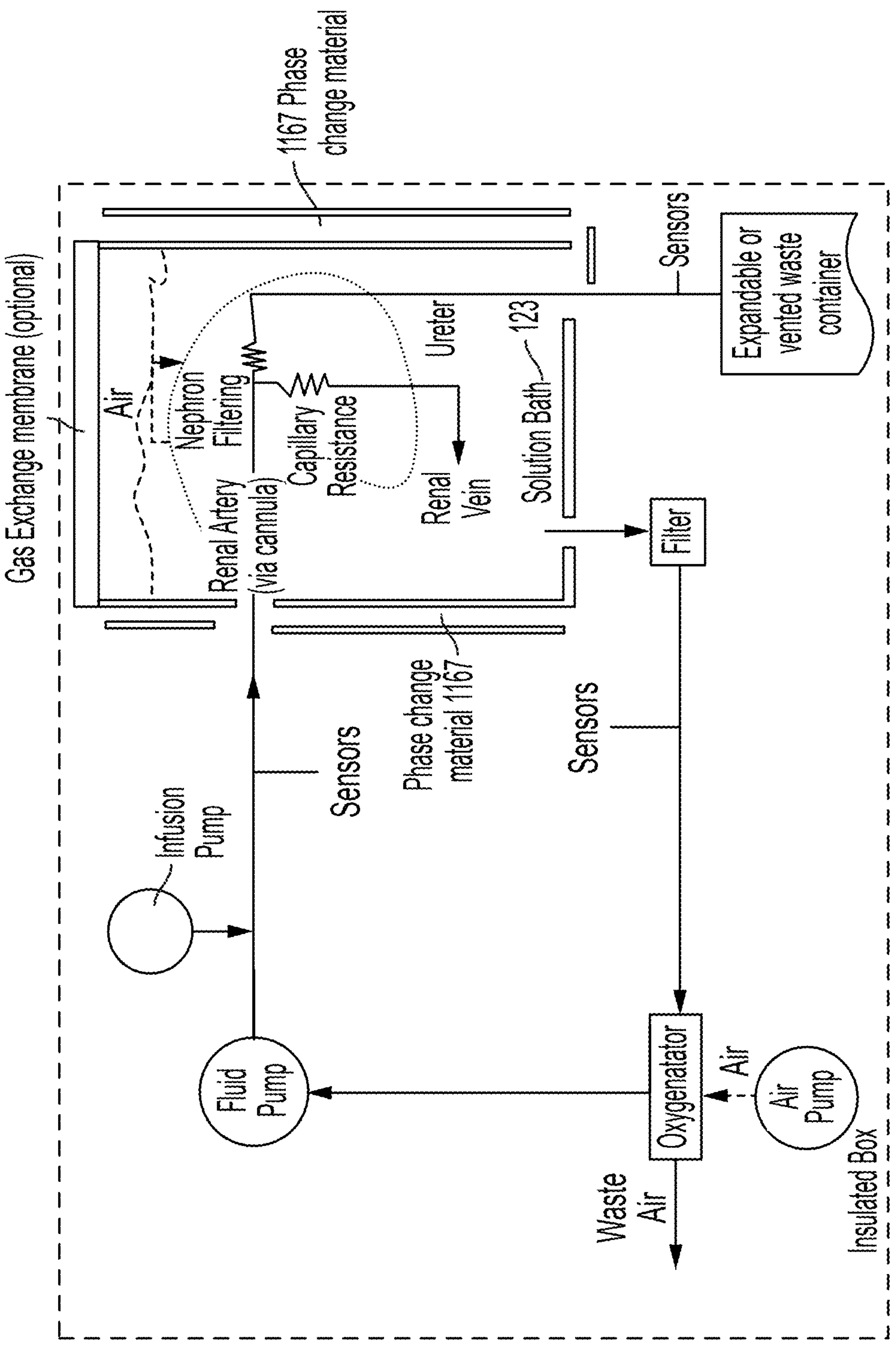
FIG. 2E is a pictorial representation of a sixth configuration of the system of the present teachings.

Referring now to FIG. 2E, temperature management system 101 can include phase change material 1167 surrounding tank 123. In some configurations, no active thermal control can be necessary.

Figure 3A:
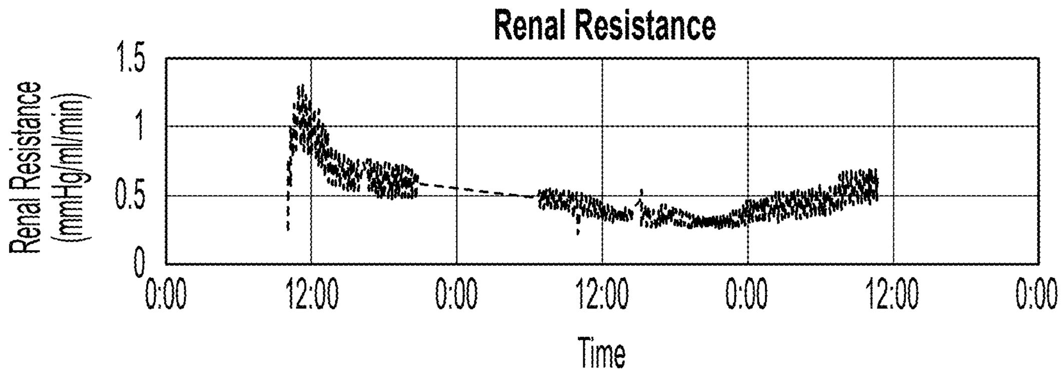
FIGS. 3A-3C are graphic illustrations of the results of operation of the system and method of the present teachings.
Figure 3B:
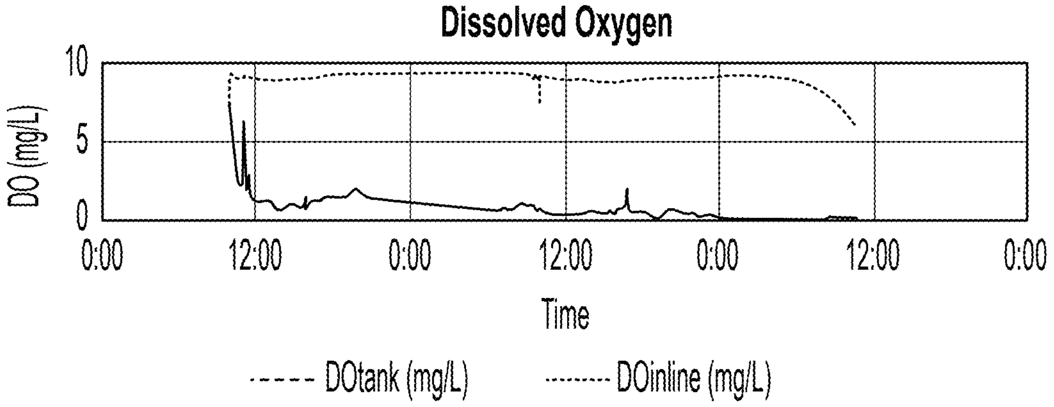
Figure 3C:
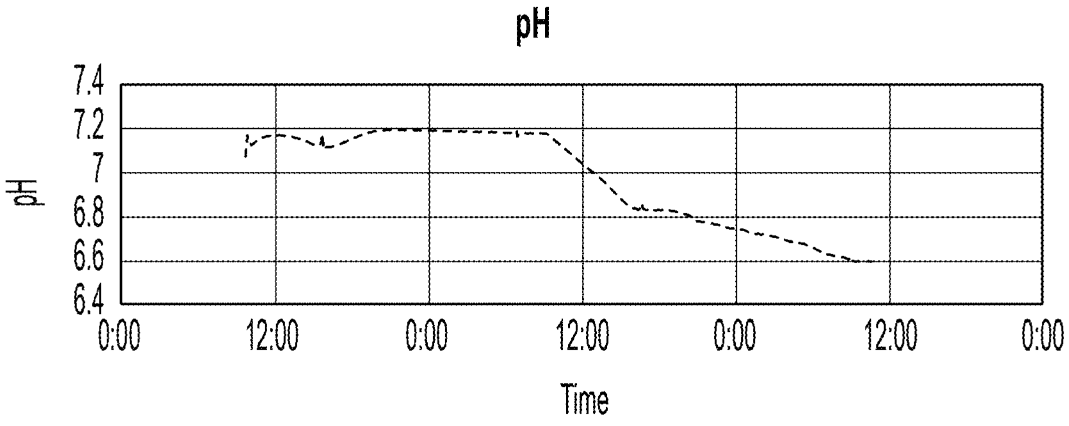

Referring now to FIGS. 3-3C, the system and method of the present teachings can perfuse a kidney at a pre-selected pressure, at room temperature, and while moderating other parameters within the tank. These parameters can include both in-line (pre-kidney) and tank sensors for dissolved oxygen and pH, alongside tank and environment temperature sensors. The in-line tube feeds into the tank, where a cannulated kidney can be attached. Subsequently, the system pulls perfusate into the in-line tube from the tank itself, and the renal vein is not cannulated/isolated. The system can include a membrane contactor that can oxygenate the deoxygenated perfusion liquid to atmospheric equilibrium levels. In some configurations, the perfusate can include Custodiol-HTK, a solution designed for ex vivo applications. This solution can be supplemented with 4.5-g/L of glucose, in order to satisfy the metabolic needs of the active kidney. Before usage, the solution can be filtered with, for example, but not limited to, a sterile filter. The method of the present teachings can include cannulating the renal artery and the ureter, in case urine samples are desired. The method can include pumping perfusate through the kidney to rid the kidney of possible pollutants. The method can include pumping cleaning solution through the system, and rinsing the system with, for example, but not limited to, sterile DI, until a desired pH is reached. The method can include attaching the cannula to the in-line tubing, priming the cannula through bypass tubing 119 and bypass valve 143, and closing bypass valve 143 to begin perfusion of kidney 135. The perfusion pressure can be manually set, can include a default value, or can be dynamically determined. The method can include perfusing the kidney for a pre-selected amount of time, for example, but not limited to, 24 hours. The method can include periodically checking glucose values.

Continuing to refer to FIGS. 3A-3C, results from executing the method described herein include renal resistance over time. Renal resistance, as shown in FIG. 3A, can be viewed as an indicator of kidney health. A low resistance, and one that does not increase over time, is the desired outcome. Dissolved oxygen values, as shown in FIG. 3B, for both in-line and tank sensors can indicate levels of oxygen consumption within the kidney. pH values, as shown in FIG. 3C, can indicate kidney health and cell viability. In particular, acidification indicates a healthy kidney.

Referring now to FIGS. 4A-4G, systems of the present teachings for normothermic and subnormothermic organ perfusion can include disposable components and durable components. This can reduce the operational cost of the system, and can reduce contamination from one organ perfusion cycle to another. The term normothermic is used herein to refer to temperatures between 32° C. and 38° C., subnormothermic is used herein to refer to temperatures in the range from 20° C. and 32° C., and hypothermic can refer to temperatures in the range from 4° C. and 19° C. Disposable components can include pumps to enable any of organ perfusion, recirculation of fluids, and infusion. Disposable components can also include thermal control components such as a heat exchanger and a tissue enclosure to hold the organ. In all configurations, all wetted components are considered to be disposable. In some configurations, the disposable components can include the organ enclosure, an oxygenator, the tubing, cannulas, manifolds, pump cassettes, reservoirs, the heat exchanger, and internally-mounted sensors. Durable parts can include interface components to couple disposable components with other parts of the system, electronics, pneumatics, and controls. Durable components can also include non-invasive sensors and thermal control elements. In some configurations, an imaging sensor, for example, can record real-time information about the organ. For example, images/videos can record changes in color and size of the organ. Color can indicate the quality of perfusion through the organ, and size can indicate edema of the organ. In some configurations, the organ enclosure can include a defroster window that can maintain a fog-free surface through which imagine capture can take place.

Figure 4A:
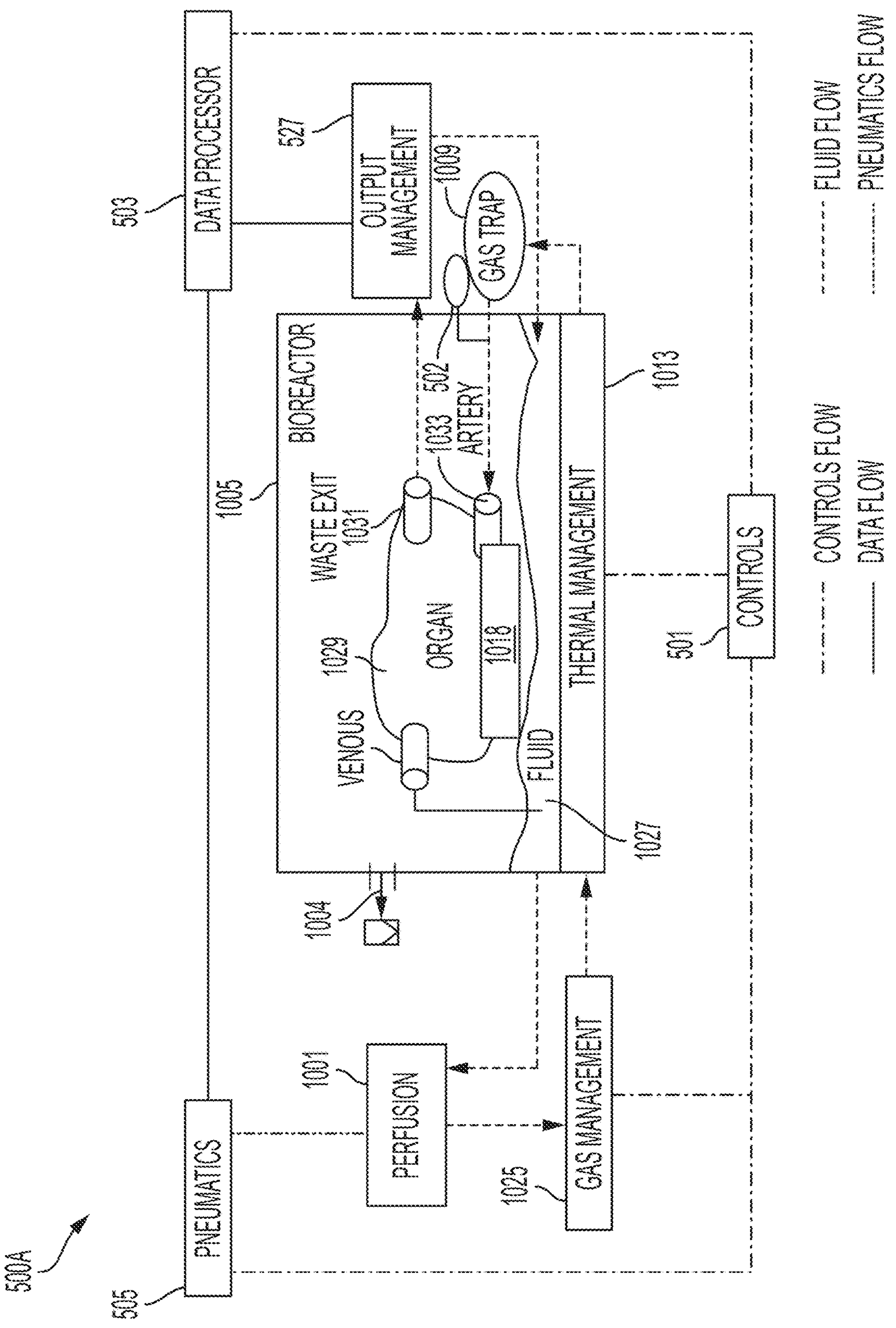
FIGS. 4A-4F are schematic block diagrams of configurations of the system of the present teachings.
Figure 12:
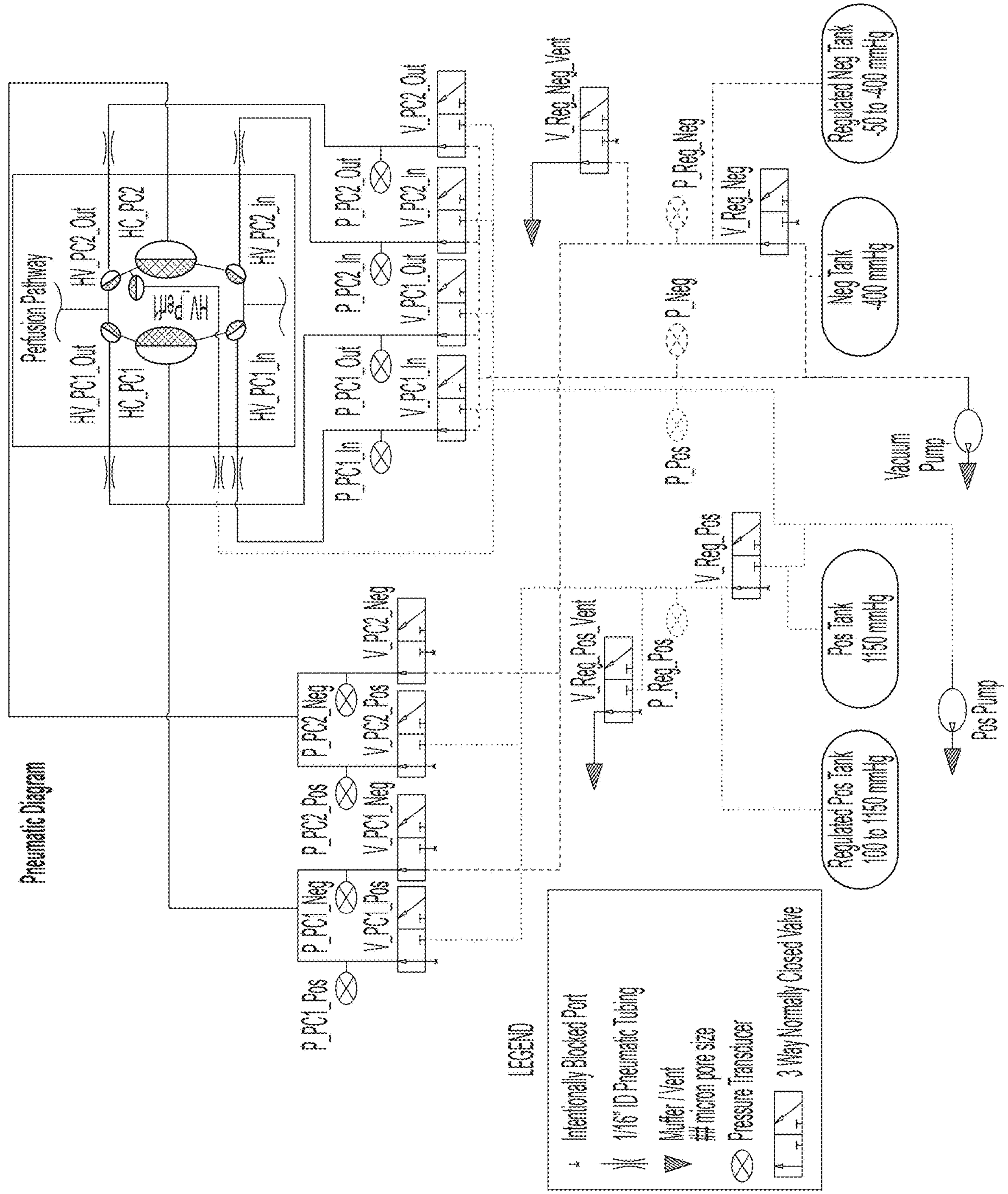
FIG. 12 is a schematic diagram of a configuration of the pneumatic subsystem of the present teachings.

Referring now to FIG. 4A, exemplary system 500A can provide normothermic or subnormothermic maintenance of organ 1029. System 500A can include, but is not limited to including, perfusion system 1001, gas management 1025, thermal management 1013, output management 527, pneumatics 505, data processor 503, and controls 501. System 500A can include tissue enclosure 1005 that can take any shape and size, depending upon the type of tissue being accommodated. For example, tissue enclosure 1005 can include, for example, four sides and a lid. In some configurations, the sides and lid can be transparent for viewing the enclosed tissue. In some configurations, any of the surfaces that form tissue enclosure 1005 can include an anti-fog feature. One such feature can include an anti-fog patch that can include an embedded wire. Current can be run through the embedded wire, heating the anti-fog patch that can thus clear the underlying surface of tissue enclosure 1005 by preventing water vapor from condensing, or enabling water vapor to evaporate. The tissue enclosure 1005 can include a gas vent and filter 1004. Gas vent and filter 1004 can anchor exit pressure from organ 1029. The system can include sample port 502 (FIG. 4A). Other ports can be added as needed. Organ 1029 can rest in bioreactor 1005, possibly upon platform 1018, or any suitable support means. Bioreactor 1005 can be shaped and sized for a specific type of organ, or can include characteristics that are generic to several organ types. Bioreactor 1005 can include various interfaces to enable fluid input and output. System 500A can enable circulation of the perfusate, drawn from fluid reservoir 1027, to mimic in vivo flow through organ 1029, to the extent possible. Control system 501 can activate and monitor pneumatic system 505 and data processor 503 according to pre-selected, default, user-specified, dynamically-determined or other criteria. Control system 501 can direct pneumatic system 505 to control the flow rate and pressure of the circulating perfusate. Perfusion system 1001 can include a perfusion pump. The perfusion pump can include, for example, characteristics such as those set out in U.S. Pat. No. 8,273,049, issued on Sep. 25, 2012, entitled Pumping Cassette, incorporated in its entirety by reference. In addition, the profile of pressure can be adjusted. The pumping cassette fill pressure and deliver pressure can be adjusted independently to manage the flow rate by feathering/toggling any of the valves controlling the pumping cassette to achieve a desired pressure. An exemplary valve arrangement is shown in FIG. 12. Especially important is that the perfusion pump has the capability to regulate flow rate and flow pressure entering organ 1029. When resistance in organ 1029 changes, the perfusion pump needs to include the capability to change the pumping pressure and flow rate to accommodate the changed resistance. The perfusion pump also needs to enable low hemolysis. Data processor 503 can receive and store data from any monitoring component in system 500A and provide those data to control system 501. To adequately mimic in vivo behavior, the perfusate's dissolved gas concentrations and temperature can be maintained at levels that can be pre-selected, manually entered, or dynamically determined, for example. In some configurations, perfusion system 1001 can pump perfusate through gas management system 1025 and thermal management system 1013, through air trap 1009, and into organ 1029 through arterial cannula 1033, through organ 1029 and out waste exit cannula 1031, and back into fluid reservoir 1027. Simultaneously, perfusion system 1001 can draw perfusate from fluid reservoir 1027 to continue the circulation process.

Gases in the perfusate can be adjusted when perfusion system 1001 pumps the perfusate to gas management system 1025. Gas management system 1025 can adjust the gases that have been depleted as the perfusate travels through organ 1029. The perfusate temperature can be maintained in a pre-selected temperature range by thermal management system 1013. Gas bubbles can be removed from the perfusate by any in-line method available. In some configurations, gas trap 1009 can provide a space for gas bubbles to float to the top of an enclosure, leaving the liquid perfusate to flow into organ 1029 through arterial cannula 1033, for example. Perfusate exiting organ 1029 through the vein can ultimately be directed to fluid reservoir 1027 or other component (not shown) to manage circulated perfusate. In some configurations, venous output can flow directly to perfusion system 1001, creating a closed loop circulation and possibly mitigating hemolysis. For some types of organs, flowing the output into fluid reservoir 1027 can create an environment that can be as similar to the human body as possible. In some configurations, the output can be sent to a waste disposal system, and a replacement solution can be infused into the system at a flow rate that matches the output flow rate. In some configurations, the exiting perfusate, the output, can be measured. In some configurations, output management 527 can measure the flow rate over a pre-selected amount of time, for example. Other types of measurements of the waste can be accommodated by system 500A. Fluid reservoir 1027, thus, can enable a complete circulation of the perfusate through organ 1029. In some configurations, a filter can be placed between fluid reservoir 1027 and perfusion system 1001. The filter can trap particulates such as, for example, tissue mass or contamination, from being pumped in the organ. In some configurations, the filter can include a 20-30 micron screen. In some configurations, bioreactor 1005 can be moved from one environment to another, specifically from a relatively cold environment to the normothermic environment described herein.

Figure 4B:
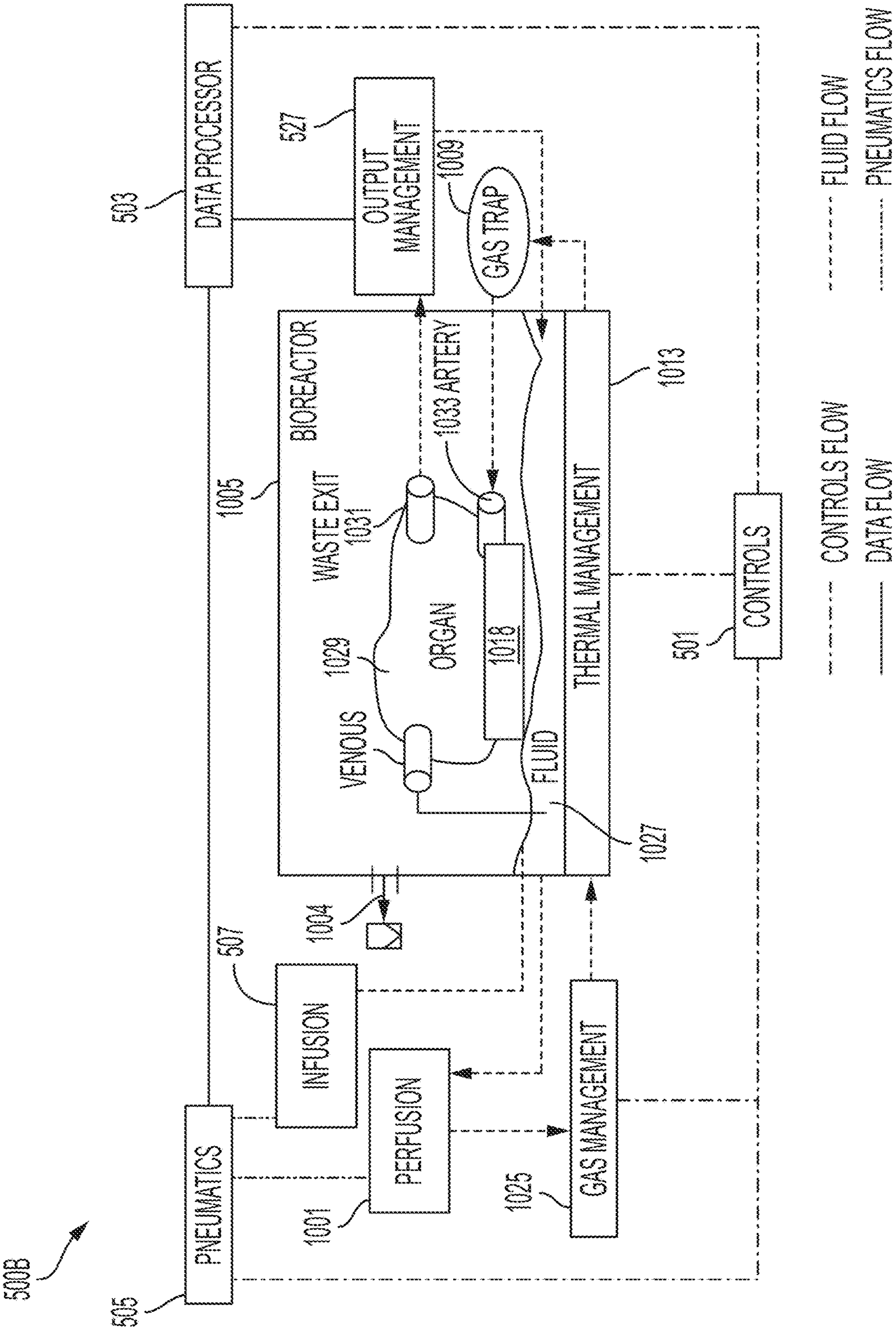

Referring now to FIG. 4B, in some configurations, system 500B can be used to add substances to fluid reservoir 1027 by means of infusion system 507. Infusion system 507 can enable one or more additives such as, for example, but not limited to, glucose, insulin, hormones, vasodilators, and pharmaceuticals to be infused into the perfusate when it is determined that the perfusate has deficiencies and/or imbalances, or on a regular dosing schedule, for example. Control system 501 can direct pneumatic system 505 to drive infusion system 507, possibly in response to sensor data. For example, vascular resistance can be measured, and when resistance is deemed to be outside pre-selected or user-specified thresholds or dynamically-determined thresholds, the response can be the introduction of vasodilators. Glucose can be measured, and when glucose is deemed to be outside pre-selected or user-specified thresholds or dynamically-determined thresholds, the response can be the introduction of glucose or insulin. Multiple substances can be added simultaneously. Infusion system 507 can use, for example, but not limited to, pumps with characteristics such as those described in U.S. Pat. No. 8,613,724 issued on Dec. 24, 2013, entitled Infusion Pump Assembly, incorporated in its entirety by reference. In some configurations, infusion system 507 can enable infusion of substances directly into bioreactor 1005. In some configurations, infusion system 507 can enable infusion of substances into tubing fluidically connecting parts of the system of the present teachings to each other. For example, when infusing a compound with a relatively short half-life, such as 5-10 minutes, infusing the compound directly into an artery supply tube can ensure that the compound has not reached its half-life by the time it arrives in the organ.

Figure 4C:
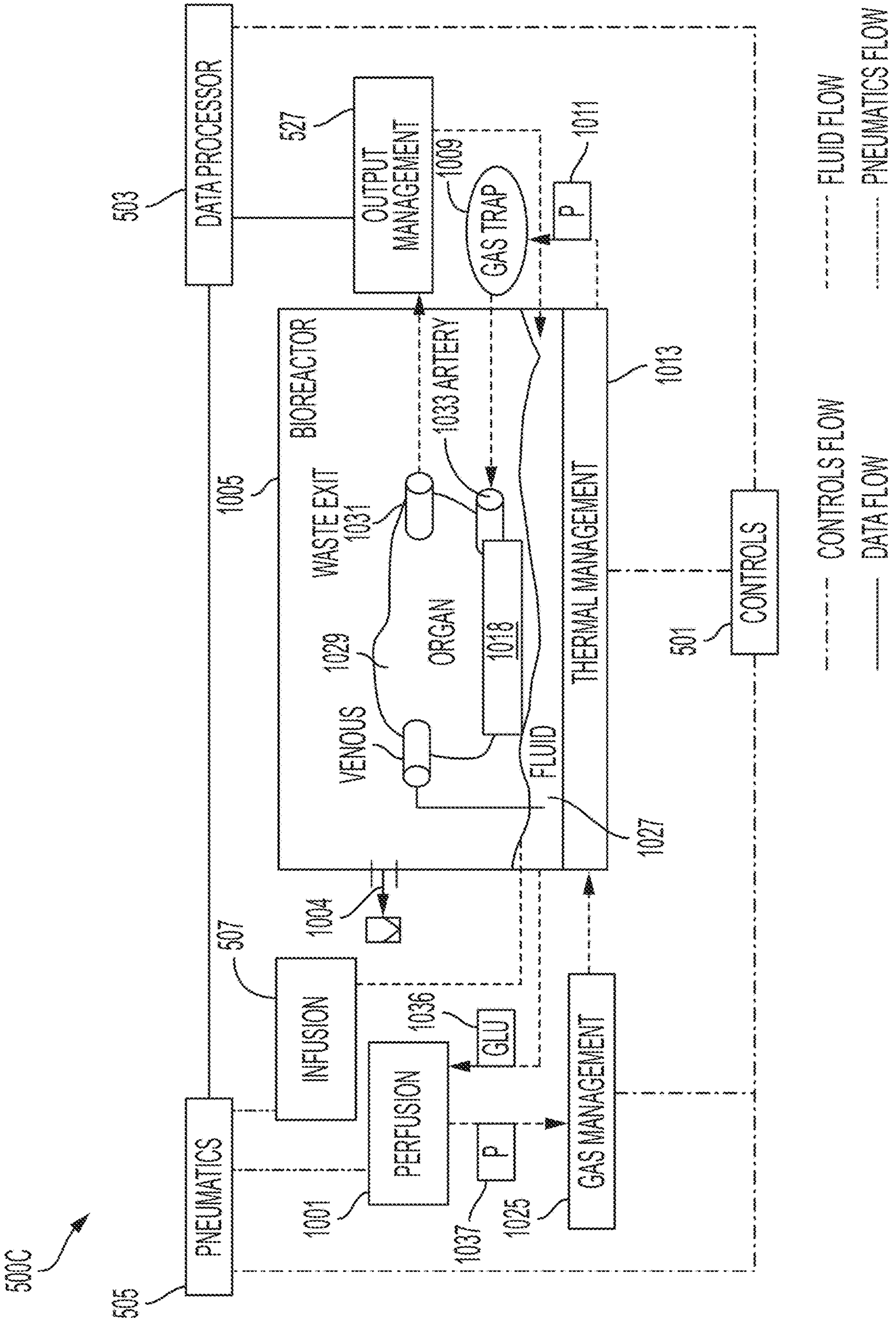

Referring now to FIG. 4C, in system 500C, sensors can be used to monitor the circulating perfusate. Characteristics that can be monitored can include, but are not limited to including, perfusate flow rate, creatinine concentration, sodium concentration, fluid level in bioreactor 1005, temperature, pH, dissolved, oxygen concentration, Hb saturation, conductivity, and gas, for example. Pump pressure can be monitored by pump pressure sensor 1037. Pump pressure sensor 1037 can determine the inline pressure of the perfusate flowing through the tubing that connects perfusion pump 1001 and gas management 1025. In some configurations, pump pressure sensor 1037 can be durable, while the inline connector coupling pump pressure sensor 1037 with the tubing can be disposable. In some configurations, the sensor can also be disposable. Pump pressure sensor 1037 can provide sensed pressure to data processor 503. Control system 501 can use those data to automatically trigger an increase or reduction in the pressure exerted by perfusion system 1001. Pressure can also be manually adjusted, or adjusted based on a time schedule, a recipe, or based on other factors in addition to or instead of the pressure detected by pressure sensor 1037. Pressure change can be required as the organ's resistance changes, for example, when the organ's health status changes. Pressure sensors can be positioned throughout the circulation loop of system 500C. For example, perfusate pressure sensor 1011 can monitor the pressure of the fluid leaving thermal management system 1013. This information can be useful to monitor the pressure of the perfusate at the important point of entry to organ 1029. Perfusate pressure that exceeds a pre-selected range could damage organ 1029, while perfusate pressure that is too low can cause inadequate nutrient flow and waste removal through organ 1029. In some configurations, pressure sensor 1011 can be durable, while the inline connector giving the sensor access to the sensed pressure can be disposable. Other sensors can measure various parameters, depending upon the needs of the tissue held in bioreactor 1005. For example, an optical clearance sensor can use a series of LEDs to detect absorption changes at different wavelengths resulting in creatinine/BUN measurements of blood and organ output. In some configurations, the optical clearance sensor can be a non-contact sensor located in the tubing and in the output system. The sensors together can measure creatinine clearance, for example.

Continuing to refer to FIG. 4C, glucose sensor 1036 can monitor glucose and possibly lactose levels of the perfusate pumped from fluid reservoir 1027. In some configurations, glucose sensor 1036 can include a durable PCB coupled with a disposable inline glucose sensor. Control system 501 can use the glucose data gathered by glucose sensor 1036 and provided to data processor 503 to automatically trigger one or more of infusion pumps 113 (See FIG. 2) to add glucose and/or other substances to the circulating perfusate. The glucose data can be manually monitored, and glucose and/or other substances can be manually added to the perfusate.

Figure 4D:
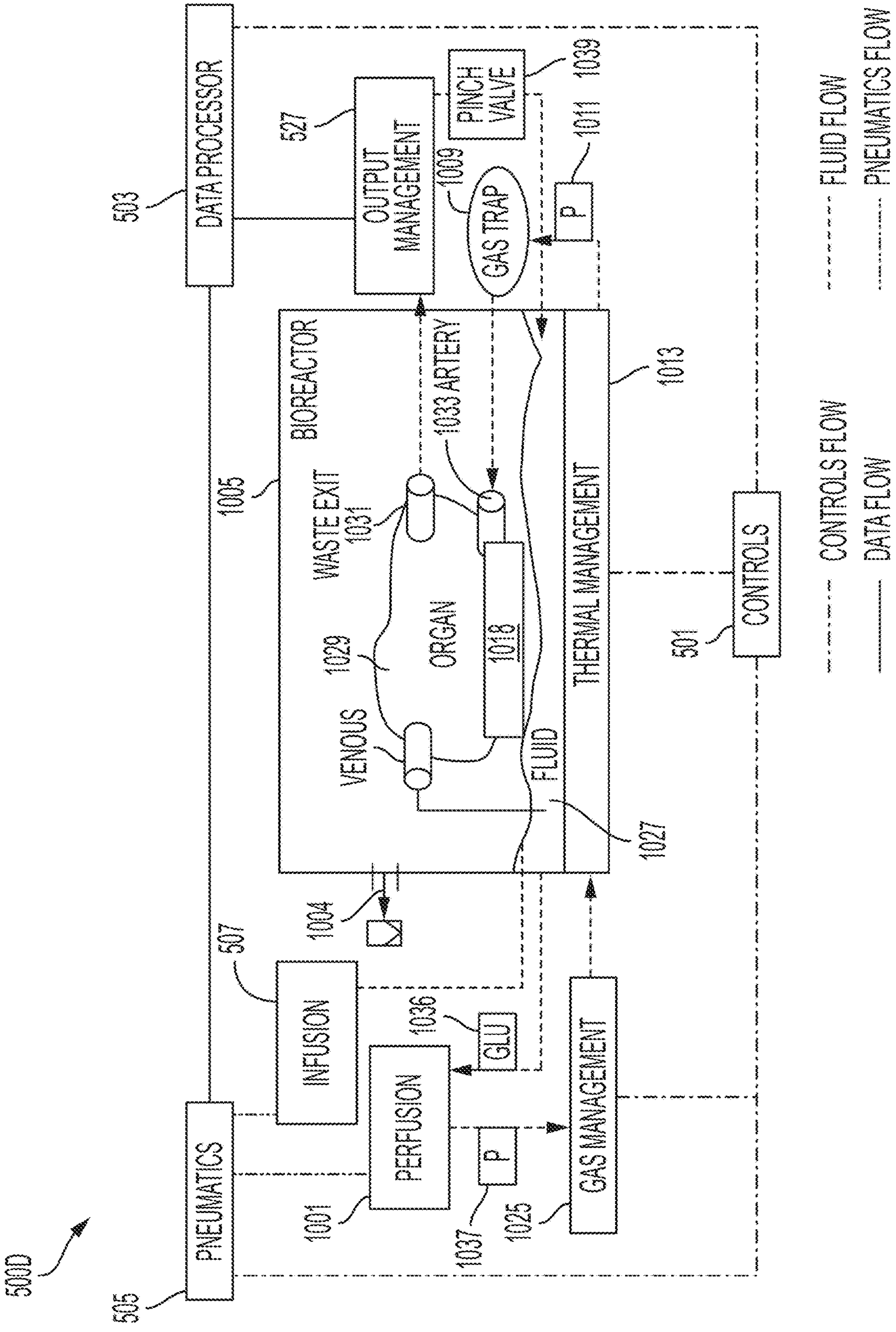

Referring now to FIG. 4D, system 500D can include pinch valve 1039 as an output measurement means. In some configurations, output management 527 can measure the waste flow rate over a pre-selected amount of time, and pinch valve 1039 can retain the output over the same time period. The amount of output and its flow rate can be measured, and pinch valve 1039 can be opened after the time has expired, releasing the output into fluid reservoir 1027. In some configurations, a sample port can enable sampling the output for labwork, for example. In some configurations, a level sensor can be used to measure the amount of output. In some configurations, the accumulated output can be retained in a transparent enclosure that can be used for optical inspection, manually or automatically, of the output. Color in the output of a kidney, for example, can indicate blood in the urine, or cloudy urine can indicate possible kidney health issues. In some configurations, an optical clearance sensor can enable automated measurement of creatinine concentration and blood urine nitrogen concentration using a series of LEDs and a photo detector.

Figure 4E:
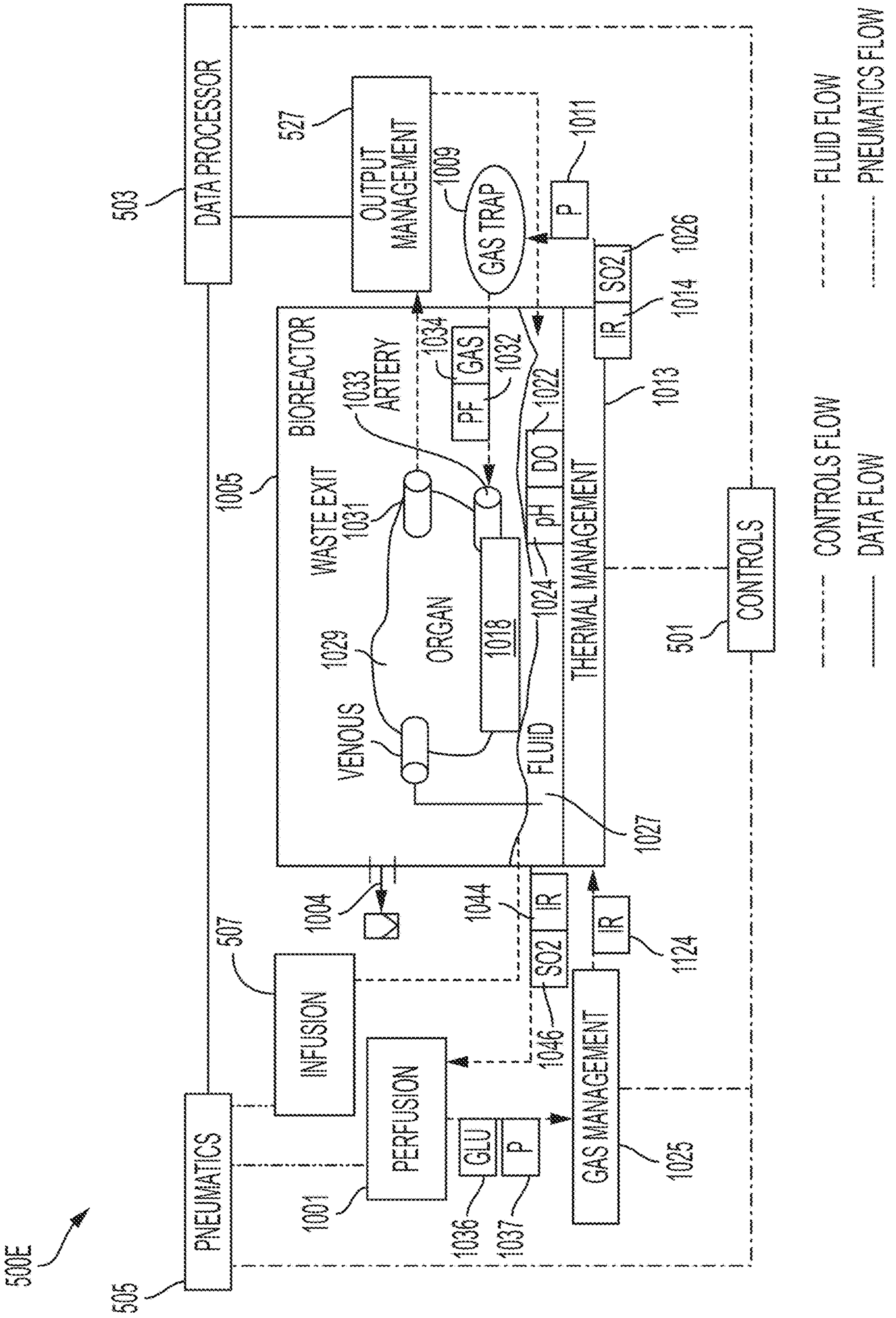

Referring now to FIG. 4E, in system 500E, sensors can be placed advantageously to thoroughly monitor the circulating perfusate and trigger adjustments as necessary. Sensors in the system can provide diagnostic information that can assist medical professionals in assessing the quality of the organ. The diagnostic information can include, but is not limited to including, vascular resistance as a function of arterial flow and arterial pressure, oxygen consumption, glucose consumption, output production, physical appearance, glomerular clearance, and sodium fractional excretion. Sodium fractional excretion can be calculated as a function of output flow rate, sodium concentration the blood and output, and glomerular clearance. Sodium concentration can be measured by various means, and can be measured from anywhere in the system. In some configurations, sodium concentration can be measured in the recirculation line and in the output loop, and the difference between the two measurements can be calculated. Although not explicitly shown, all sensors can provide sensor data to data processor 503. Data processor 503 can perform, for example, sensor data filtering, sensor data fusion, and sensor data monitoring, as well as supply information to control system 501. Control system 501 can control actions of the sensors themselves, as well as actions other components of system 500E according to the received sensor data. In system 500E, glucose sensor 1036 and pump pressure sensor 1037 can be positioned to collect sensor data about the perfusate that is flowing from perfusion system 1001 to gas management system 1025. Glucose measurement at this point in the circulation cycle can provide advantages over other placement possibilities, depending upon the type of organ in bioreactor 1005 and the stage of organ rehabilitation, if applicable. An optical level sensor, for example, can be positioned at a pre-selected height within an output reservoir, and can trigger the release of output into the fluid reservoir when the output reaches the pre-selected height.

Continuing to refer to FIG. 4E, system 500E can include thermal sensor 1124 sensing the temperature of perfusate as it enters thermal management system 513. Thermal sensor 1124 can include, in some configurations, a durable IR sensor coupled with disposable tubing through which the perfusate traverses. System 500E can include thermal sensor 1014 that can measure the temperature of the perfusate as the perfusate exits thermal management system 1013. When the perfusate exits thermal exchange means 1013, the temperature of the perfusate can be determined by temperature sensor 1014. Monitoring the temperature before and after traversal of thermal management system 513 can indicate to control system 501 that changes in thermal management might be necessary, depending upon pre-selected thermal goals, manually-entered thermal goals, and/or dynamically-determined thermal goals, possibly based upon the status of organ 1029 and/or other sensor data. System 500E can include further thermal monitoring by thermal sensor 1044, positioned to monitor the temperature of the perfusate as the perfusate leaves fluid reservoir 1027. Such a reading can indicate the level of thermal change between when the perfusate entered organ 1029 and when the perfusate completed the circulation path on the way to perfusion system 1001. Thermal change can trigger, for example, adjustments in the environment of bioreactor 1005 that can enable minimizing thermal fluctuations over time. In some configurations, the temperature sensors described herein can include external infrared sensors (IR), and can be durable, while the tubing to which the sensors are attached can be disposable.

Continuing to refer to FIG. 4E, system 500E can include durable oxygen saturation sensor 1046 that can measure venous oxygen saturation. Abnormalities in venous oxygen saturation can indicate that the metabolic demands of organ 1029 are not being met. System 500E can include oxygen saturation sensor 1026 that can measure oxygen saturation before the perfusate enters organ 1029 through arterial cannula 1033. Abnormalities in the oxygen saturation of perfusate entering organ 1029 can indicate the need for supplemental oxygen. Gas management system 1025 can supply such oxygen to perfusate. In some configurations, oxygen saturation sensor 1026 can be a durable item, while the tube through which the oxygen saturation is measured can be disposable. In some configurations, the system of the present teachings can react to high/low oxygen saturation by changing the supply of oxygen to gas management 1025. In some configurations, the system of the present teachings can react to high/low pH values by changing the supply of carbon dioxide flowing to gas management 1025.

Continuing to refer to FIG. 4E, before the perfusate enters organ 1029, system 500E can include gas sensor 1034 that can detect gas in the perfusate. In sufficient quantities, gas in the perfusate can cause serious complications for organ 1029. Information from gas sensor 1034 can be provided to data processor 503 which can possibly inform control system 501 about possible mitigation strategies, depending at least upon, for example, but not limited to, pre-selected, dynamically-determined, or manually entered allowed gas thresholds. Gas sensor 1034 can include an ultrasonic housing that can be durable, while the tubing through which the perfusate is probed can be disposable. Gas sensor 1034 can be used for automatic system priming. The organ can be bypassed or not be part of the circulation loop at all until gas sensor 1034 detects no gas. System 500E can include pump flow sensor 1032 that can measure the pump flow pressure and flow rate as the perfusate enters organ 1029. Data from this sensor can be used to regulate pneumatic system 505, that can ultimately adjust the pressure of perfusion system 1001. Pump flow sensor 1032 can include an ultrasonic housing that can be durable, while the tubing through which the perfusate is probed can be disposable. Under normal circumstances (i.e., no triggers set off by sensor data), the perfusate can enter arterial cannula 1033 and then enter organ 1029.

Continuing to refer to FIG. 4E, system 500E can include sensors within fluid reservoir 1027. Exemplary sensors can include, but are not limited to including, dissolved oxygen sensor 1022 and pH sensor 1024. Dissolved oxygen sensor 1022 can monitor the oxygen concentration in the perfusate. Gas management system 1025 can be directed by control system 501 to adjust the amount of oxygen added to the perfusate based at least upon sensor data from dissolve oxygen sensor 1022. In some configurations, dissolved oxygen sensor 1022 can include a disposable component and a durable component. The disposable component can include a spot sensor that can optionally be self-adhering. The durable component can include sensor-specific electronics and cabling. The cabling can optionally include fiber optic cables. pH sensor 1024 can monitor the pH of the perfusate. When the perfusate falls out of a normal acid/base balance, adjustment is possible through various well-known means, depending upon what type of organ is being rehabilitated, for example. Types of adjustment can include, but are not limited to including, adding a buffer compound and/or altering the carbon dioxide input to gas management 1025 and/or infusing a buffer solution. In some configurations, pH sensor 1024 can include a disposable component and a durable component. The disposable component can include a spot sensor that can optionally be self-adhering. The durable component can include sensor-specific electronics and cabling. The cabling can optionally include fiber optic cables.

Figure 4F:
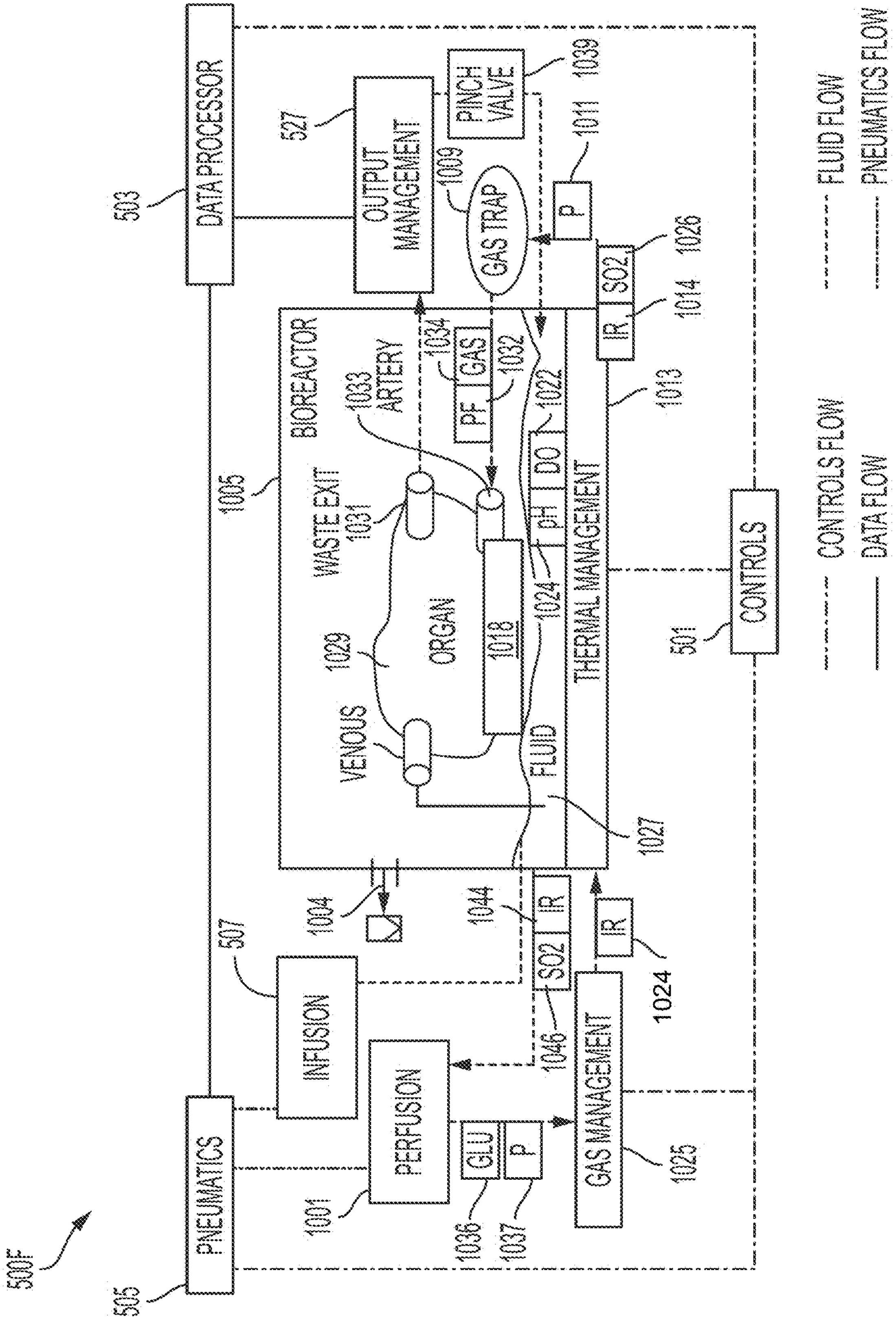

Referring now to FIG. 4F, system 500F can include components of systems 500D (FIG. 4D) and 500E (FIG. 4E), specifically the sensors described with respect to system 500E and the output measurement means described with respect to system 500D. In fact, any combination of components, and other additional components, are contemplated by the system of the present teachings. Sensor placement can depend upon the needs of the tissue being maintained and/or rehabilitated.

Figure 4G:
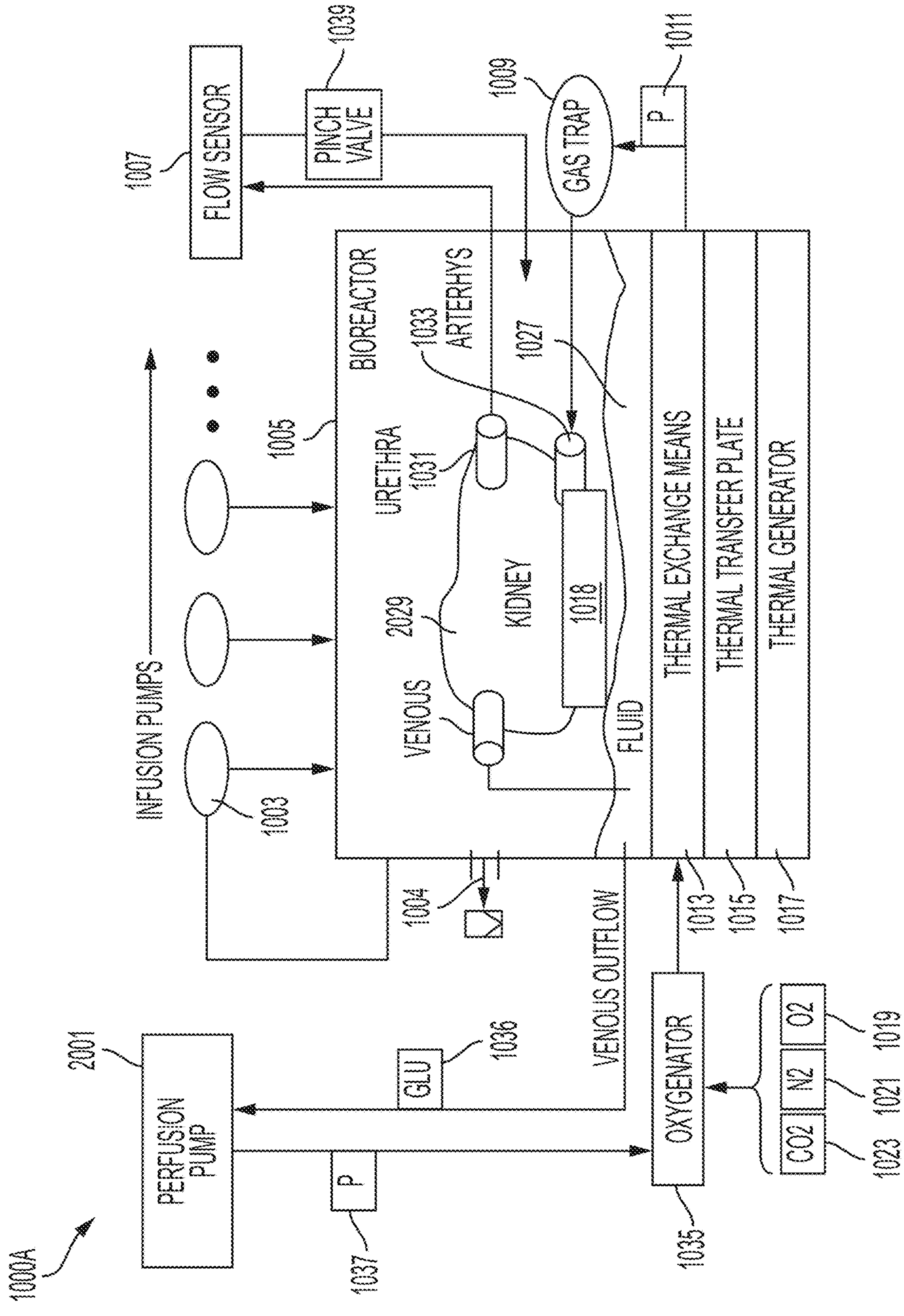
FIGS. 4G-4H are schematic block diagrams of specific implementations of a configuration of the system of the present teachings.
Figure 4H:
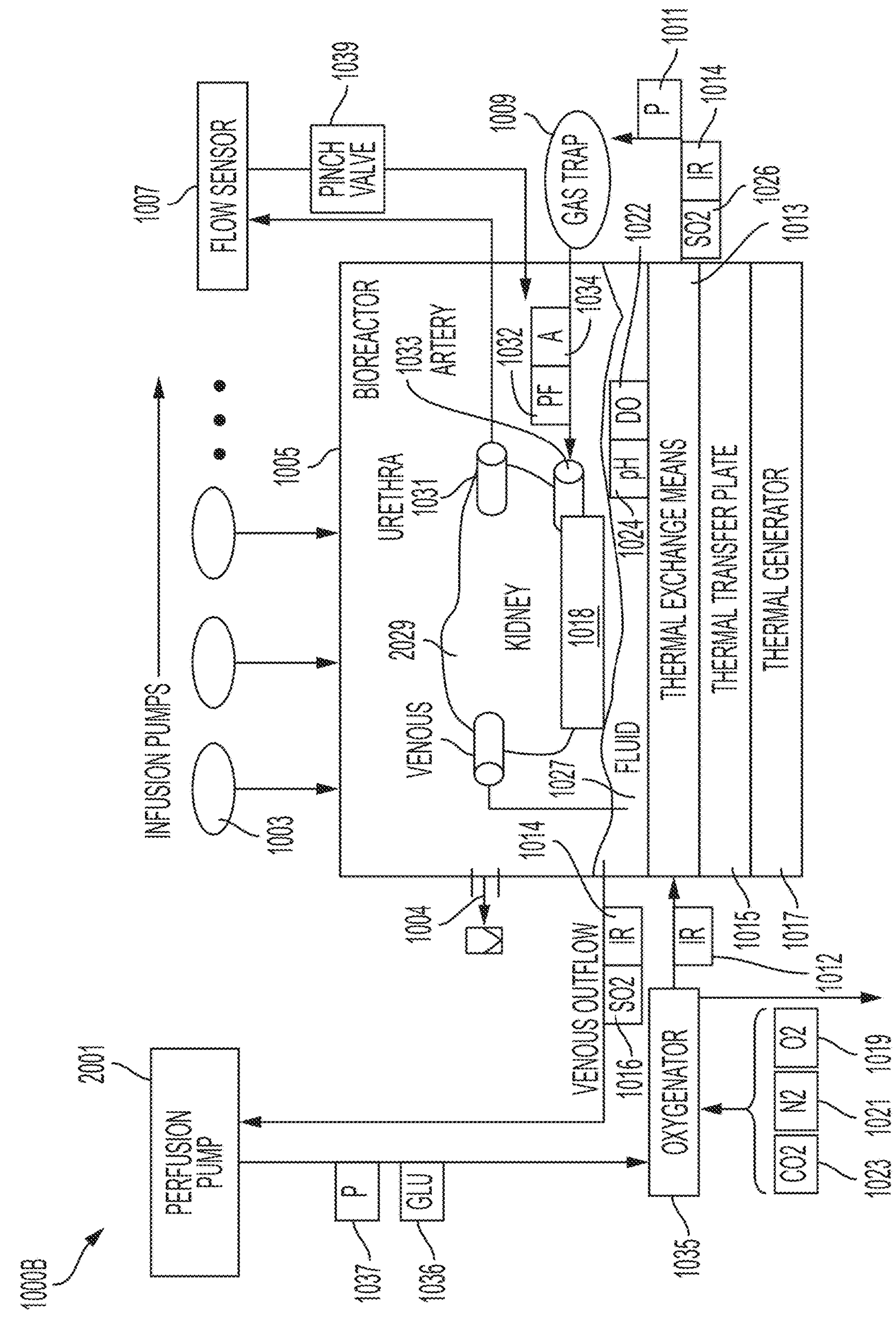

Referring now to FIGS. 4G and 4H, exemplary system 1000A can provide an implementation of a configuration of any of systems 500A-500F as applied to an organ such as kidney 2029. The perfusion system of system 1000A can include, but is not limited to including, perfusion pump 2001 that can enable circulation of the perfusate to mimic in vivo flow from a perfusate source through kidney 2029 to the extent possible. In some configurations, pulsatile pumping of the perfusate can is possible, at a rate that can mimic a physiological rhythm. The timings of pump strokes can be adjusted to achieve such a pulsatile flow. In some configurations, a PWM of a valve providing pneumatic pressure to the pumping pod of perfusion pump 1001 can create pressure profiles in the pneumatics that could create a desired fluid pressure on the fluid side of perfusion pump 1001. Perfusate that is pumped from fluid reservoir 1027 can be subjected to, for example, but not limited to, temperature and oxygen saturation tests by temperature sensor 1014 and oxygen saturation sensor 1016, respectively, as discussed herein. Gas management in system 1000A can include oxygenator 1035. This terminology does not limit the gas adjustment in the system of the present teachings to oxygen alone. Possible oxygenation devices can include, but are not limited to including, an extracorporeal membrane oxygenation (ECMO) device and a microporous hollow fiber oxygenator, for example. In some configurations, oxygen and other gases can be supplied to oxygenator by supply canisters, an oxygen concentrator, or by any other oxygen separation or concentration method, for example. Exemplary gases that can feed oxygenator 1035 can include, but are not limited to including, one or more of oxygen 1019, nitrogen 1021, and carbon dioxide 1023. Other types of gas are contemplated and can be accommodated by the system of the present teachings. Before the perfusate is pumped from perfusion pump 2001 to oxygenator 1035, the perfusate can be tested for various characteristics. For example, glucose sensor 1036 can monitor the glucose level of the perfusate and trigger adjustment of the perfusate during the circulation cycle.

Continuing to refer to FIGS. 4G and 4H, following oxygenation, the perfusate can undergo thermal adjustment by a thermal management system. In some configurations, the thermal management system of system 1000A can include, but is not limited to including, thermal exchange means 1013, thermal transfer plate 1015, and thermal generator 1017, for example. In some configurations, thermal exchange means 1013 can rest upon thermal transfer plate 1015, which can rest upon thermal generator 1017. Thermal generator 1017 can provide an amount of thermal energy through thermal transfer plate 1015 to thermal exchange means 1013. The amount of thermal energy can be determined by, for example, a controls system that can rely on sensor data to adjust the thermal energy available to the perfusate. Alternatively, thermal adjustment can occur on a preset timetable, or manual adjustment can be made, for example. Thermal exchange means 1013 can include, but is not limited to including, a system in which fluid in thermal exchange means 1013 can be spread across the expanse of thermal transfer plate 1015 without coming into physical contact with thermal transfer plate 1015. Thermal exchange means 1013 can include a membrane that can geometrically couple thermal transfer plate 1015 with thermal exchange means 1013, thereby providing insulation and efficient energy transfer. In some configurations, the membrane can be 0.01 inch in thickness, and can be constructed of material that stretches when pressure is applied. In some configurations, the membrane can be laser-welded to create the flow path. Thermal exchange means 1013 can include a fluid path of any shape covered by the membrane, the fluid path having at least one fluid channel. The length of the fluid path can dictate the size of thermal transfer plate 1015. The width and depth of the channels that make up the fluid path can be based upon the desired surface interface area between the perfusate and thermal transfer plate 1015 (through the membrane), and the desired uniformity of heat transfer. The membrane can include, but is not limited to including, a conforming material such as a polymer, for example, rubber, plastic, fibers, adhesives, and coatings, any material having conforming and insulating properties. In some configurations, the membrane can function as a pressure sensor. On one side of the membrane is the flowing perfusate, and the other side is thermally-conductive thermal transfer plate 1015. Isolating the perfusate from thermal transfer plate 1015 and thermal generator 1017 can enable the number of disposable components in the thermal management means to be limited to thermal exchange means 1013. In some configurations, thermal transfer plate 1015 can be constructed of thermally-conductive material such as, but not limited to, aluminum. Thus, thermal energy originating in thermal generator 1017 can transfer to thermal transfer plate 1015 which can transfer the thermal energy through the conforming membrane to the perfusate flowing in the fluid channels. In some configurations, thermal generator 1017 can include cavities for thermal cartridges such as, for example, but not limited to, OMEGA™ cartridge heaters CSS-03130/120V. The size of the cartridges, number of cartridges, and other characteristics of the cartridges can be determined based on the need for uniform heating across thermal generator 1017, and thus across thermal transfer plate 1015 and ultimately in the perfusate flowing through thermal exchange means 1013. Other heat exchanger systems are contemplated by the system of the present teachings. For example, a thermoelectric device, such as, for example, but not limited to, a LAIRD™ Thermal Systems thermal plate model #SH10 125 05 L1, can provide both heating and cooling to the perfusate. Temperature can be measured by temperature sensor 1012 (FIG. 4H) before the perfusate enters the heat exchanger and by temperature sensor 1014 (FIG. 4H) after the perfusate exits the heat exchanger.

Continuing to refer to FIGS. 4G and 4H, gas can be removed from the perfusate by any method available. In some configurations, air trap 1009 can provide a space for gas bubbles to float to the top of an enclosure, leaving the liquid perfusate to flow into kidney 2029. Other gas trapping and removal systems are contemplated. Under normal circumstances (i.e., no triggers set off by sensor data), the perfusate can enter arterial cannula 1033 and then enter kidney 2029. The result of the filtering task of kidney 2029 is fluid exiting the ureter through ureter cannula 1031. Perfusate exiting kidney 2029 will ultimately be directed to fluid reservoir 1027. In some configurations, the exiting perfusate, the output, can be measured. Flow sensor 1007 can accumulate output from ureter 1031 over a period of time, by means of pinch valve 1039. When the accumulation time has expired, the amount of output is known, and pinch valve 1039 can release the output into fluid reservoir 1027. In some configurations, output can be extracted through a syringe port. The output can be tested on-site or elsewhere.

Figure 5A:
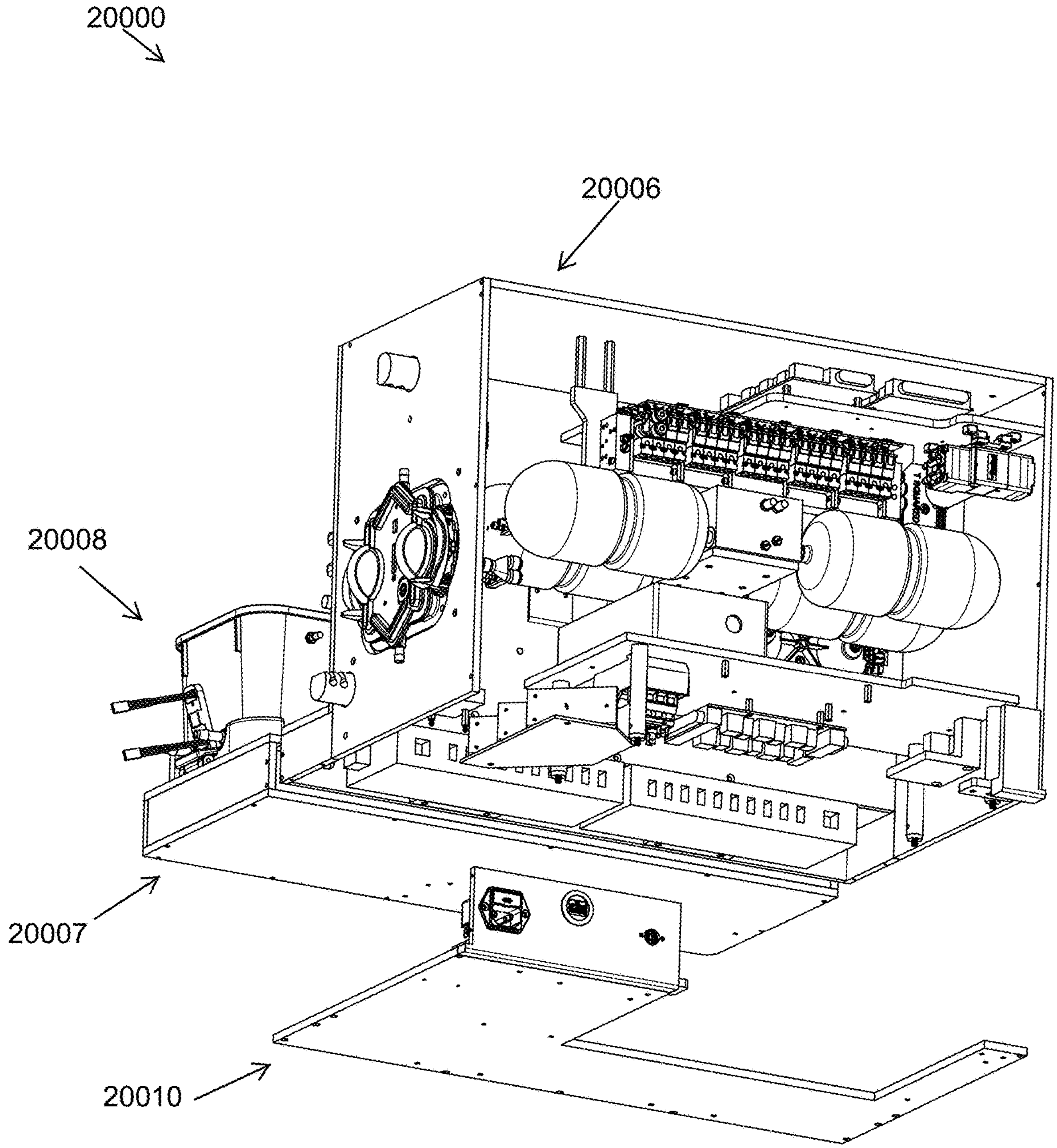
FIGS. 5A-5B are perspective diagrams of views of components of a first implementation of the system of the present teachings.
Figure 5B:
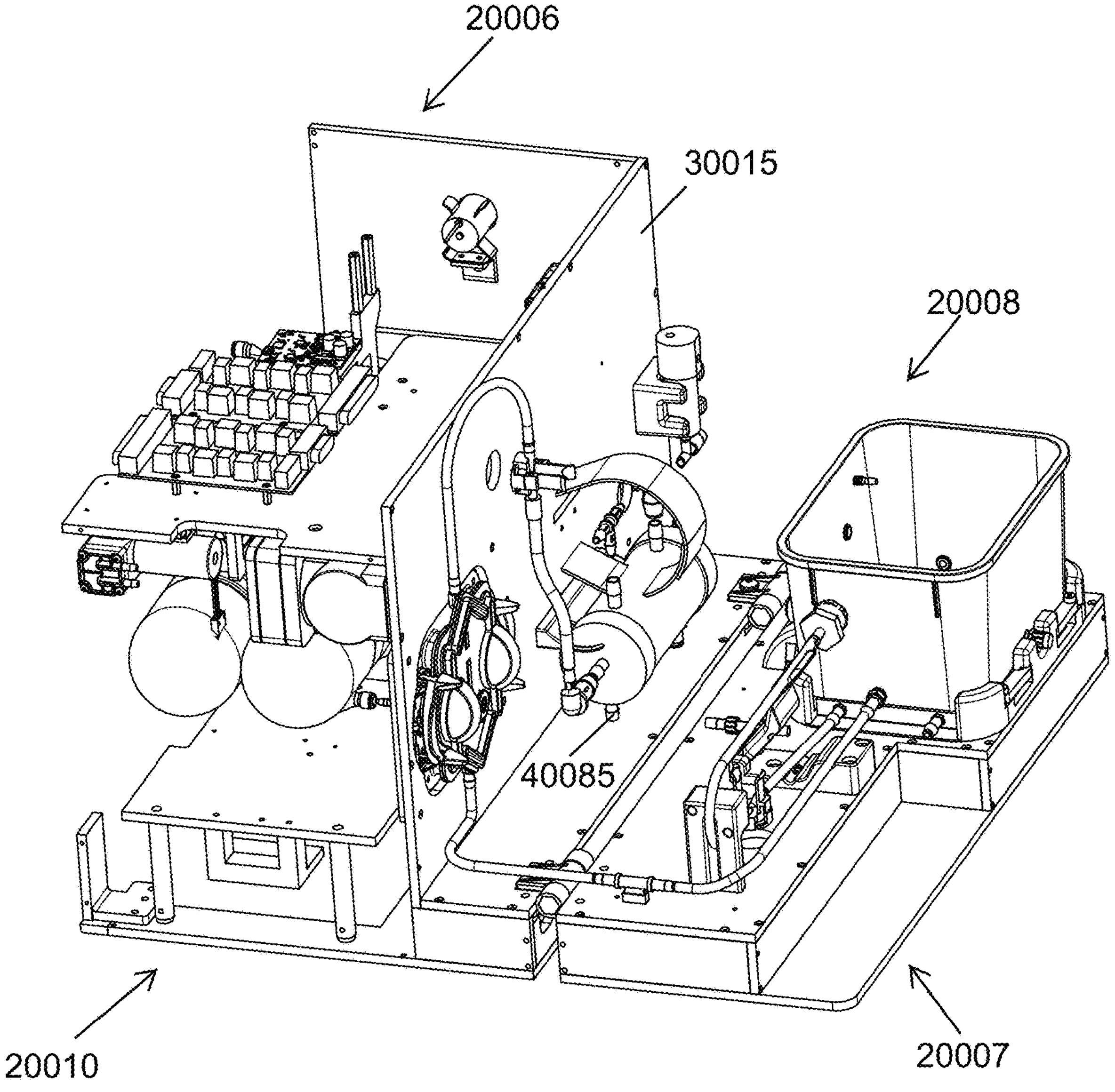
Figure 8A:
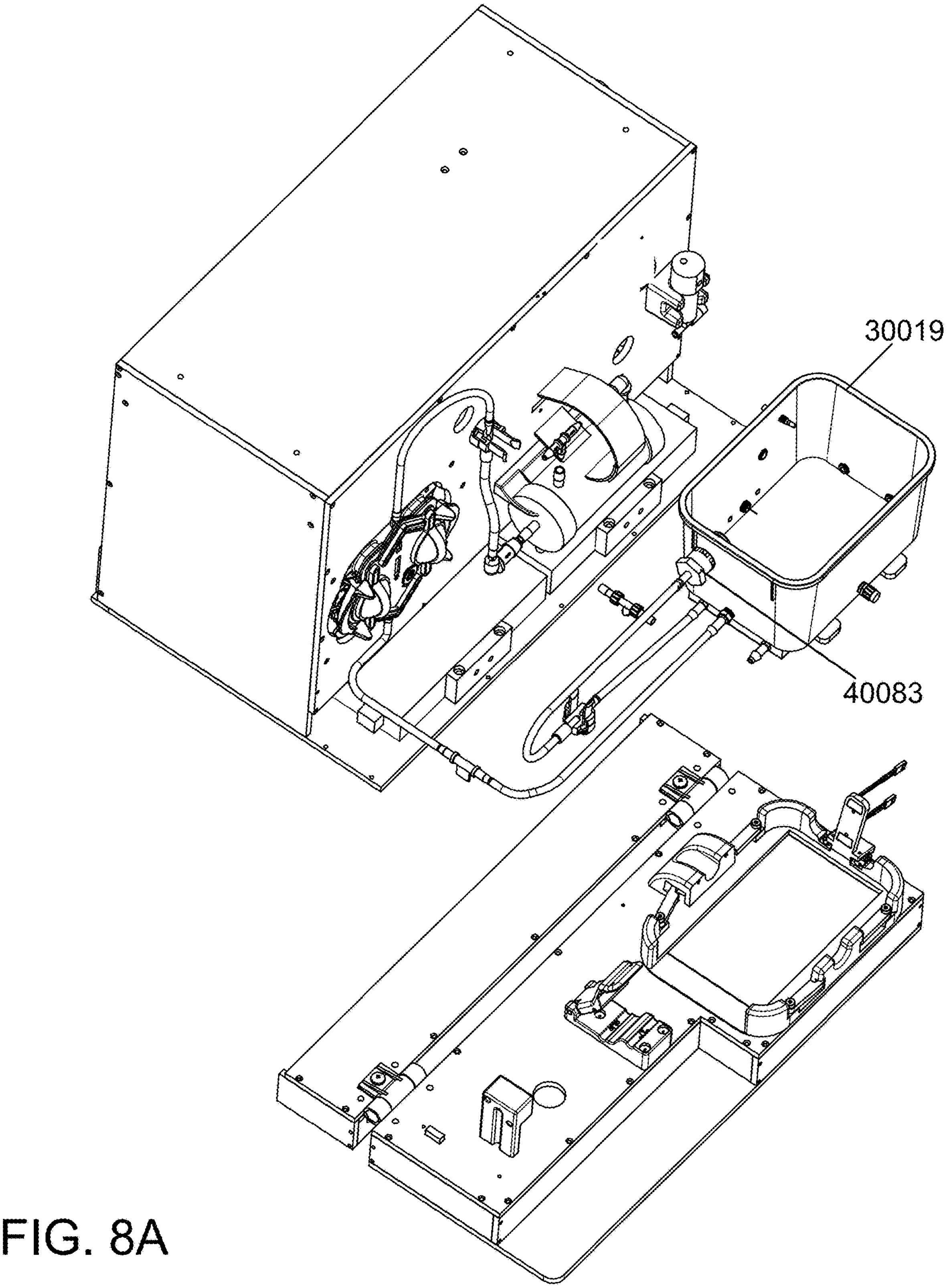
FIGS. 8A-8I are perspective diagrams of views of the disposable assembly of the first implementation of the system of the present teachings.

Referring now to FIGS. 5A and 5B, exemplary system 20000 of the present teachings can implement, for example, any of systems 500A-500F and systems 1000A and 1000B. Exemplary system 20000 can include, but is not limited to including, electronics assembly 20010, durable enclosure assembly 20006, disposable interface enclosure assembly 20007, and disposable assembly 20008. Other configurations of the components of the system are contemplated and are described herein. Electronics assembly 20010 can include components that can power and enable sensor data processing and controls of, for example, but not limited to, any one or all of system components such as sensors, thermal management 513 (FIG. 4F), gas management 1025 (FIG. 4F), infusion system 507 (FIG. 4F) and pneumatics 505 (FIG. 4F). Durable enclosure assembly 20006 can include, for example, but not limited to, pneumatic valve systems, air reservoirs, and perfusion, and possibly infusion pump durable interfaces. Disposable interface enclosure assembly 20007 can include mounting platform for disposable assembly 20008, including but not limited to, a tissue enclosure, a thermal management system, an oxygenator, a perfusion pump, sensors, and tubing connecting all the disposable components and enabling fluid circulation. Gas from gas management system 1025 (FIG. 4F) can be supplied to tissue enclosure 30019 (FIG. 8A) or elsewhere through gas outlet(s) 40085.

Figure 6A:
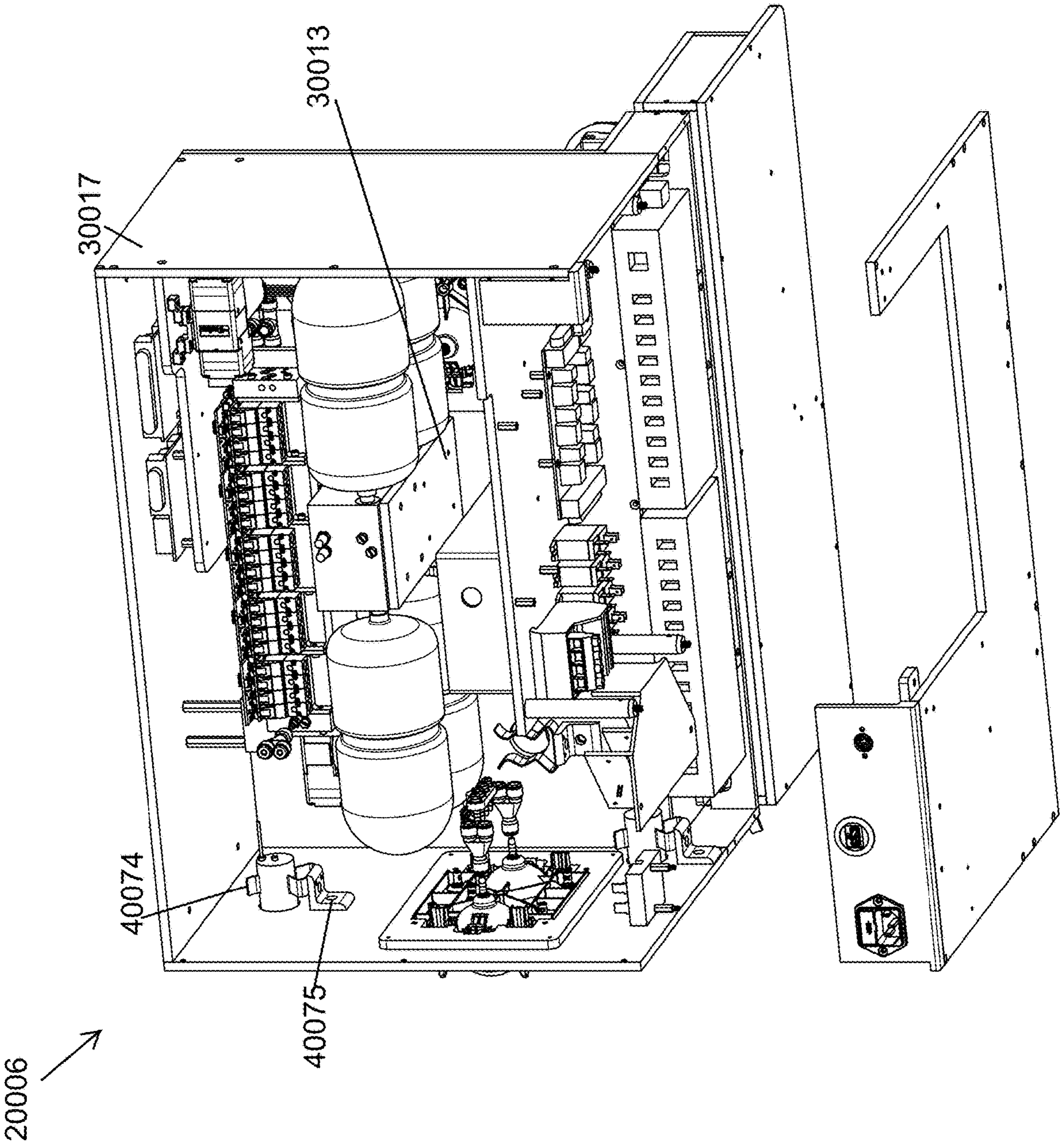
FIGS. 6A-6B are perspective diagrams of views of the durable enclosure assembly of the first implementation of the system of the present teachings.
Figure 6B:
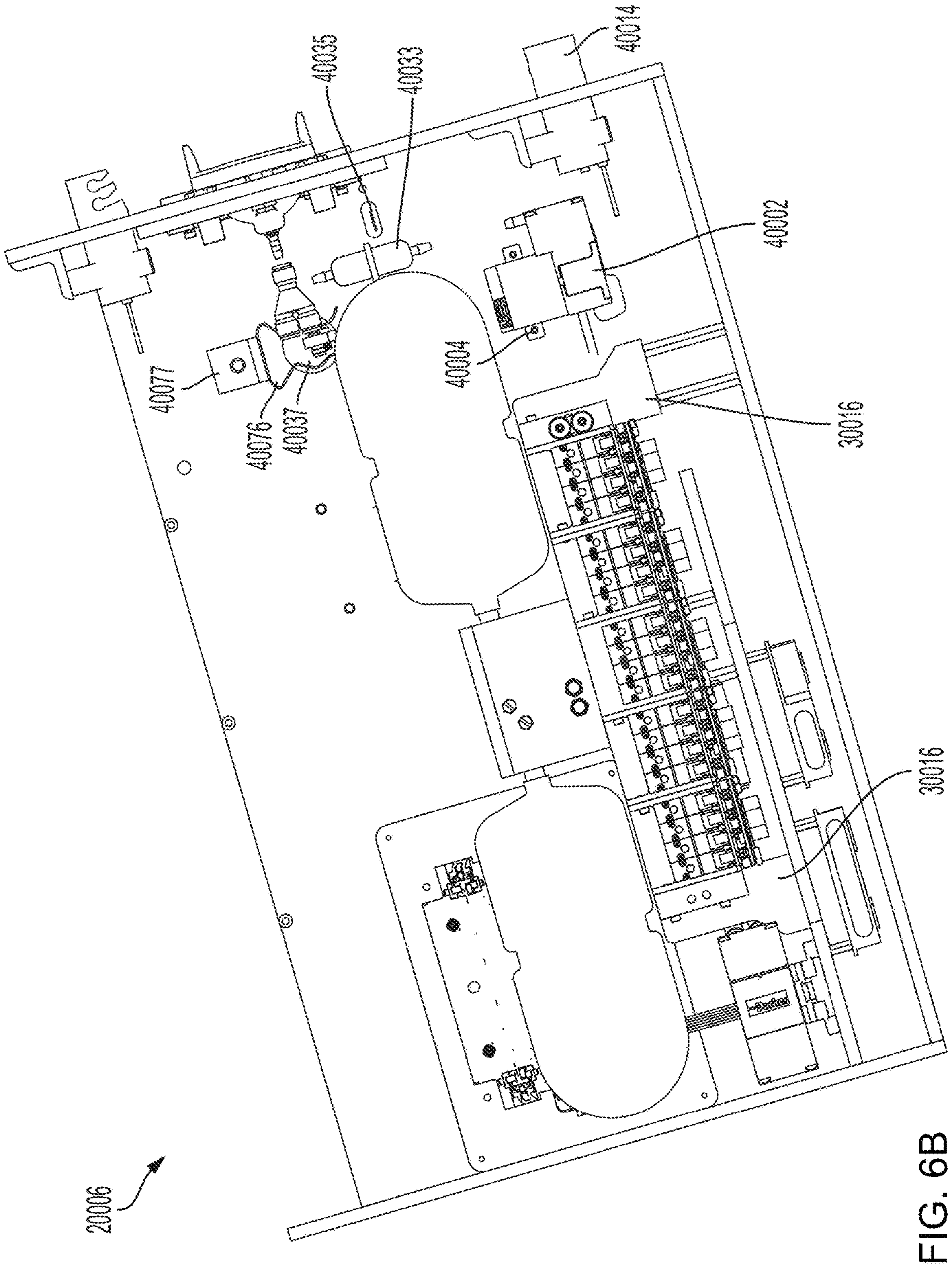
Figure 8B:
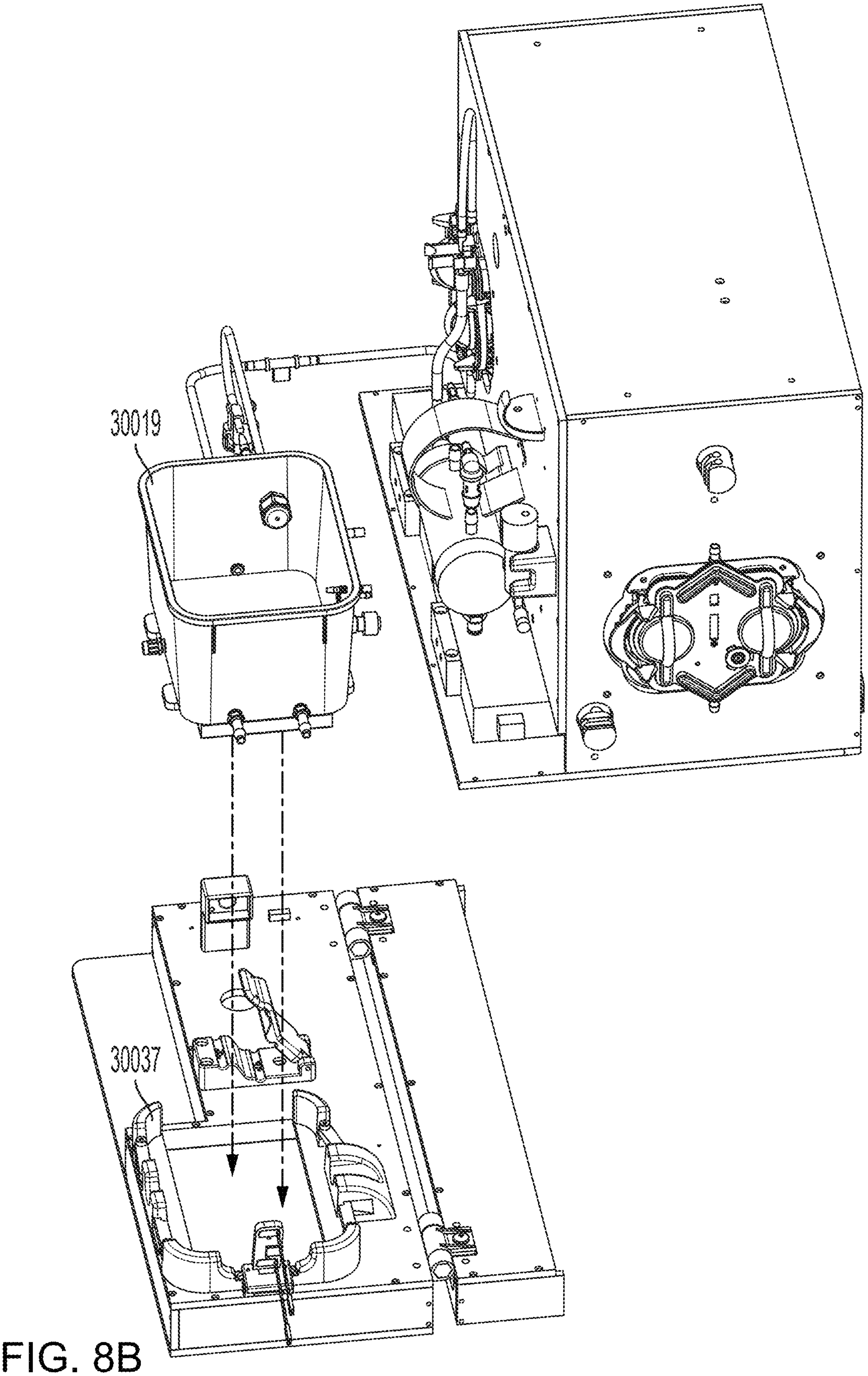
Figure 8C:
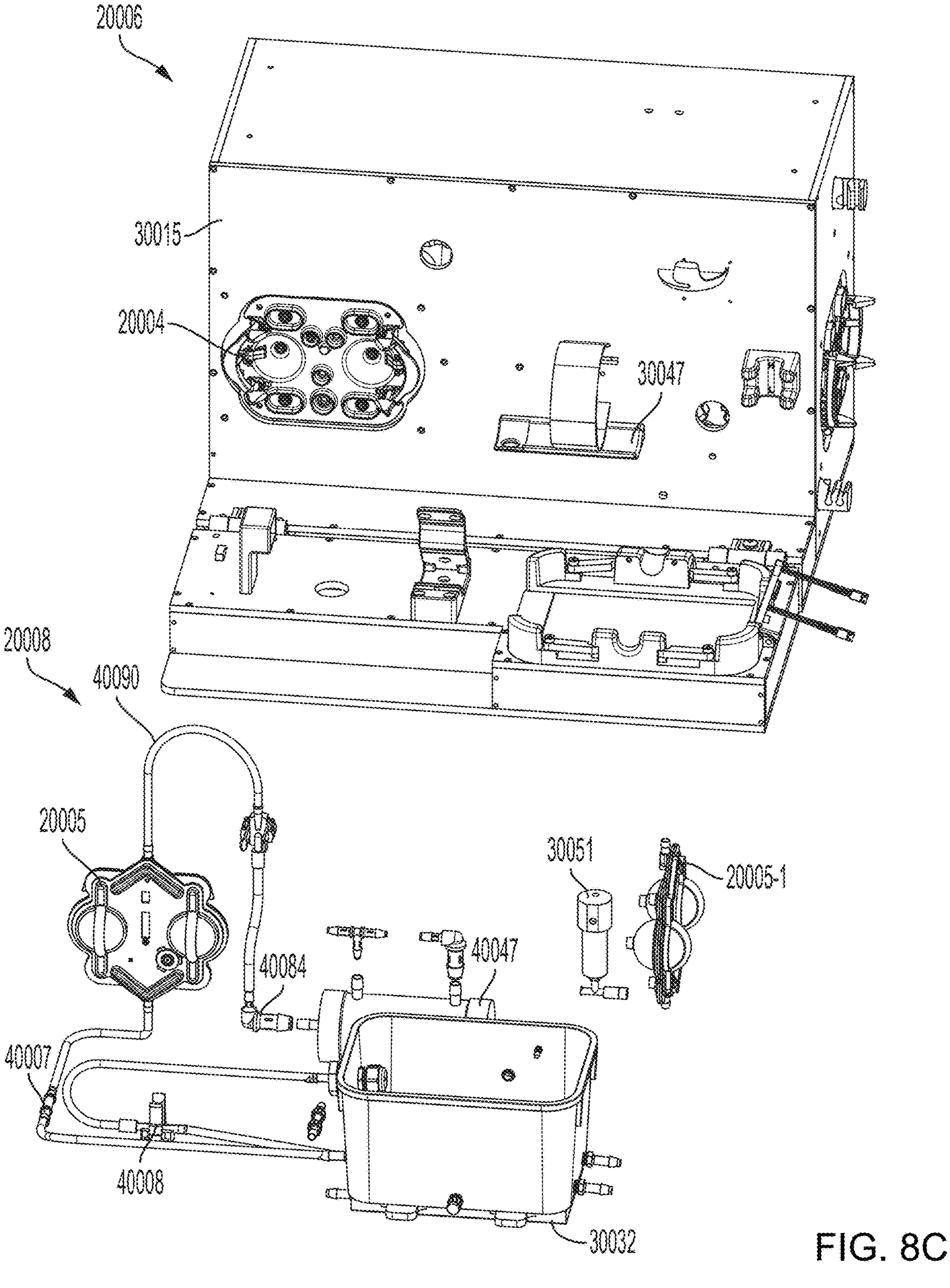
Figure 8D:
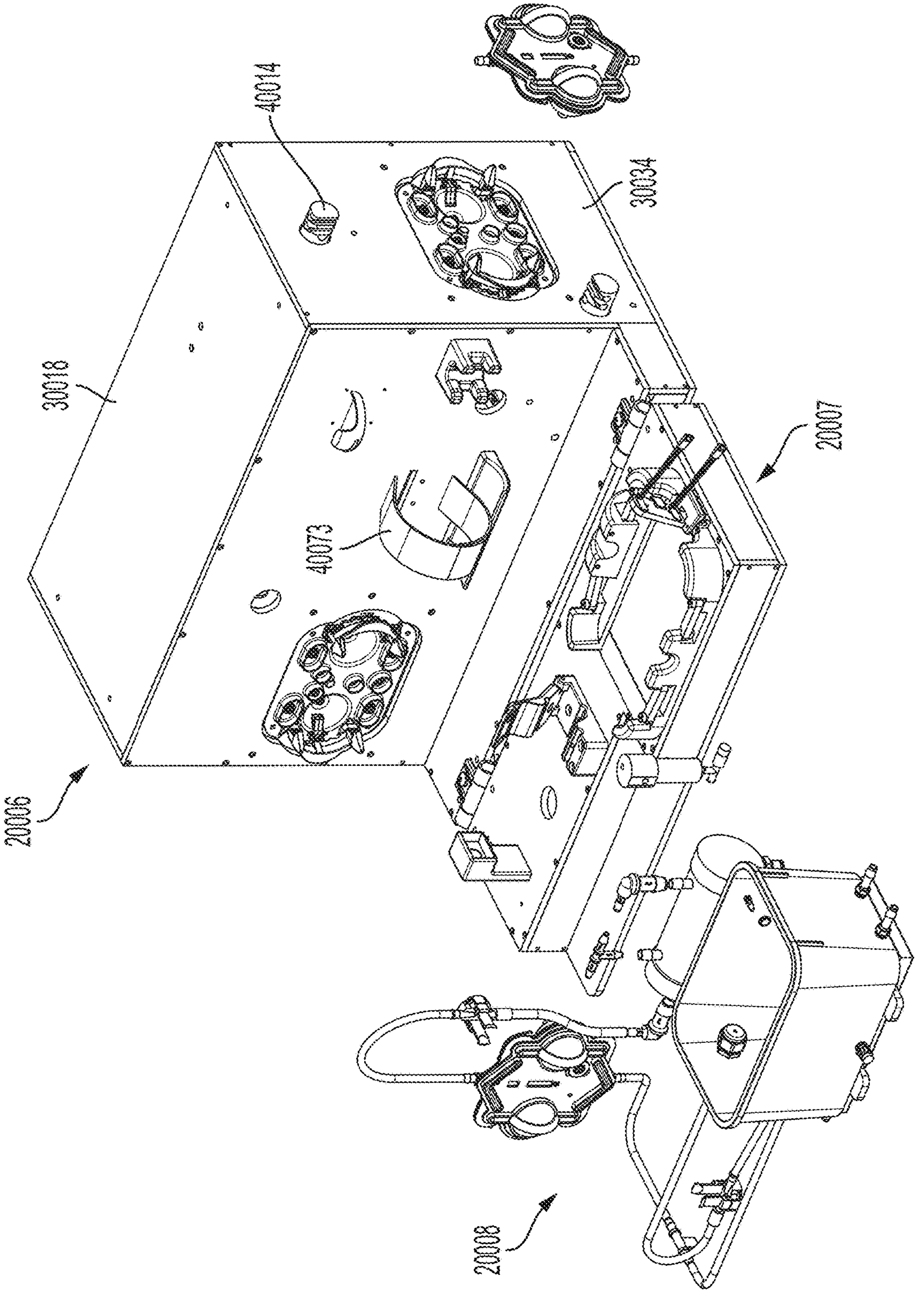
Figure 8E:
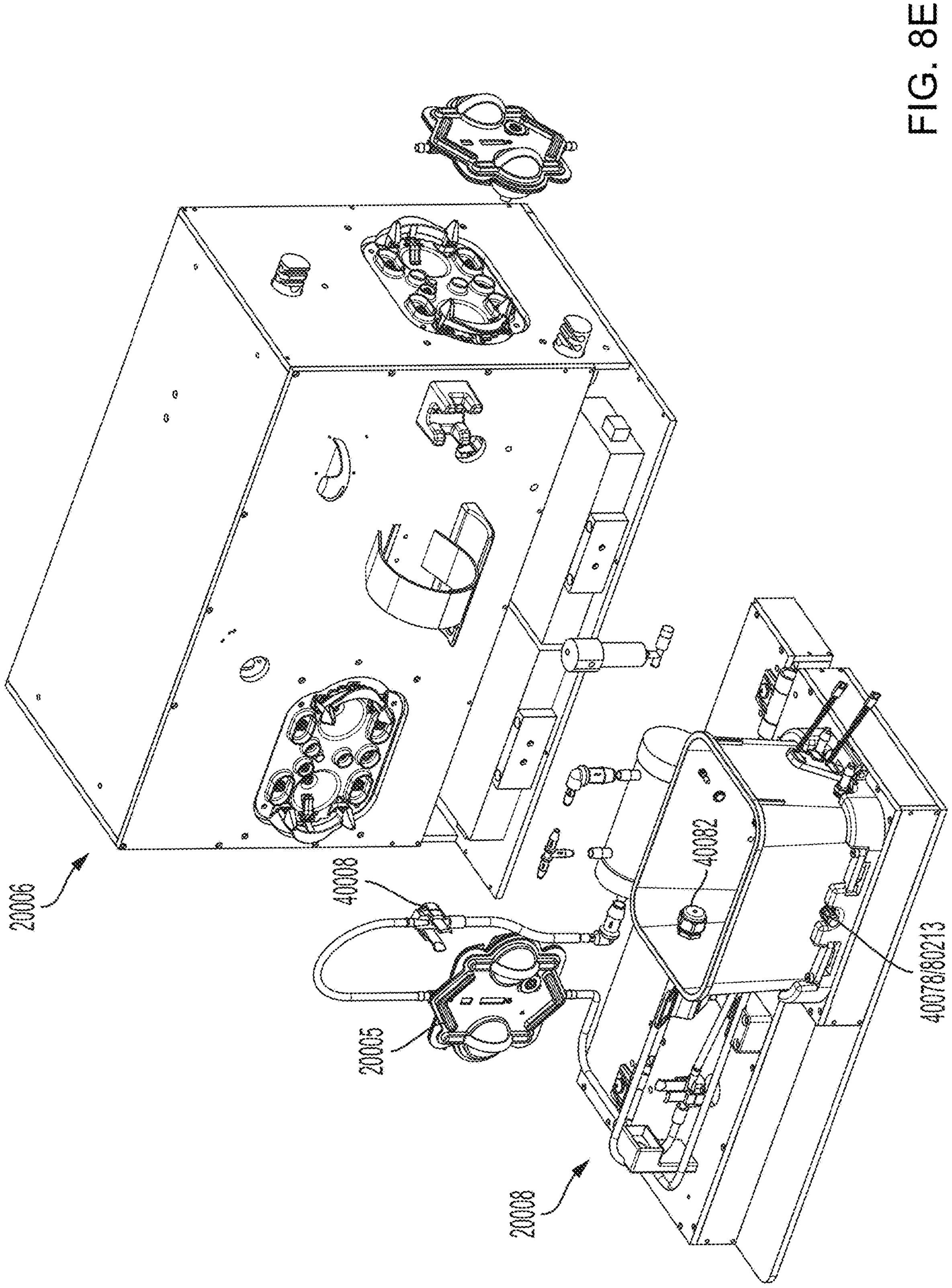

Referring now to FIGS. 6A-6B, 8C, and 8D, durable enclosure assembly 20006 can include, for example, but not limited to, assemblies such as, for example, pneumatic pumping assembly 20004, pumping bracket assembly 20003, and pumping manifold assembly 20002. Durable enclosure assembly 20006 can include an enclosure providing protection for the assemblies. The enclosure can include, for example, pumping bracket mount side plate 30017 (FIG. 6A), pumping bracket mount top plate 30018 (FIG. 8D), pumping bracket mount plate 30015 (FIG. 5B), durable side infusion plate 30034 (FIG. 8D). Enclosure interior and exterior mounting and connector features may be necessary for a specific configuration. Commercially available electrical component tiedown strap 40073 (FIG. 8D) for strapping equipment such as an oxygenator to the enclosure is an example of an externally-mounted feature of a configuration of the present teachings. The oxygenator can further rest upon oxygenator mount 30047 (FIG. 8C). Within durable enclosure assembly 20006, pinch valve 40014 (FIG. 6B), used to redirect flow for filling and draining, can be held in place by bracket 40074 (FIG. 6A) and can be can be attached to durable enclosure assembly 20006 by corner bracket 40075 (FIG. 6A). The system of the present teachings can further include, within durable enclosure assembly 20006, pinch valve 40037 (FIG. 6B), used to redirect flow for filling and draining. Pinch valve 40037 (FIG. 6B) can be held in place by bracket 40076 (FIG. 6B) which can be attached to durable enclosure assembly 20006 by corner bracket 40077 (FIG. 6B). Gas pump 40002 (FIG. 6B), mounted by gas pump mount 40004 (FIG. 6B), can pump gas, filtered by pump filter 40033 (FIG. 6B), into oxygenator 40047 (FIG. 8C). Level sensor 40035 (FIG. 6B) can verify the fluid level in tissue enclosure 30019 (FIG. 8B).

Figure 6D:
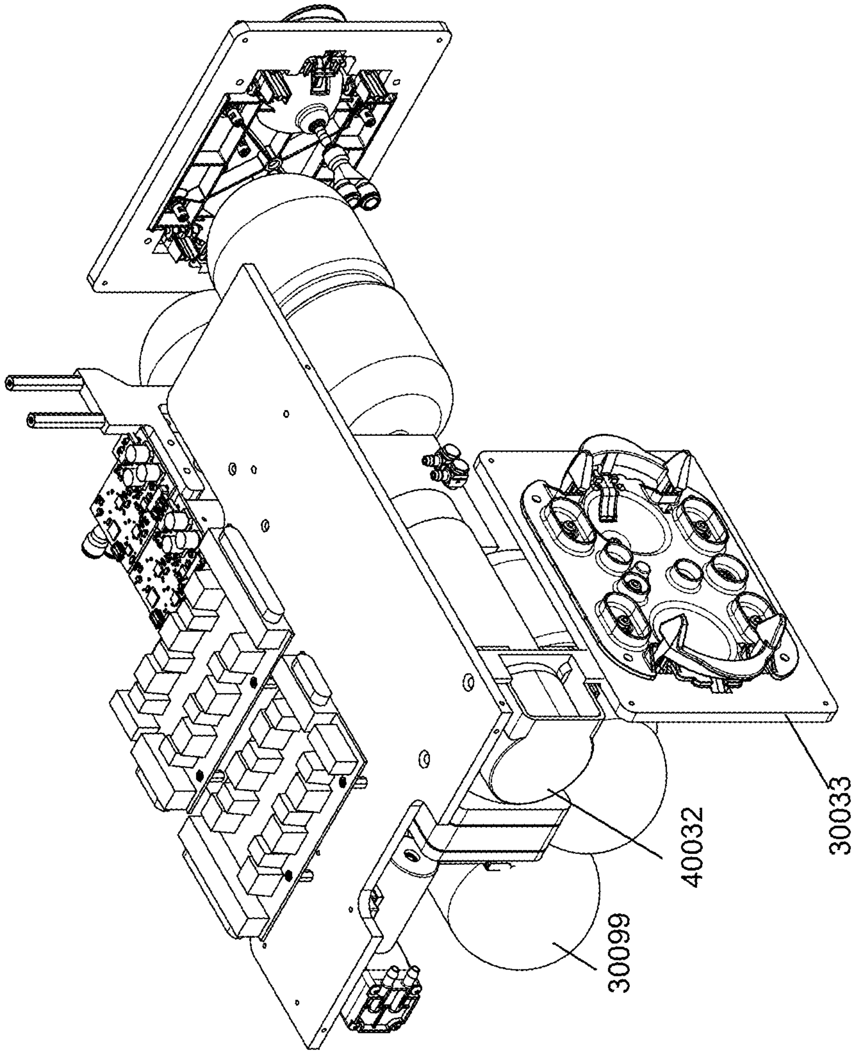
FIGS. 6D-6H are perspective diagrams of views of the valves and pumps of the first implementation of the system of the present teachings.
Figure 6E:
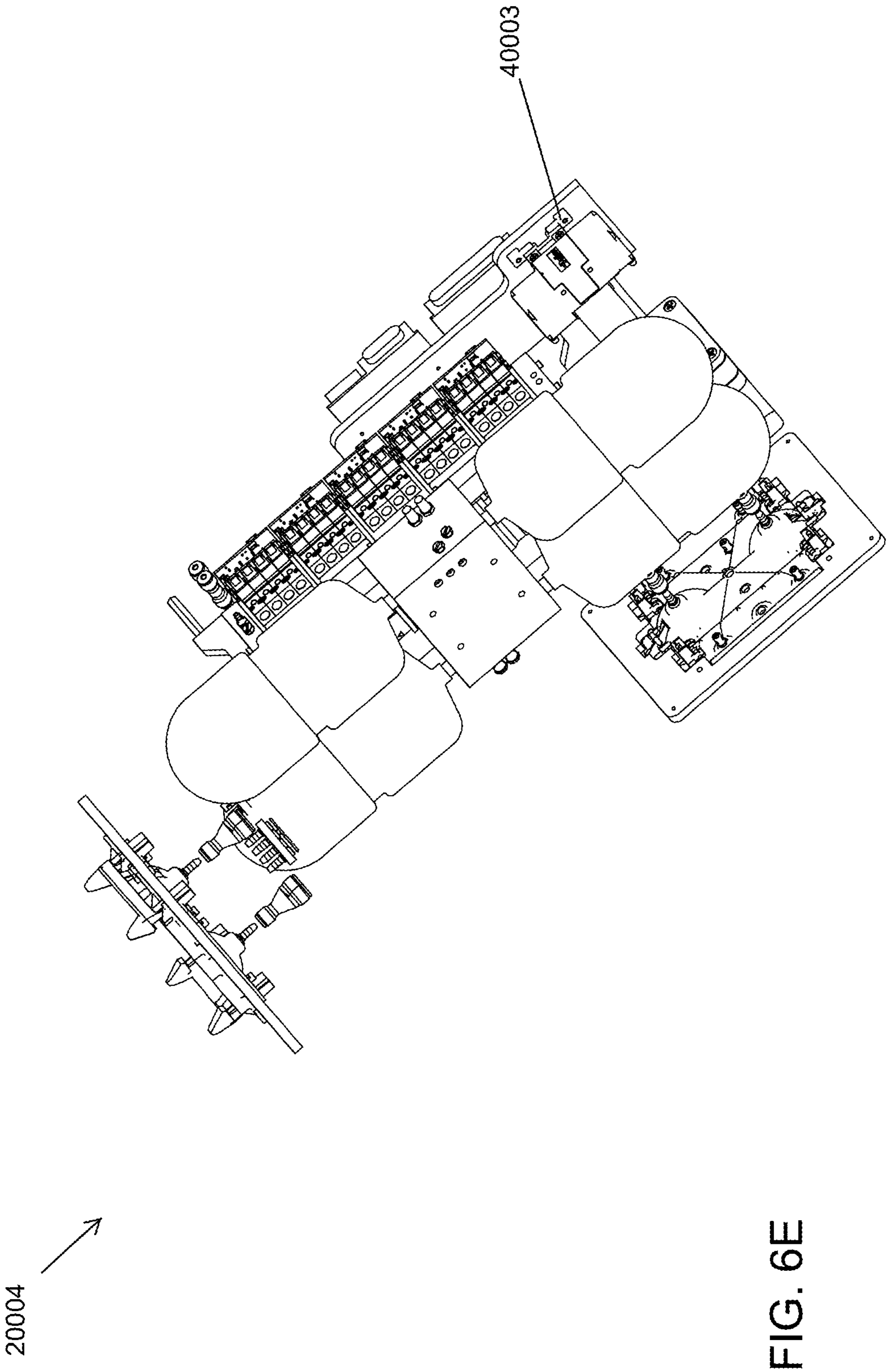
Figure 6F:
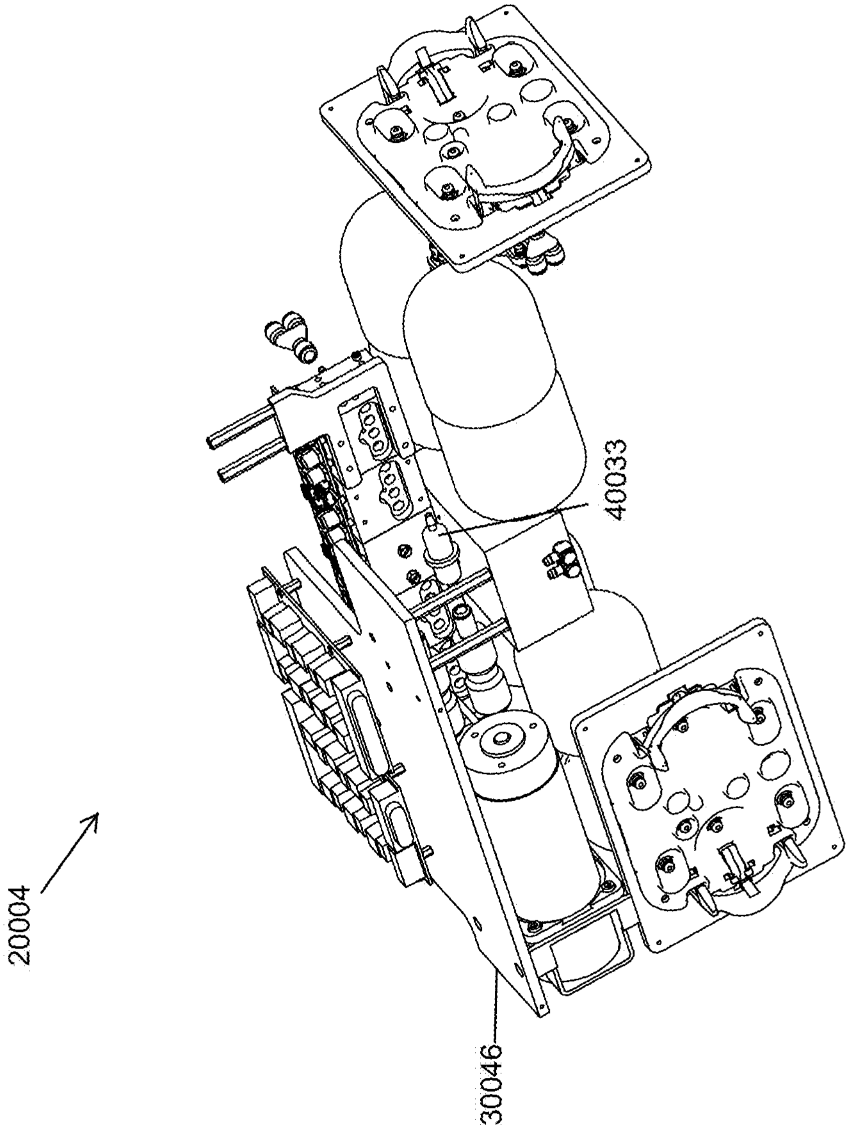
Figure 6G:
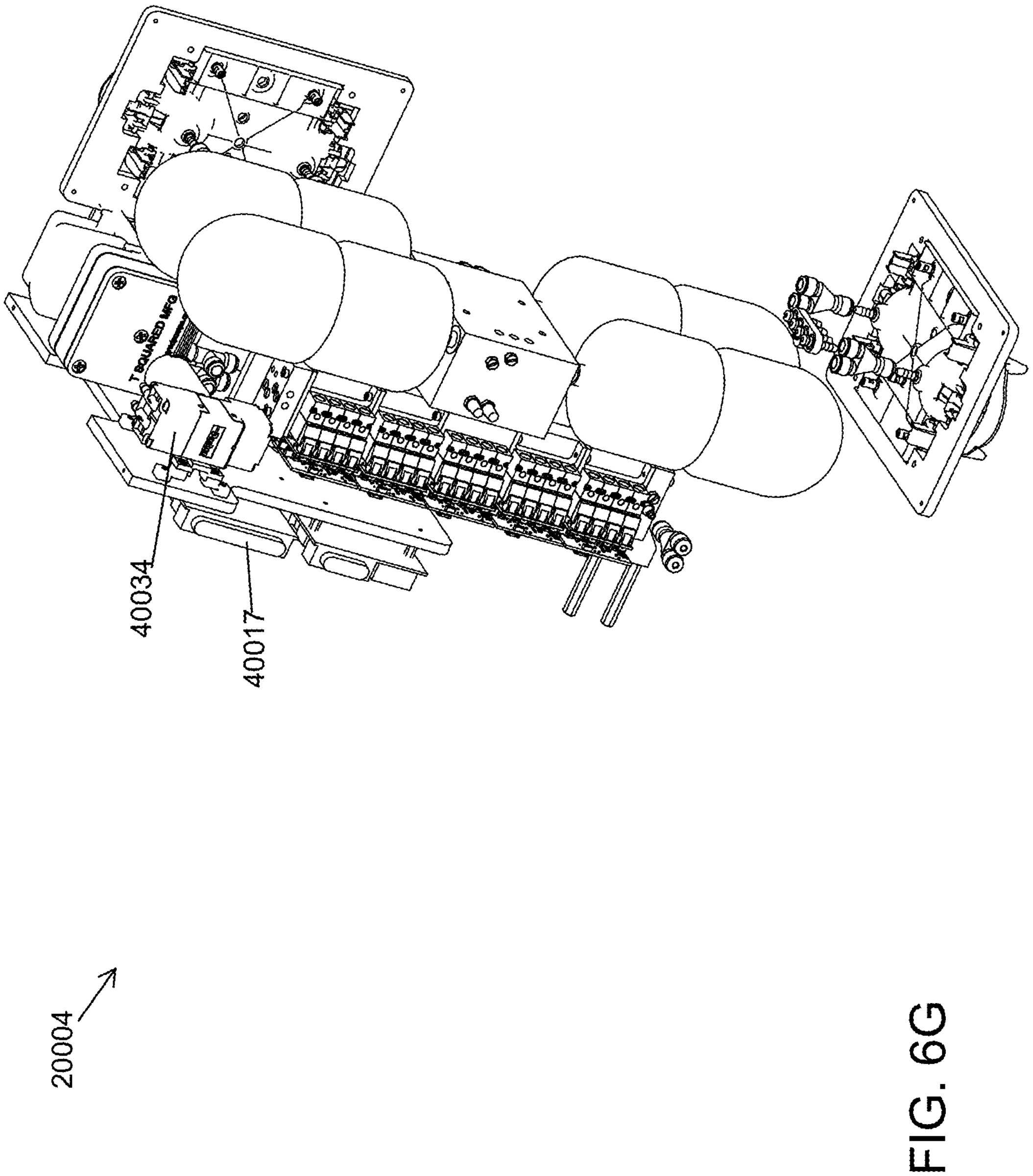
Figure 6H:
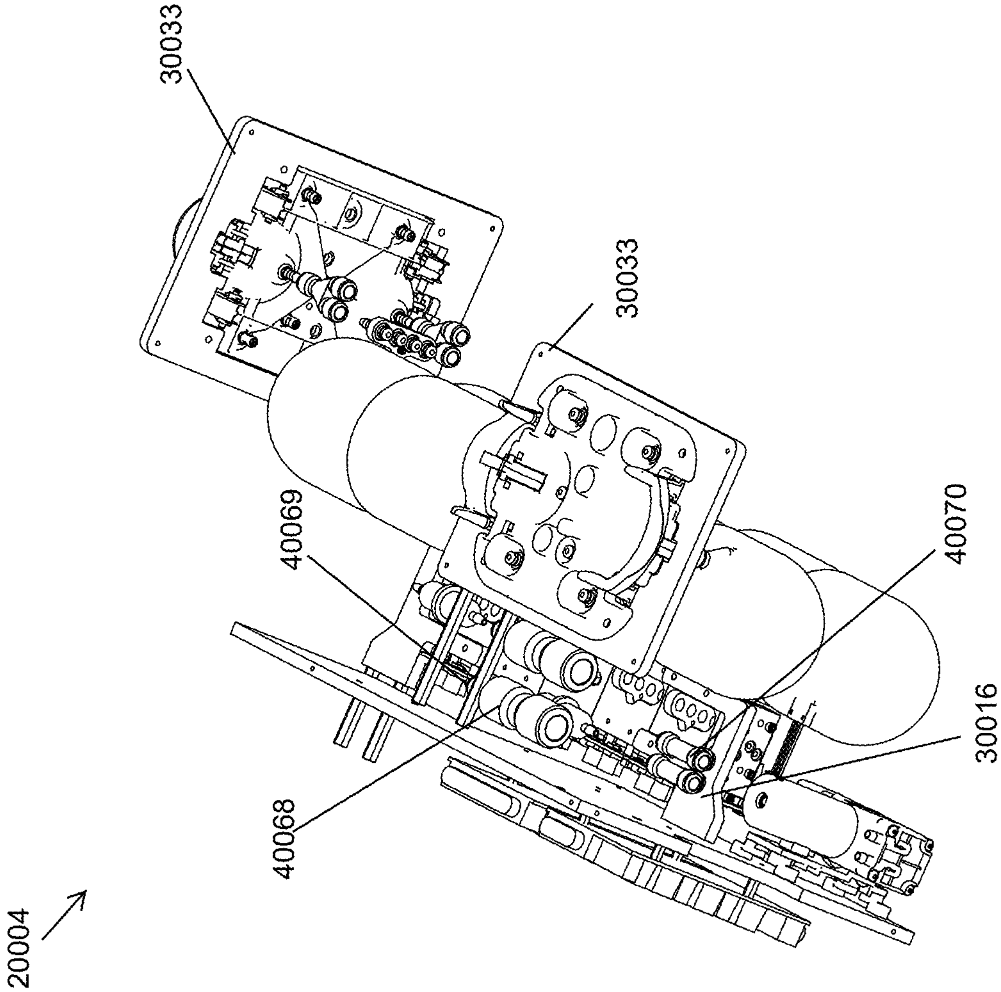

Referring now to FIGS. 6D-6H, pneumatic pumping assembly 20004, held at least partially in place within enclosure 20006 by pumping bracket mount bottom plate 30013 (FIG. 6A) and pumping bracket mount support plates 30016 (FIG. 6H), can be attached to pumping bracket mount top plate 30018 (FIG. 8D) by standoffs. Assembly 20004 can include, for example, but not limited to, air reservoir tanks 30099 (FIG. 6D) that can retain air available for positive pressure required for pneumatic processes, and vacuum pump 40032 (FIG. 6D) for providing vacuum air pressure. Air reservoir tanks can be coupled with pumping manifold assembly 20002 (FIG. 6K) to provide the air necessary to enable pneumatic operation. Pump mounting plate 30046 (FIG. 6F) can provide a mounting surface for a main controller board and power switching board 40017 (FIG. 6G) on one side, and air pump 40034 (FIG. 6G), held in place on pump mounting plate 30046 by air pump mount 40003, on the other side. Air pump 40034 (FIG. 6G) can be operable coupled with pump filter 40033 (FIG. 6B) to provide filtration of incoming air. Enabling coupling of the components in assembly 20004 are connector 40070 (FIG. 6H), connector 40068 (FIG. 6H), and connector 40069 (FIG. 6H).

Figure 6I:
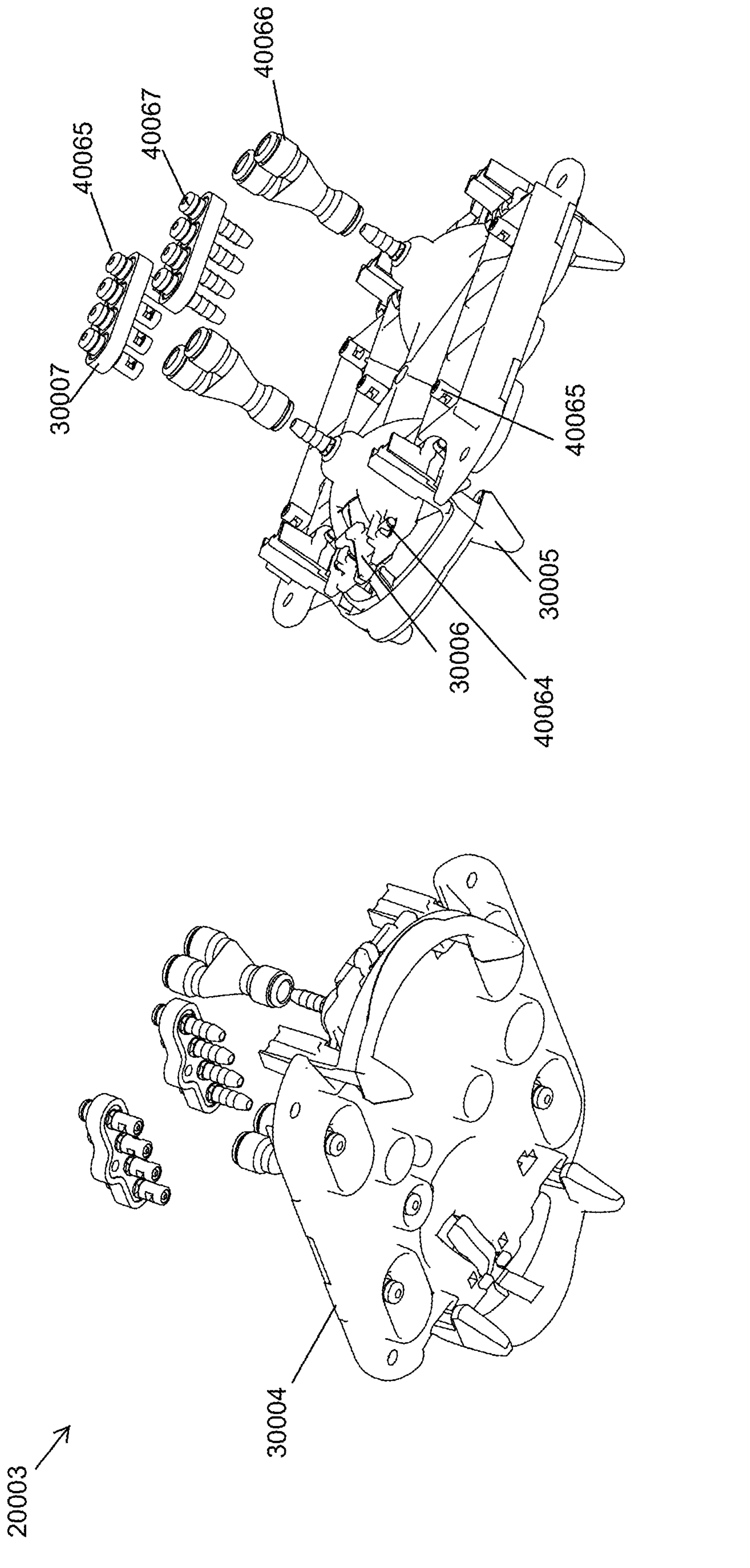
FIG. 6I is a perspective diagram of a perfusion pump of the first implementation of the system of the present teachings.

Referring now to FIG. 6I, pumping bracket assembly 20003 can include, for example, but not limited to, pumping bracket 30004 and pumping bracket latch 30005 that can surround mounting plate 30033 (FIGS. 6D and 6H). Pumping bracket 30004 can be configured to geometrically conform to a disposable pumping cassette that can be held in pumping bracket 30004, and can be released after use by pumping bracket ejector 30006 that can, for example, have a dowel pin 40064 as its axis of movement. Pumping can be enabled by positive and negative pressure delivered by the pneumatic system of the present teachings. Pumping manifold pneumatic tubing interface 30007 can receive hose barbs 40065 and hose barb non-valve inserts 40067 which can enable tubing between the pneumatic system and control of the disposable cassette. Negative and positive pressure can be delivered through tubing that feeds or withdraws air through tubing that traverses hose barbs 40065 and non-valve inserts 40067.

Figure 6J:
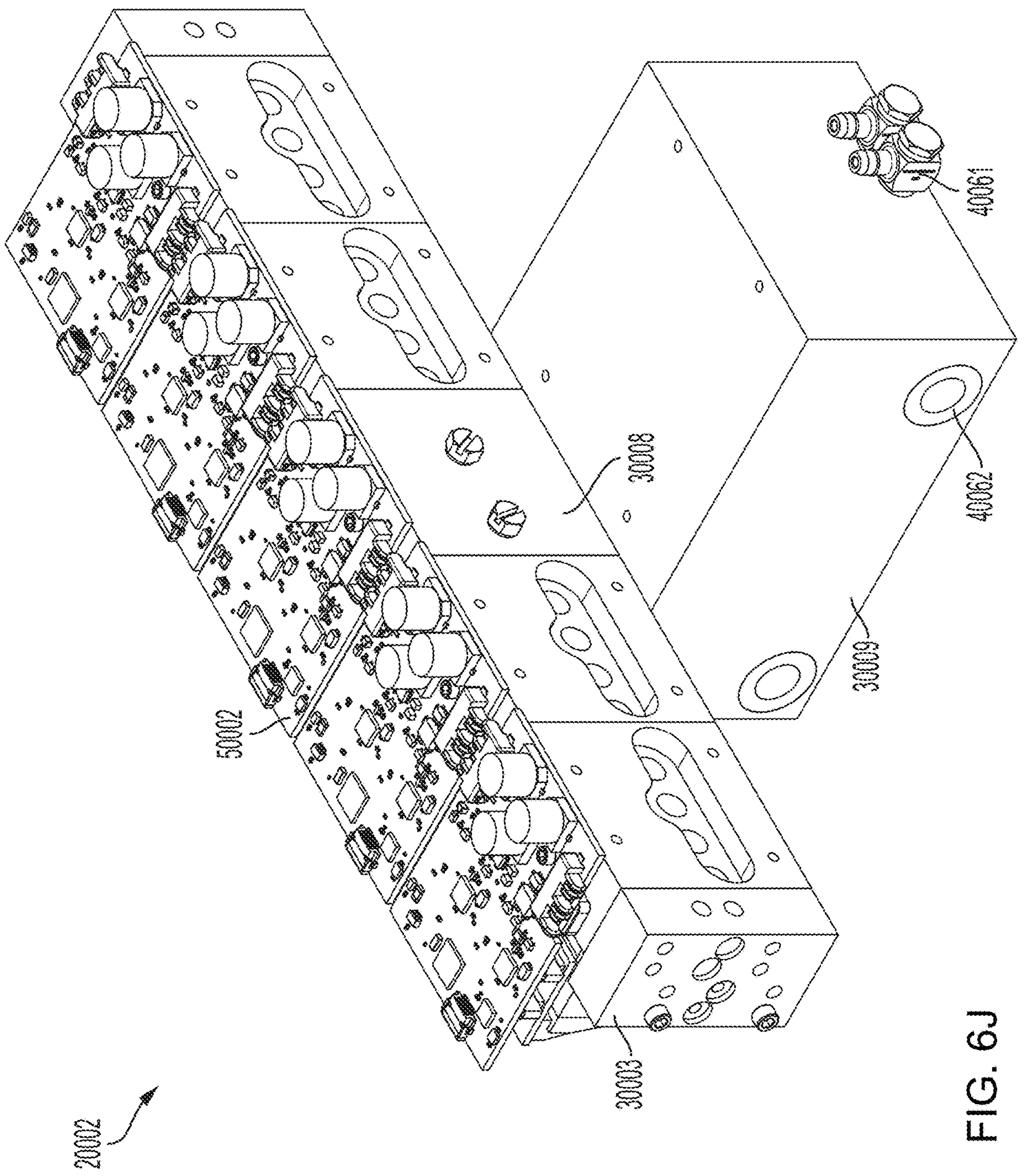
FIGS. 6J-6K are perspective diagrams of views of the manifold system of the first implementation of the system of the present teachings.
Figure 6K:
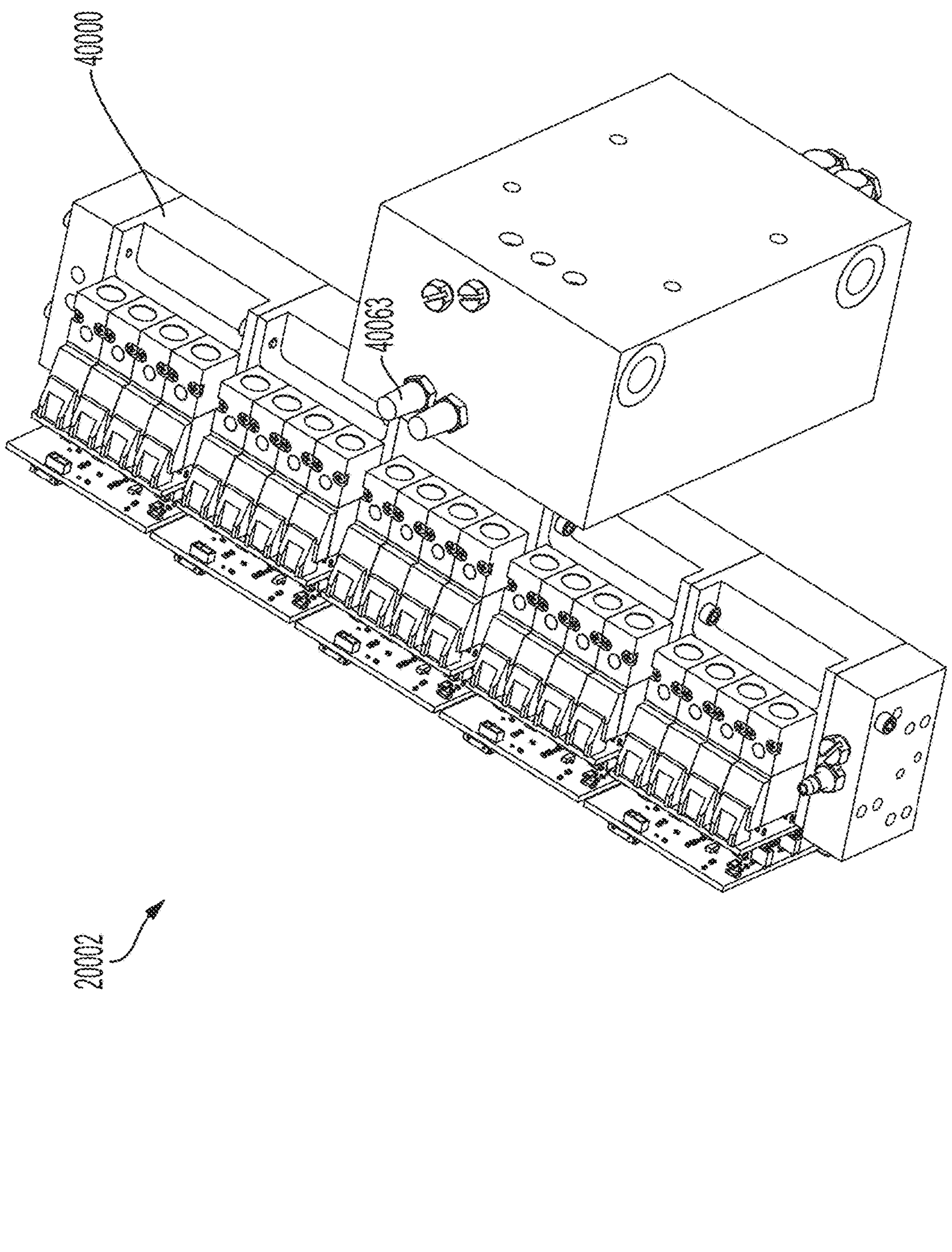

Referring now to FIGS. 6J and 6K, pumping manifold assembly 20002 can include, for example, two of manifolds 40000 (FIG. 6K) to apply the chambers of pumping cassette 20005 with regulated pressure and two of manifolds 40000 (FIG. 6K) to supply the valves of pumping cassette 20005 with a set (higher) pressure. The chambers fill with either gas or fluid and the valves direct the flow. The fifth manifold is a regulator. Each of manifolds 40000 (FIG. 6K) is connected to a controlling circuit board 50002 (FIG. 6J). The five manifolds are sandwiched between pumping manifold end plates 30003 (FIG. 6J). Gas reservoirs 30099 (FIG. 6D) can mount to accumulation tank manifold block 30009 (FIG. 6J) at fitting locations 40062 (FIG. 6J). Accumulation tank manifold block 30009 (FIG. 6J) can couple with regulator manifold block 30008 (FIG. 6J) and thus control positive pneumatic pressure through tube fitting 40061 to pumping cassette(s). Accumulation tank manifold block 30009 can include muffler 40063 that can vent pressurized air to the atmosphere.

Figure 7A:
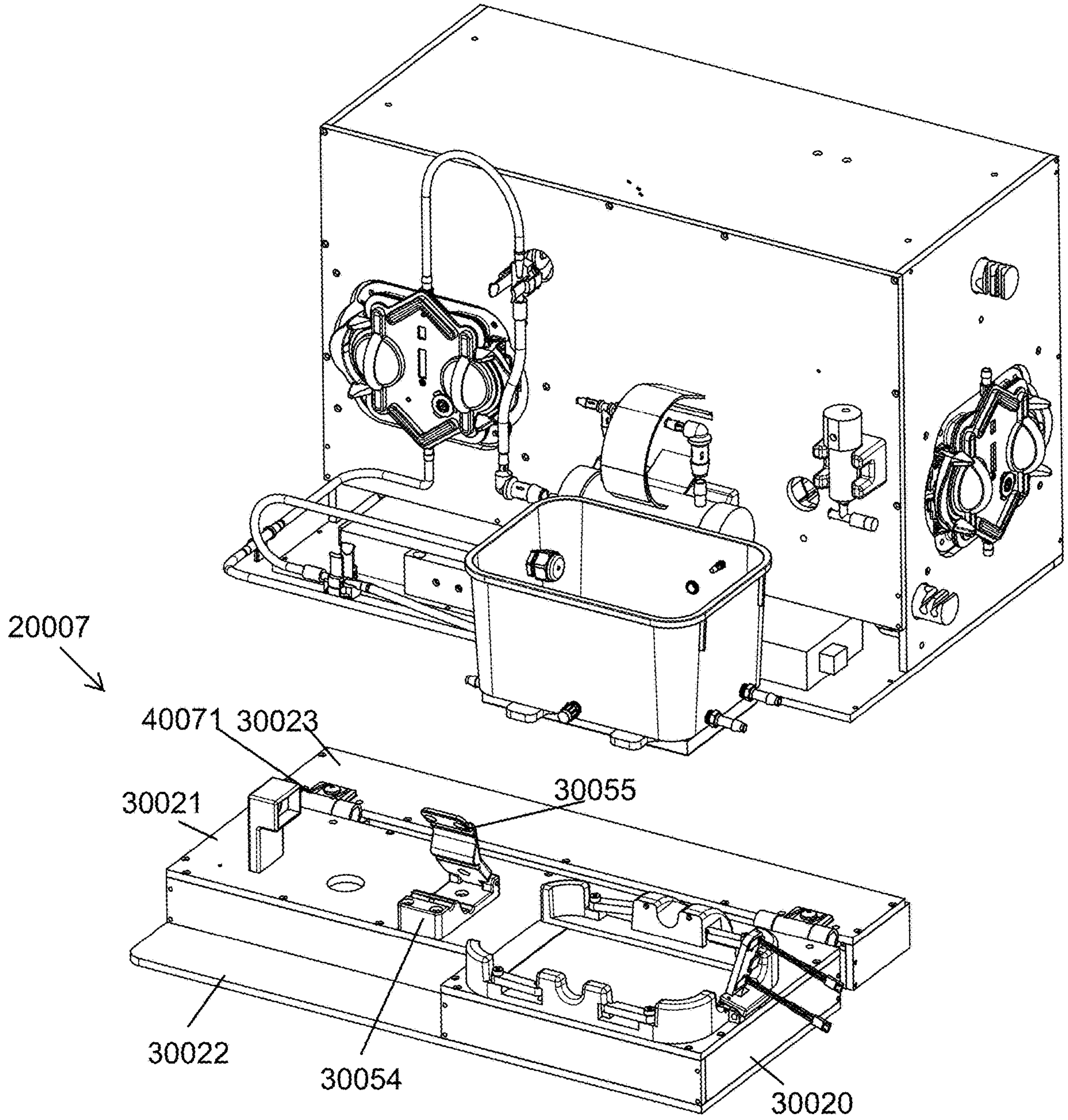
FIGS. 7A, 7B and 7C are perspective diagrams of views of the disposable interface enclosure assembly of the first implementation of the system of the present teachings.
Figure 7B:
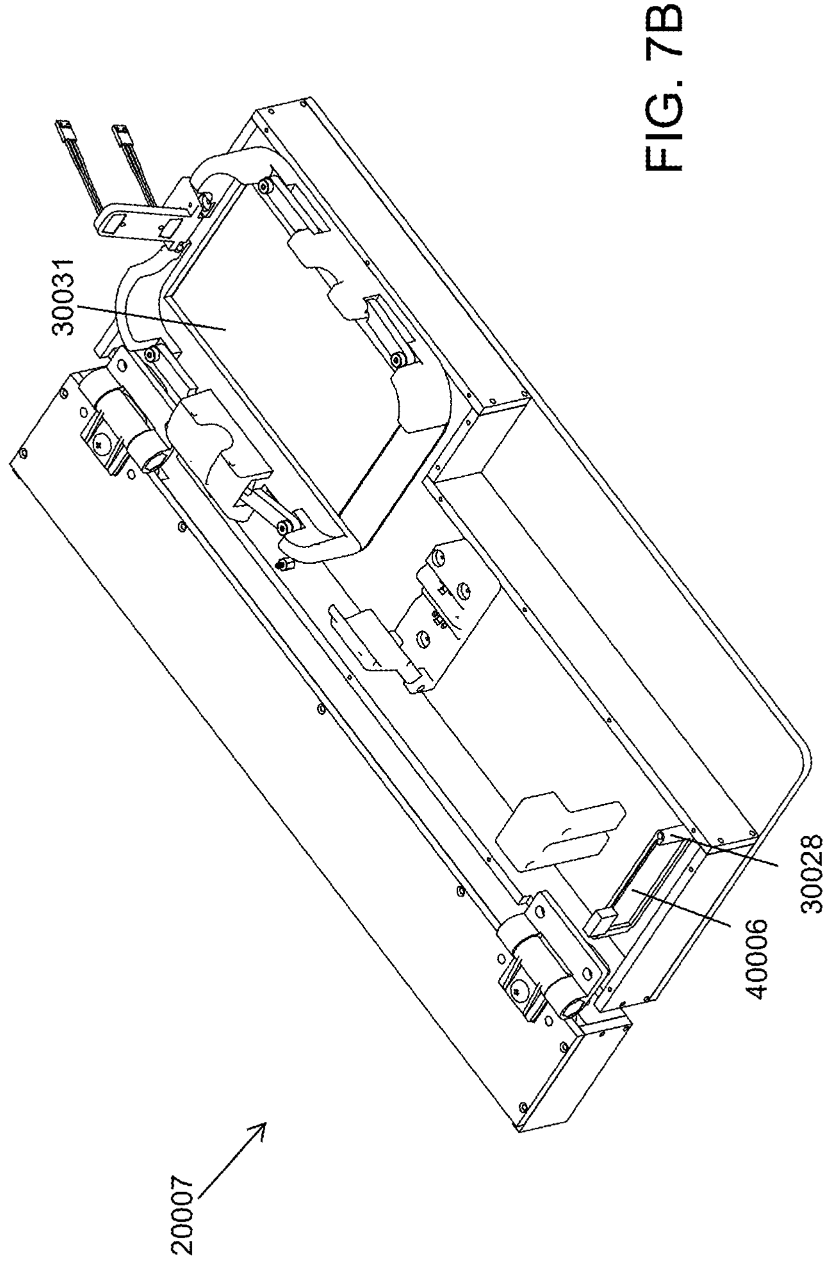
Figure 7C:
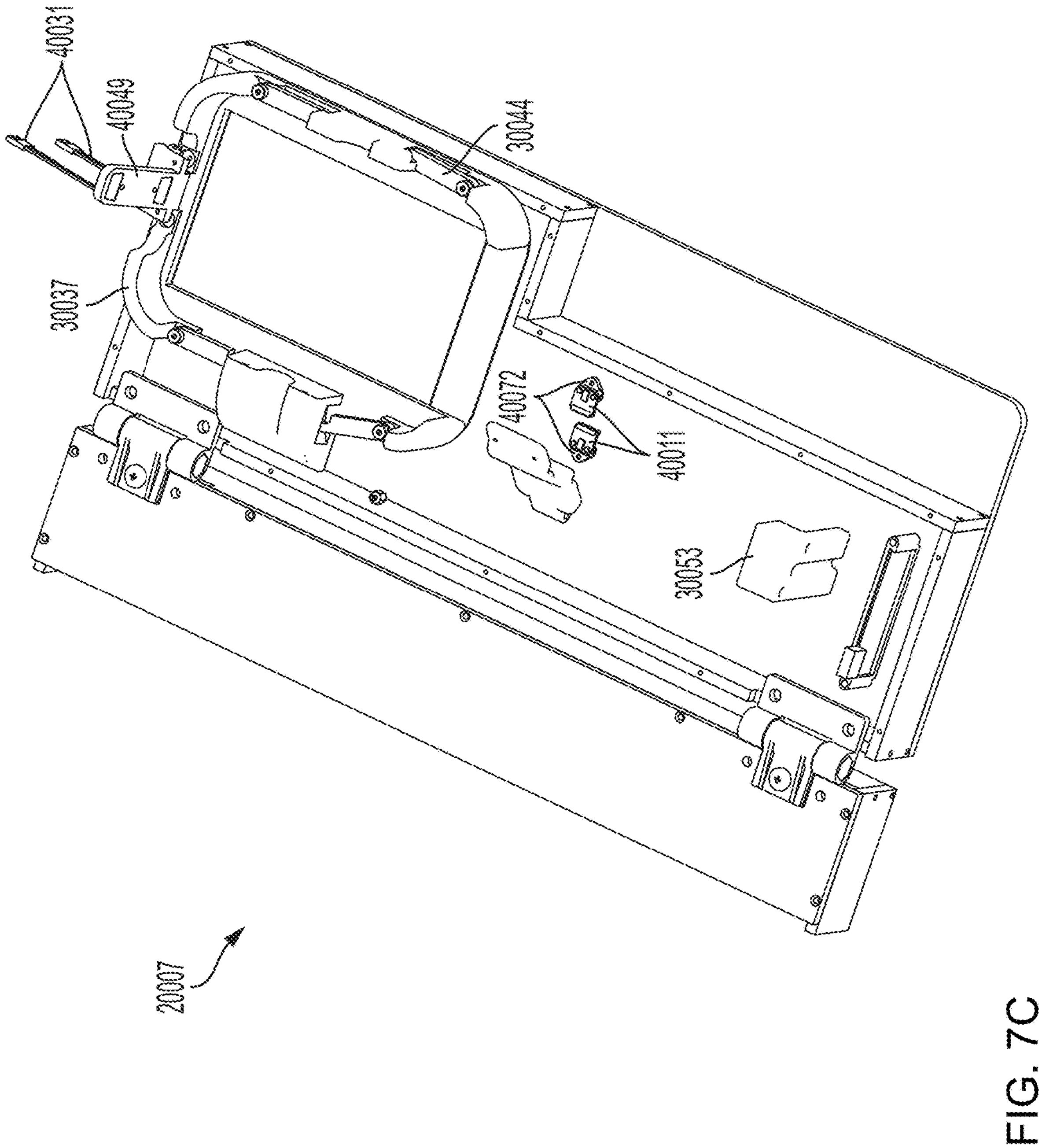
Figure 9A:
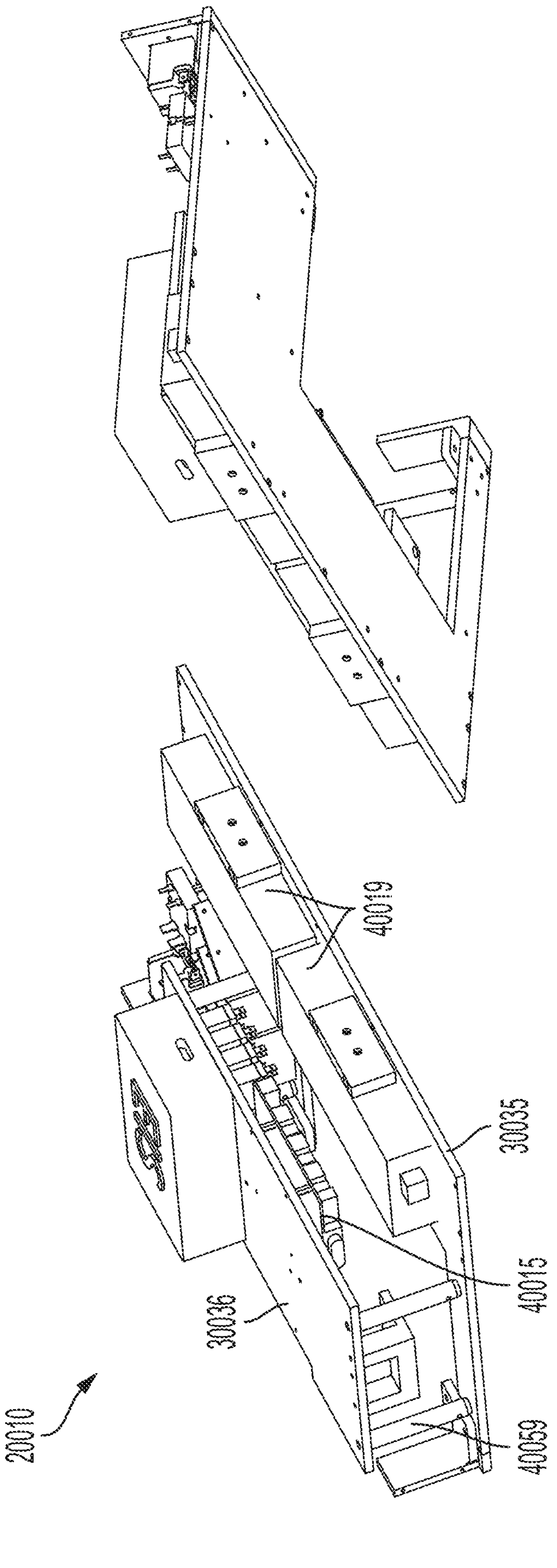
FIGS. 9A-9C are perspective diagrams of views of the electronics assembly of the first implementation of the system of the present teachings.

Referring now to FIGS. 7A-7C, disposable interface enclosure assembly 20007 can include, but is not limited to including, disposable interface back plate top 30023 (FIG. 7A) can be coupled by hinge 40071 (FIG. 7A), and can be part of a partial enclosure surrounded by disposable interface skirt plates 30020 (FIG. 7A) on three sides. The enclosure can be raised to expose electronics assembly 20010 (FIG. 9A). Disposable interface front plate top 30021 (FIG. 7A) can provide mounting locations for bubble sensor mount 30053 (FIG. 7C), which can hold a bubble sensor (not shown). Also oximeter sensor mount 30054 (FIG. 7A) can be mounted upon disposable interface front plate top 30021 (FIG. 7A), and oximeter sensor cover 30055 (FIG. 7A) can be coupled to oximeter sensor mount 30054 (FIG. 7A) to retain tubing and sensors. Sensors such as oximeters 40011 (FIG. 7C) can be mounted to oximeter sensor mount 30054 (FIG. 7A) through the use of, for example, oximeter mounting clamps 40072 (FIG. 7C). Disposable interface front plate top 30021 (FIG. 7A) can be mounted upon disposable interface front plate bottom 30022 (FIG. 7A), and can be raised from disposable interface front plate bottom 30022 (FIG. 7A) by disposable interface skirt plates 30020 (FIG. 7A). Disposable interface front plate top 30021 (FIG. 7A) can be raised to allow room for thermal management components, for example, heating plate 30031 (FIG. 7B). Tissue enclosure alignment base 30037 (FIG. 7C) can be mounted atop the thermal management components. Board mount 30028 (FIG. 7B), surrounding board 40006 (FIG. 7B) can be mounted between disposable interface front plate top 30021 (FIG. 7A) and disposable interface front plate bottom 30022 (FIG. 7A). Level sensor housing 40049 (FIG. 7C) can rest against tissue enclosure alignment base 30037 (FIG. 7C), and can provide mounting for liquid level switch 40031 (FIG. 7A), which can sense the level of the fluid in a tissue enclosure that can be mounted within tissue enclosure alignment base 30037 (FIG. 7C). Securement shaft 30044 (FIG. 7C) can enable fastening of tissue enclosure alignment base 30037 (FIG. 7C) to the heat exchanger on the tissue enclosure.

Figure 8F:
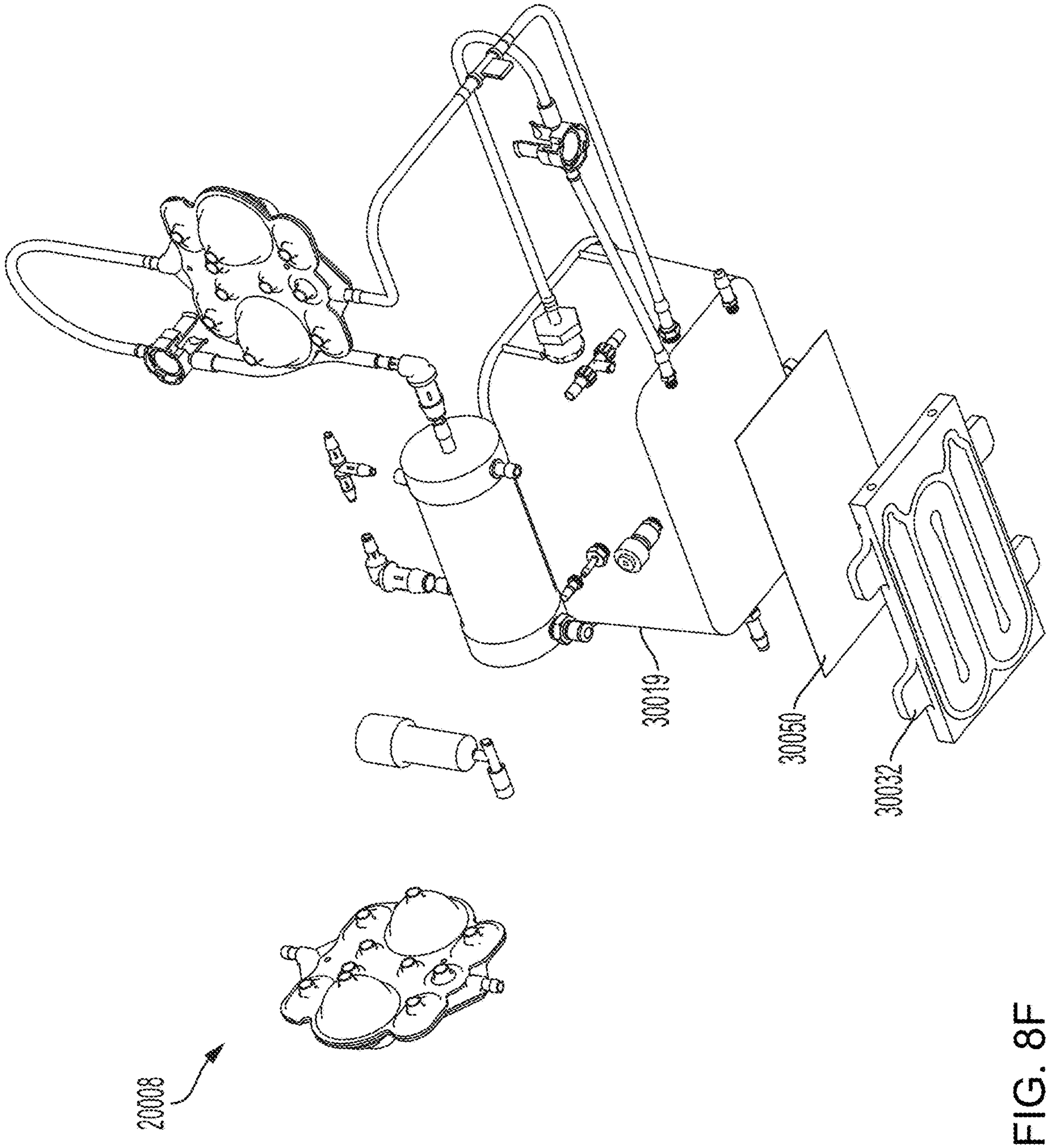

Referring now to FIGS. 8A-8F, and disposable assembly 20008 can include, but is not limited to including, tissue enclosure 30019 (FIG. 8A) that can hold organs such as, for example, kidneys that are in the process of being rehabilitated or maintained. A circulating fluid, the perfusate can enter and exit tissue enclosure 30019. For example, if the tissue is a kidney, the perfusate can enter tissue enclosure through one of several entrance tube/connector combinations and can be tubed directly to the kidney's arterial opening. As the perfusate exits the kidney, it can be routed, for example, to a sensor that can detect how much fluid has exited the kidney, and possibly other characteristics of the waste production. Alternatively, the output can be discarded and/or tested. To maintain the tissue at subnormothermic or normothermic levels, thermal energy might have to be added to the system. Perfusion pump 20005 (FIG. 8C) can pump the perfusate through tubing 40090 (FIG. 8C) and volume control valve 40084 (FIG. 8C) to oxygenator 40047 (FIG. 8C). Infion pump 20005-1 (FIG. 8C) can infuse substances into tissue enclosure 30019. Substances such as glucose can be added to adjust the perfusate if it is found to be lacking in the substance. Gas management can be conducted by a gas management system, shown herein as oxygenator 40047 (FIG. 8C), as a controller provides selected gases to the gas management system through volume control valves, for example. Oxygenated perfusate can continue its circulation path through thermal management 30032. Thermal changes induced by thermal management 30032 (FIG. 8F) can be conducted by heat exchanger membrane 30050 (FIG. 8F) to maintain a desired temperature in tissue enclosure 30019 (FIG. 8F). The thermally-managed and oxygenated perfusate can circulate past pressure sensors 40008 (FIG. 8C) and into tissue enclosure 30019 (FIG. 8F) through connector 40083 (FIG. 8A) and a bubble sensor to the arterial opening in the tissue. Waste from the tissue can exit tissue enclosure 30019 (FIG. 8F), enter flow chamber 30051 (FIG. 8C) for measurement, and flow back into a fluid reservoir in tissue enclosure 30019 (FIG. 8F). The perfusate is pumped from the fluid chamber back to perfusate pump 20005 (FIG. 8E), past, for example, but not limited to, glucose and/or oxygen saturation and/or temperature sensor 40007 and continues circulating. In some configurations, additives such as glucose can be pumped by a separate pumping system into the fluid reservoir. Sensors such as, for example, but not limited to, thermistors, pH sensors, and DO sensors can be positioned within the fluid reservoir to monitor the characteristics of the perfusate and the health of the tissue. Additionally, sensors can be positioned within or without of thermal management 30032 (FIG. 8F) to ensure that the temperature of thermal management 30032 does not exceed pre-selected, user entered, or dynamically-determined thresholds.

Figure 8G:
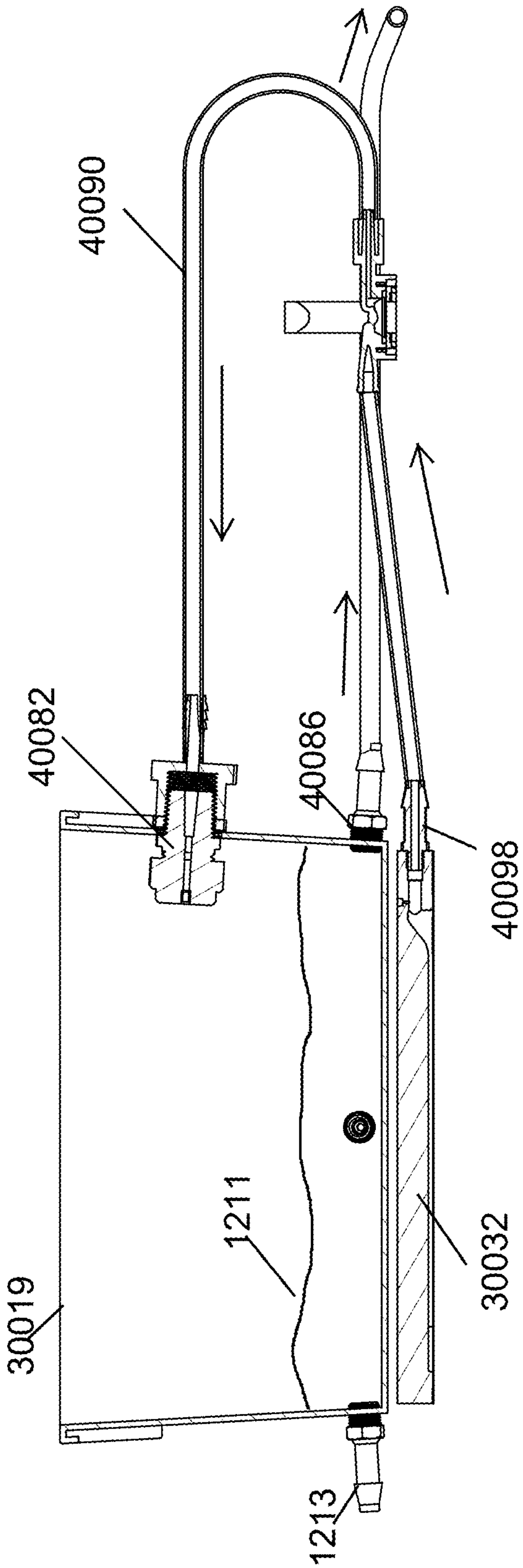
Figure 8H:
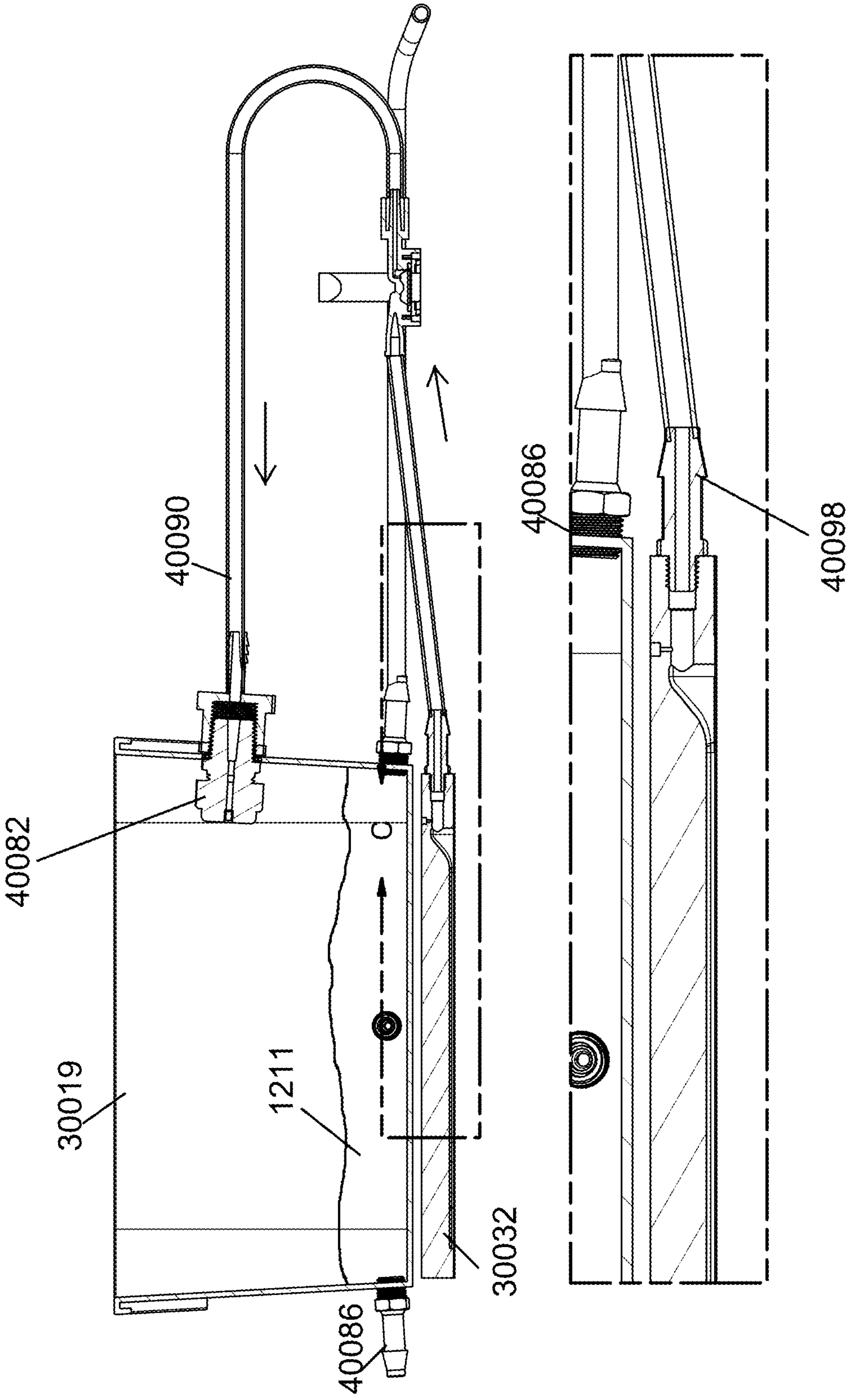
Figure 8I:
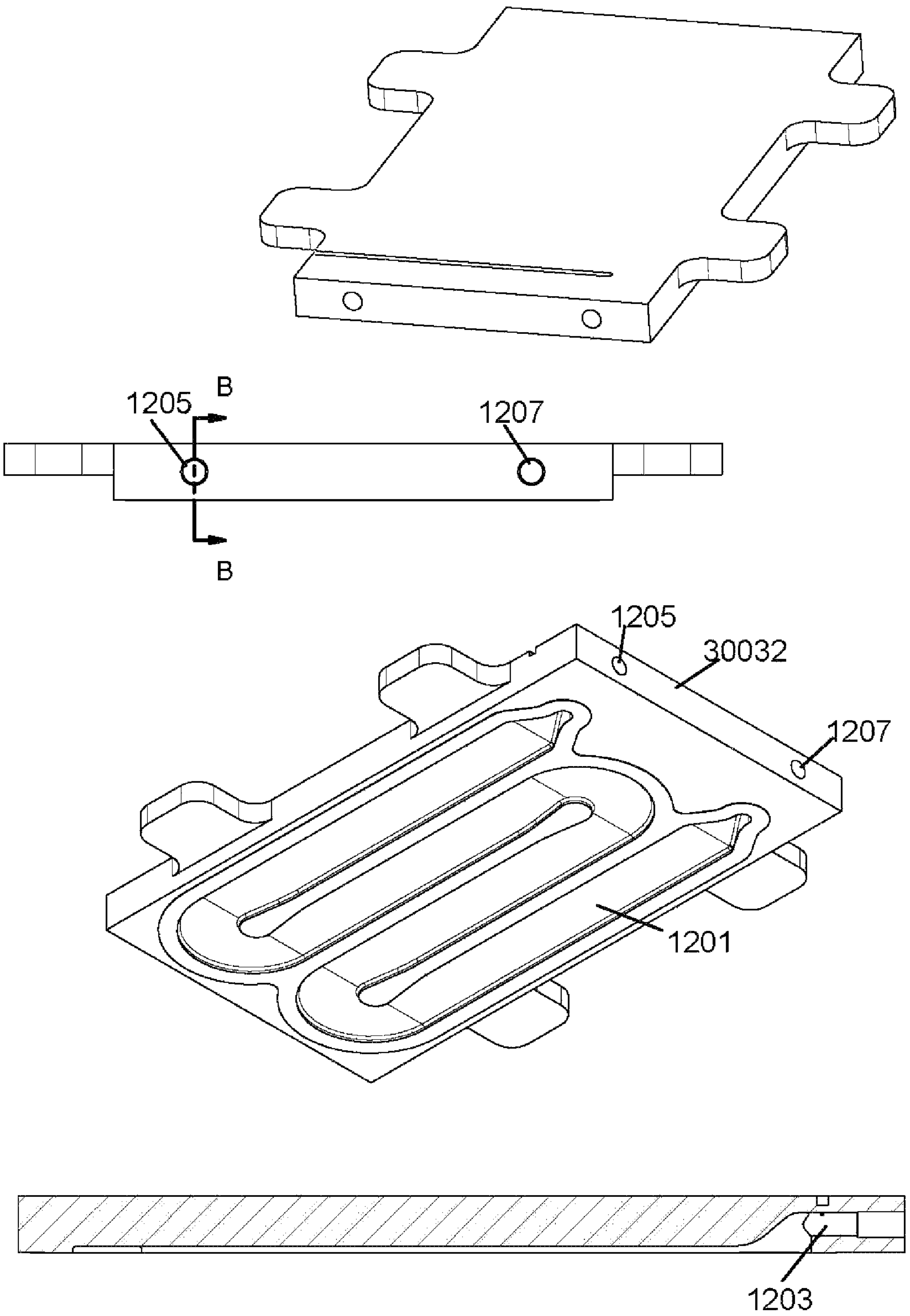

Referring now to FIGS. 8G-8I, thermal management of the present teachings can include circulating perfusate through a heat exchanger before pumping the perfusate into the tissue. Perfusate can circulate across the area of heat exchanger 30032, for example, but not limited to, in serpentine path 1201 (FIG. 8I). Other types of paths are possible, for example, but not limited to, twisting, sinuous, or curved. A desired path should achieve uniform temperature management of the perfusate entering the tissue, as well as in fluid reservoir 1211 (FIG. 8H) and in tissue enclosure 30019 (FIG. 8G). Perfusate can enter at, for example, opening 1205 (FIG. 8I) through conduit 1203 (FIG. 8I). Perfusate can travel the length of path 1201 (FIG. 8I) and exit heat exchanger 30032 at opening 1207 (FIG. 8I) through connector 40098 (FIG. 8H). Perfusate can travel through tubing 40090 and enter tissue enclosure 30019 through connector 40082 (FIG. 8H). A connecting tube (not shown) to the tissue can enable perfusion of the tissue. Waste can exit tissue enclosure 30019 through connector 40086 (FIG. 8G) or connector 1213 (FIG. 8G), for example. Configurations with multiple exit paths are contemplated as described herein, but not limited to configurations described herein. Path 1201 can be covered by a membrane to retain the perfusate while allowing thermal transmission between the source of thermal energy. Perfusate that exits through connector 40086 (FIG. 8G) can proceed back to the perfusion pump to continue the circulation loop, as described herein.

Figure 9B:
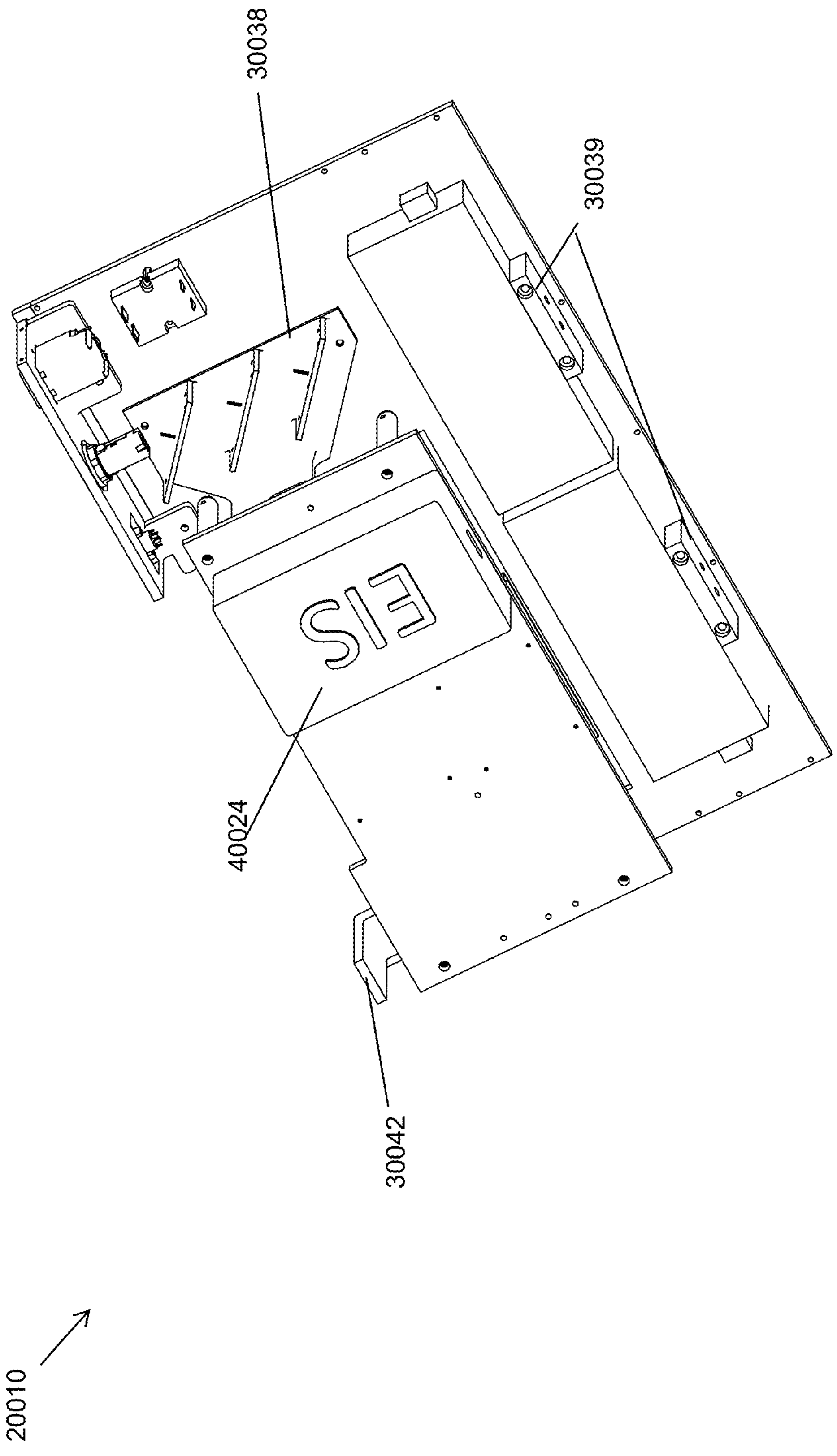
Figure 9C:
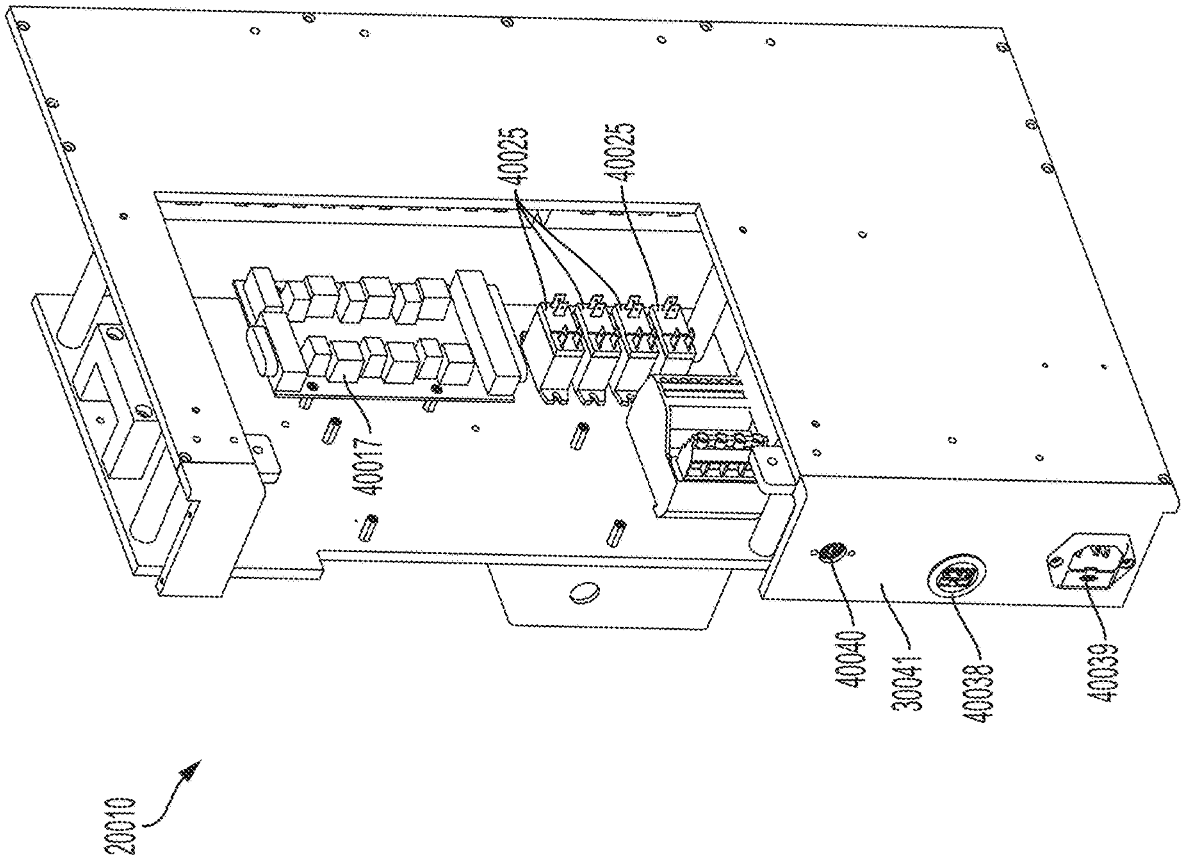

Referring now to FIGS. 9A-9C, electronics assembly 20010 can include, but is not limited to including, electronics base plate 30035 (FIG. 9A) upon which multiple USB hubs 40019 (FIG. 9A) are mounted. USB hubs 40019 (FIG. 9A) can be stabilized against USB hub mount 30039 (FIG. 9B). Standoffs 40059 (FIG. 9A) can raise electronics top plate 30036 (FIG. 9A) to make room for main board 40015 (FIG. 9A) which is mounted to electronics top plate 30036 (FIG. 9A). Also mounted upon electronics base plate 30035 (FIG. 9A) are multiple power relays 40025 (FIG. 9C), and power switching board 40017 (FIG. 9C), among other components. Power plug mount 30041 (FIG. 9C) can include, but is not limited to including, power entry module

40039 (FIG. 9C), USB entry module 40038 (FIG. 9C), and power port 40040 (FIG. 9C) mounted into it, and can include a foot that can be used for connection to the housing of durable enclosure assembly 20006 (FIG. 6A). Electronics rear panel plate 30042 (FIG. 9B) is mounted at a corner of electronics base plate 30035 (FIG. 9A) for connection to the housing of durable enclosure assembly 20006 (FIG. 6A). Electrochemical impedance spectroscopy potentiostat 40024 (FIG. 9B) is mounted on the reverse side of electronics top plate 30036 (FIG. 9A) from main board 40015 (FIG. 9A). Also mounted upon electronics base plate 30035 (FIG. 9A) is module mount 30038 (FIG. 9B) that can include multiple slots for mounting electro-optical module DO sensors. A solid state AC relay can be mounted on standoffs that are mounted to electronics base plate 30035 (FIG. 9A). Other configurations of the components described herein, and other components, for example, other types of sensors, can be accommodated by the architecture of the present teachings. The description herein is to illustrate one possible way to lay out possible components of the system.

Figure 10A:
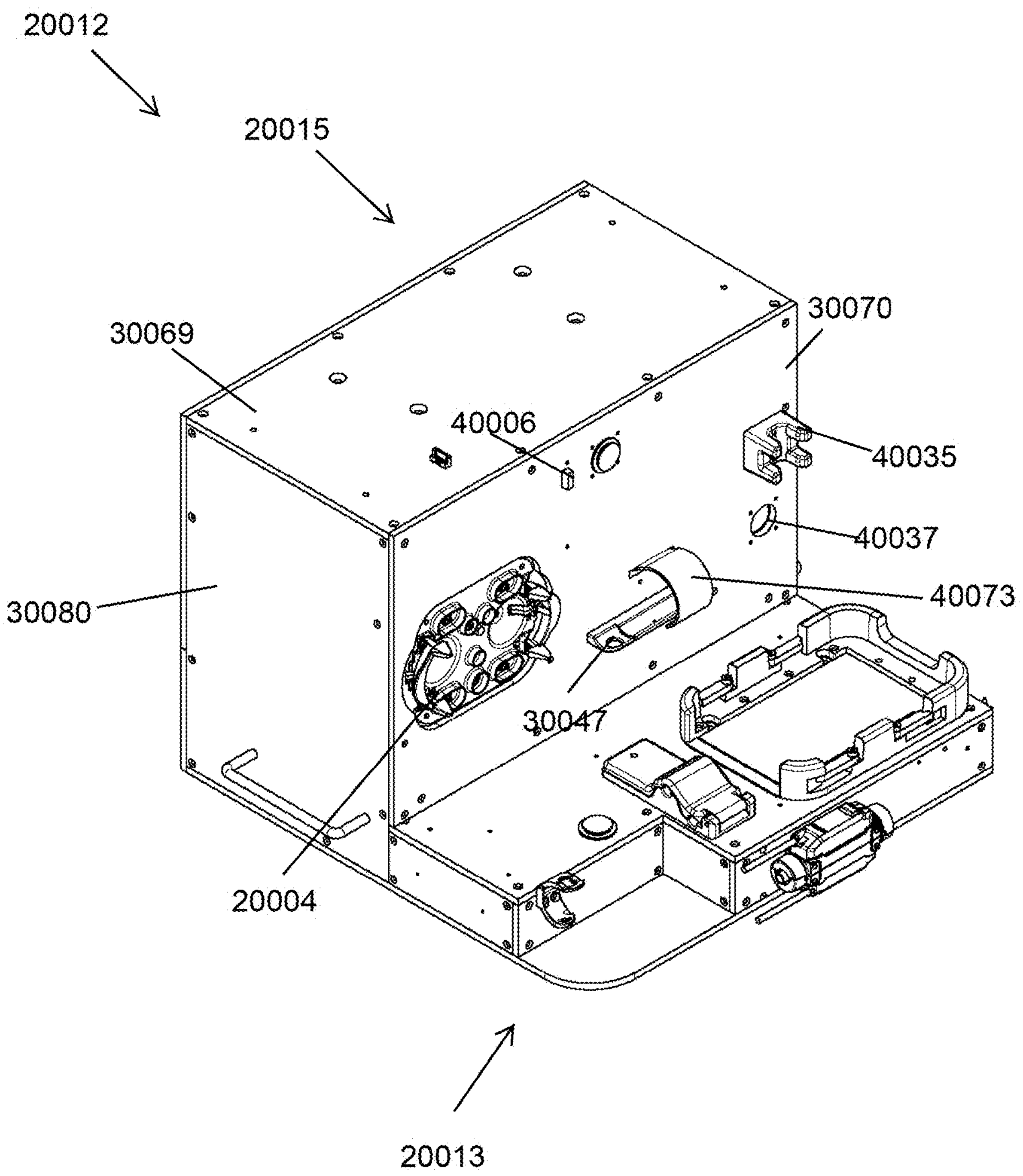
Figure 10B:
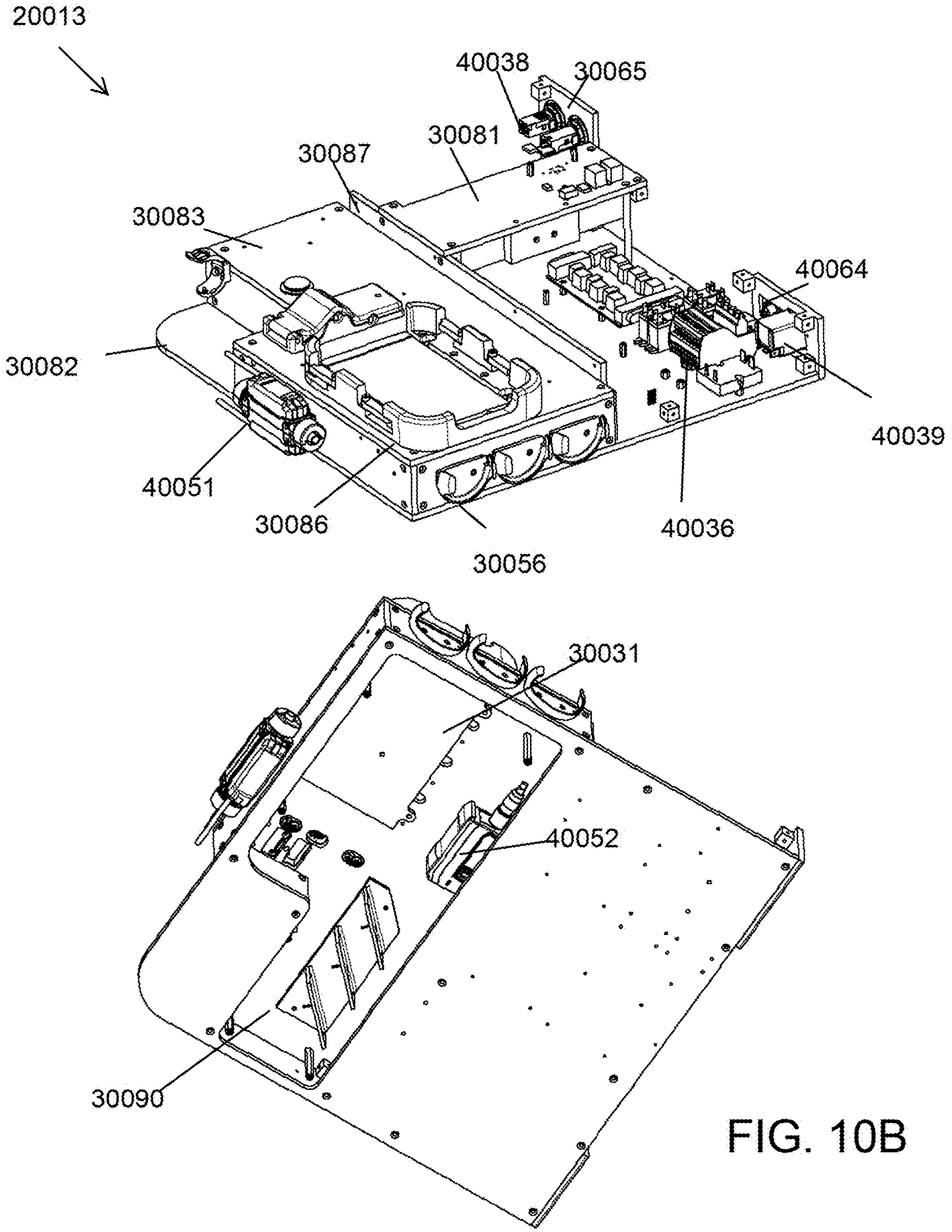

Referring now to FIGS. 10A-10C, in another configuration, the system of the present teachings can include three main assemblies, electronics assembly 20013, durable enclosure assembly 20015, and a disposable assembly (not shown). Differences between configuration 20000 (FIG. 5A) and configuration 20012 (FIG. 10A) include, but are not limited to, the electronics and the disposable interface enclosure assemblies have been combined in configuration 20012 (FIG. 10A), infusion pump 20005-1 (FIG. 8C) has been removed, the number of manifolds are different between the two configurations, and infusion pump mounting areas 30056 (FIG. 10B) and flow sensor 40051 (FIG. 10B) are mounted near tissue enclosure mounting area 30032 in configuration 20012 (FIG. 10A). The combination of these changes can reduce the footprint and the cost to operate the system. Exemplary systems 20000 (FIG. 5A) and 20012 (FIG. 10A) can be configured to match physiological levels of parameters such as, but not limited to, perfusate pressure, perfusate flow rate, oxygenation, temperature, pH, waste generation, glucose consumption, lactate production, hemolysis, blood sodium concentration, waste sodium concentration, waste creatinine concentration, and blood conductivity.

Continuing to refer to FIGS. 10A-10C, durable enclosure assembly can include, but is not limited to including, durable enclosure top plate 30069 (FIG. 10A), durable enclosure left side plate 30080 (FIG. 10A), durable enclosure rear plate 30070 (FIG. 10A), and durable enclosure front plate 30079 (FIG. 10C). Durable enclosure can also include, for example, front skirt plate 30087 (FIG. 10B), sensor mounting feature 30090 (FIG. 10B), and flow controller 40052 (FIG. 10B). Connectors can include USB and power. USB can be attached to plug mount 30065 (FIG. 10B) and power can be enabled by power distribution block 40036 (FIG. 10B). Electronics top plate 30081 (FIG. 10B) and electronics base plate 30082 (FIG. 10B) can sandwich electronics to enable mounting. The disposable components and the durable components can be isolated from each other in various ways, including, but not limited to, disposable interface front plate 30083 (FIG. 10B). Disposable tissue enclosure 30019 (FIG. 8A) can interface with durable components through tissue enclosure alignment base 30086 (FIG. 10B).

Figure 11:
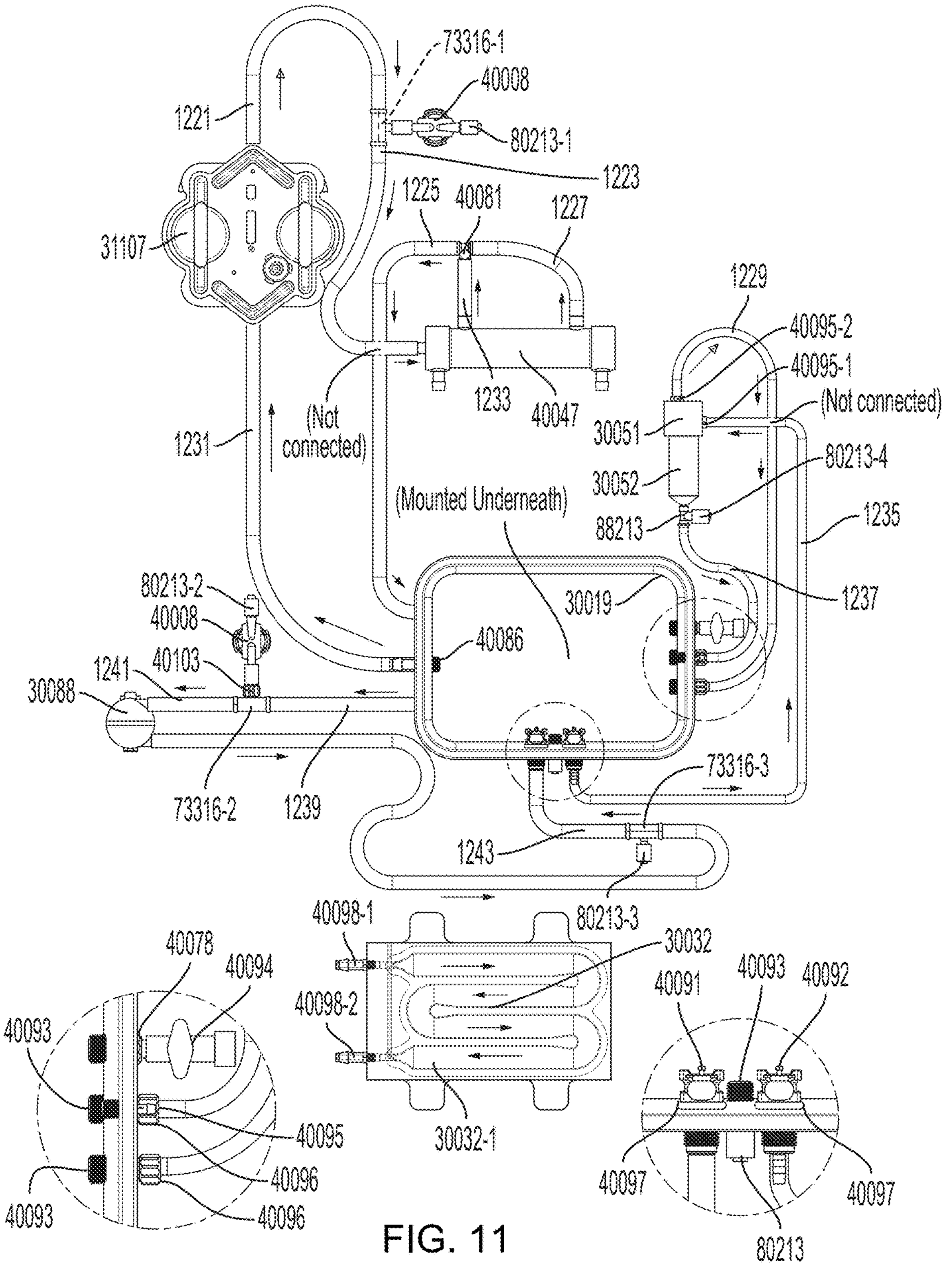
FIG. 11 is a schematic diagram of fluid flow in the second implementation of the system of the present teachings.

Referring now to FIG. 11, an exemplary circulation path of configuration 20012 (FIG. 10A) is shown. Perfusate leaving the fluid reservoir in tissue enclosure 30019 through connector 40086 can travel through tubing 1231 to pump 31107. All tubing described herein can include a pre-selected outer and inner diameter. For example, the outer diameter can be ⅜ inch and the inner diameter can be ¼ inch, or the inner diameter, for output transport, can be ⅛ inch, and the outer diameter can be ¼ inch. It is to be appreciated that the tubing lengths and diameters are exemplary only and depend upon the desired characteristics of the system. The characteristics of one type of pump 31107 have been described herein. Pumps with characteristics such as maintaining low hemolysis and other features described herein can be used. Pump 31107 can pump the perfusate through tubing 1221 to pressure sensor 40008 which is accessed by connector 73316-1 and includes sample port 80213-1. Tubing 1223 can transport the perfusate to gas management system 40047. Gas management system 40047 can adjust gases as necessary in the perfusate, for example, the level of oxygen saturation. The perfusate can exit gas management 40047 through tubing 1227 or through tubing 1233 through connector 40081, and on to tubing 1225 to heat management system 30032 through connector 40098-1. Heat management system 30032 can be, but isn't limited to being, mounted under tissue enclosure 30019. After the perfusate has traversed fluid path 30032-1 in heat management system 30032, which can be, but isn't limited to being, a heat exchange system, the perfusate can exit through connector 40098-2 through tubing 1239 to disposable pressure sensor 40008. Connectors 40103 and 73316-2 can be used to couple pressure sensor 40008 and sample port 80213-2 with the perfusate. The perfusate can next traverse tubing 1241 to gas trap 30088. Gas trap 30088 can remove any gas in the oxygenated perfusate before the perfusate is introduced to the tissue within tissue enclosure 30019. After the gas is removed from the perfusate, the perfusate can traverse connector 73316-3 and sample port 80213-3 that can be used to sample the perfusate before it enters tissue enclosure 30019 and the organ. The perfusate can continue towards tissue enclosure 30019 through tubing 1243 through connector 40097 and tube fitting 40091, to tubing that enters a cannulated artery of the tissue. Waste products can exit from the tissue and through a waste cannula, through tubing and tube fitting 40092 and connector 40097 fitted to tubing 1235. Tubing 1235 can enter output cap 30051 through connector 40095-1, then on to output body 30052 for measurement. Connector 88213 and sample port 80213-4 can allow sampling of the output, which can be waste products from the organ. The output can be directed through tubing 1237 through connectors 40093-40096 and 40078 back into the fluid reservoir in tissue enclosure 30019. Output cap 30051 can be vented through connector 40095-2, and the vented substance can travel through tubing 1229 back into tissue enclosure 30019. The circulation loop is complete. In some configurations, the heat exchanger is in direct contact with the tissue enclosure to ensure the capture of possible waste heat, an important feature for energy efficiency and for those systems operating on battery power.

Referring now to FIG. 12, valves can be associated with a pumping cassette to control fill and delivery of pump chambers, and thus flow of perfusate. In the configuration shown in FIG. 12, two valve banks and a regulator can manage fill and delivery separately. Positive and negative lines can exert positive pressure or form a vacuum, forcing movement of the cassette membrane and pumping of the contents of the cassette. A controller can open and close the valves according to which valves enable desired flow rate and pressure.

Various alternatives and modifications can be devised by those skilled in the art without departing from the disclosure.

Accordingly, the present disclosure is intended to embrace all such alternatives, modifications and variances. Additionally, while several example configurations of the present disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular configurations. And, those skilled in the art will envision other modifications within the scope and spirit of the claims appended hereto. Other elements, steps, methods and techniques that are insubstantially different from those described above and/or in the appended claims are also intended to be within the scope of the disclosure.

The drawings are presented only to demonstrate certain examples of the disclosure. And, the drawings described are only illustrative and are non-limiting. In the drawings, for illustrative purposes, the size of some of the elements may be exaggerated and not drawn to a particular scale. Additionally, elements shown within the drawings that have the same numbers may be identical elements or may be similar elements, depending on the context.

Where the term "comprising" is used in the present description and claims, it does not exclude other elements or steps. Where an indefinite or definite article is used when referring to a singular noun, e.g. "a" "an" or "the", this includes a plural of that noun unless something otherwise is specifically stated. Hence, the term "comprising" should not be interpreted as being restricted to the items listed thereafter; it does not exclude other elements or steps, and so the scope of the expression "a device comprising items A and B" should not be limited to devices consisting only of components A and B.

Furthermore, the terms "first", "second", "third," and the like, whether used in the description or in the claims, are provided for distinguishing between similar elements and not necessarily for describing a sequential or chronological order. It is to be understood that the terms so used are interchangeable under appropriate circumstances (unless clearly disclosed otherwise) and that the example configurations of the disclosure described herein are capable of operation in other sequences and/or arrangements than are described or illustrated herein.

What is claimed is:

1. A system for enabling sustained normothermic or subnormothermic perfusion of a kidney comprising:

a tank housing the kidney, the tank holding a solution bath surrounding the kidney the solution bath having an exposed top surface open to ambient pressure allowing gas bubbles to exit an exposed top surface of the solution bath preventing recirculation of gas bubbles, the tank limiting exposure of the kidney to vacuum pressure;

a perfusion system operably coupled with at least one orifice of the kidney, the perfusion system drawing perfusate from said solution bath surrounding the kidney and circulating perfusate through the kidney, the perfusion system enabling monitoring and adjustment of the perfusate as the perfusate circulates; and a temperature management system simultaneously maintaining the solution bath, the organ contained therein, and the perfusate at a desired temperature, the temperature management system including insulation; and a carrying case holding the tank, the perfusion system, and the temperature management system, the carrying case enabling transport of the kidney.

2. The system as in claim 1 wherein the perfusion system comprises: a perfusion pump pumping a perfusion solution at the desired temperature through the kidney.

3. The system as in claim 1 further comprising:

an oxygenator supplying oxygen to the perfusate, enabling carbon dioxide to escape from the kidney.

4. The system as in claim 1 further comprising: an infusion pump pumping a selected solution into the tank.

5. The system as in claim 1 further comprising: an infusion pump pumping a selected solution into the kidney.

6. The system as in claim 1 further comprising:

at least one sensor collecting at least one perfusate characteristic of the perfusate and at least one kidney characteristic of the kidney.

7. The system as in claim 1 further comprising:

a sample/waste container collecting urine, the urine indicating at least one kidney characteristic of the kidney.

8. A method for sustained normothermic perfusion of a kidney, the kidney including a ureter and a renal artery, the kidney being housed in a tank within a perfusion system, the kidney being transported from a donor to a recipient, the method comprising:

placing a kidney into said tank and connecting at least said renal artery to said perfusion system, the kidney surrounded by a solution bath filling a tank;

pumping perfusate directly from the solution bath surrounding the kidney using a pump in said perfusion system into the renal artery;

monitoring perfusate characteristics via sensors in said perfusion system of the perfusate while the kidney is being transported;

simultaneously maintaining the solution bath, the organ contained therein, and the perfusate at a desired temperature; and continuously adjusting, in real time during transport, via a control system connected to said sensors, at least one at least one of flow rate, oxygenation level, or pressure of the perfusate based on sensor feedback.

9. The method as in claim 8 further comprising: said perfusion system maintaining the perfusate at a pre-selected temperature while the kidney is being transported.

10. The method as in claim 8 further comprising: said perfusion system sampling urine from the ureter; and disposing of the sampled urine.

11. The method as in claim 8 further comprising:

said perfusion system monitoring solution bath characteristics of the solution bath;

controlling a selector valve and an infusion pump, the selector valve and the infusion pump drawing selected solutions into the solution bath based on the solution bath characteristics; and controlling a temperature management system based on the solution bath characteristics.

12. The method as in claim 8 further comprising: said perfusion system oxygenating the perfusate while the kidney is being transported.

13. A system for enabling sustained normothermic or subnormothermic perfusion of an organ with perfusate, the system comprising:

a tissue enclosure having a platform and a fluid reservoir surrounding an organ contained therein, the platform having a height, the fluid reservoir having a fluid level, the fluid level being lower the height, the organ being positioned on the platform;

a gas management subsystem adjusting gas saturation in the perfusate;

a thermal management subsystem simultaneously adjusting temperature of the fluid reservoir, the organ contained therein, and the perfusate according to a pre-selected threshold, the pre-selected threshold being normothermic or subnormothermic; and a perfusion subsystem circulating perfusate through the organ, the gas management system, and the thermal management subsystem, the perfusate enabling sustained normothermic or subnormothermic conditions for the organ.

14. The system as in claim 13 further comprising: an output management subsystem measuring output from the organ.

15. The system as in claim 13 further comprising: a gas trap removing gas from the perfusate.

16. A system for enabling sustained normothermic or subnormothermic perfusion of an organ with perfusate, the system comprising:

a disposable portion, the disposable portion including disposable components and tubing coupling the disposable components together to form a pre-assembled, single-use perfusion circuit defining the entire circulation loop, the circulation loop enabling circulation of the perfusate through a fluid reservoir surrounding an organ contained therein;

a durable portion, the durable portion including a pneumatic system driving the circulation of the perfusate, a thermal energy source supplying thermal energy to the perfusate to maintain the circulating perfusate at normothermic or subnormothermic temperatures, and a control system controlling the pneumatic system and the thermal energy source.

17. The system as in claim 16 wherein the disposable portion comprises:

a heat exchanger transferring heat from the thermal energy source to the perfusate.

18. The system as in claim 17 wherein the heat exchanger comprises:

a plate having a first side etched with a fluid path and a second opposing side, the second opposing side positioned against a tissue enclosure, the tissue enclosure housing the organ; and a thermally-conductive membrane having a first membrane side covering the first side, the thermally-conductive membrane having a second opposing membrane side positioned against the thermal energy source.

19. The system as in claim 16 wherein the disposable portion comprises:

an oxygenator providing oxygen to the perfusate.

20. The system as in claim 16 wherein the disposable portion comprises:

at least one pump pumping the perfusate through the organ, the pneumatic system driving the at least one pump.

* * * * *